United States Patent
Fasi et al.

(10) Patent No.: US 10,851,584 B2
(45) Date of Patent: *Dec. 1, 2020

(54) WINDOW CONTROL SYSTEM WITH REGULATION OF RADIANT HEAT

(71) Applicant: KING FAHD UNIVERSITY OF PETROLEUM AND MINERALS, Dhahran (SA)

(72) Inventors: Mohammed Abdul Fasi, Dhahran (SA); Ismail Mohammad Budaiwi, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/399,411

(22) Filed: Apr. 30, 2019

(65) Prior Publication Data

US 2019/0257150 A1  Aug. 22, 2019

Related U.S. Application Data

(63) Continuation of application No. 16/034,174, filed on Jul. 12, 2018, now Pat. No. 10,329,839, which is a
(Continued)

(51) Int. Cl.
*E06B 9/68* (2006.01)
*G05B 13/04* (2006.01)
(Continued)

(52) U.S. Cl.
CPC .............. *E06B 9/68* (2013.01); *E05F 15/70* (2015.01); *E05F 15/71* (2015.01); *E05F 15/73* (2015.01);
(Continued)

(58) Field of Classification Search
CPC ...... E06B 9/68; E06B 2009/6827; E06B 9/24; E06B 2009/2417; E06B 2009/2464;
(Continued)

(56) References Cited

U.S. PATENT DOCUMENTS 4,502,758 A   3/1985 Bailey
5,698,958 A  12/1997 Domel
(Continued)

OTHER PUBLICATIONS

Hulse, A. J., "Daylighting with Electrochromics", URL: http://usgbccolorado.org/images/Sage_201_AIA_Course.pdf; Sage Electrochromics Inc., 57 Pages total, (2013).

*Primary Examiner* — Bitew A Dinke
(74) *Attorney, Agent, or Firm* — Oblon, McClelland, Maier & Neustadt, L.L.P.

(57) ABSTRACT

A smart window controller includes circuitry configured to establish a representative model of one or more building zones based on occupancy, construction, lighting, or cooling properties of a building. A lighting control strategy is implemented for the one or more building zones based on the representative model or one or more user preferences input at a first user interface screen of an external device. Automatic operations of one or more smart windows, cooling systems, or artificial lighting systems are controlled based on trigger points associated with the lighting control strategy, and a performance level of the lighting control strategy for the one or more building zones is determined based on one or more predetermined financial metrics.

7 Claims, 40 Drawing Sheets

Related U.S. Application Data continuation of application No. 15/045,864, filed on Feb. 17, 2016, now Pat. No. 10,053,911.

(51) Int. Cl.

| | | |
|---|---|---|
| *E05F 15/70* | (2015.01) | |
| *E06B 9/24* | (2006.01) | |
| *E06B 9/32* | (2006.01) | |
| *G05B 15/02* | (2006.01) | |
| *E05F 15/71* | (2015.01) | |
| *E05F 15/73* | (2015.01) | |
| *E05F 15/79* | (2015.01) | |

(52) U.S. Cl.
CPC ............... *E05F 15/79* (2015.01); *E06B 9/24* (2013.01); *E06B 9/32* (2013.01); *G05B 13/041* (2013.01); *G05B 15/02* (2013.01); *E06B 2009/2464* (2013.01); *E06B 2009/6809* (2013.01); *E06B 2009/6818* (2013.01); *E06B 2009/6827* (2013.01); *G05B 2219/2642* (2013.01)

(58) Field of Classification Search
CPC ....... E05F 15/70; G05B 13/041; G05B 15/02; G02F 1/163
See application file for complete search history.

(56) References Cited

U.S. PATENT DOCUMENTS

| | | | |
|---|---|---|---|
| 5,760,558 A | 6/1998 | Popat | |
| 7,941,245 B1 | 5/2011 | Popat | |
| 7,995,277 B2* | 8/2011 | Patterson | E06B 7/086 |
| | | | 359/591 |
| 9,850,705 B2* | 12/2017 | Dean | E06B 9/24 |
| 9,922,301 B2 | 3/2018 | Tanigawa | |
| 10,053,911 B2* | 8/2018 | Fasi | E06B 9/32 |
| 10,329,838 B2* | 6/2019 | Fasi | G05B 15/02 |
| 10,329,839 B2* | 6/2019 | Fasi | E05F 15/73 |
| 10,400,509 B2* | 9/2019 | Fasi | E05F 15/79 |
| 2008/0082183 A1* | 4/2008 | Judge | G05B 15/02 |
| | | | 700/33 |
| 2009/0301672 A1* | 12/2009 | Veskovic | E06B 9/32 |
| | | | 160/405 |
| 2010/0249955 A1* | 9/2010 | Sitton | G05B 15/02 |
| | | | 700/33 |
| 2011/0046810 A1* | 2/2011 | Bechtel | E06B 9/24 |
| | | | 700/299 |
| 2011/0089842 A1 | 4/2011 | Aldrich | |
| 2012/0075091 A1 | 3/2012 | Clough | |
| 2013/0242370 A1* | 9/2013 | Wang | G02F 1/163 |
| | | | 359/275 |
| 2013/0278989 A1* | 10/2013 | Lam | B60J 3/04 |
| | | | 359/275 |
| 2014/0001846 A1 | 1/2014 | Mosebrook | |
| 2014/0001977 A1* | 1/2014 | Zacharchuk | H04L 12/2816 |
| | | | 315/291 |
| 2014/0067130 A1* | 3/2014 | Pillai | H04L 12/2816 |
| | | | 700/275 |
| 2014/0156079 A1* | 6/2014 | Courtney | E06B 9/32 |
| | | | 700/275 |
| 2014/0163742 A1 | 6/2014 | Element | |
| 2014/0236323 A1* | 8/2014 | Brown | G02F 1/163 |
| | | | 700/90 |
| 2014/0355098 A1* | 12/2014 | Berman | E06B 9/68 |
| | | | 359/275 |
| 2014/0376747 A1* | 12/2014 | Mullet | G08C 23/00 |
| | | | 381/110 |
| 2015/0059990 A1* | 3/2015 | Adrain | F41H 5/026 |
| | | | 160/10 |
| 2015/0197975 A1* | 7/2015 | Andreasen | G05B 15/02 |
| | | | 700/275 |
| 2015/0248118 A1* | 9/2015 | Li | F24F 11/30 |
| | | | 700/295 |
| 2015/0286938 A1* | 10/2015 | Blair | E06B 9/68 |
| | | | 706/11 |
| 2015/0286941 A1 | 10/2015 | Blair et al. | |
| 2015/0368967 A1* | 12/2015 | Lundy | E06B 9/32 |
| | | | 160/5 |
| 2016/0054633 A1* | 2/2016 | Brown | G02F 1/163 |
| | | | 359/275 |
| 2016/0209181 A1 | 7/2016 | Adrain | |
| 2017/0095103 A1* | 4/2017 | Pham | A47H 5/0325 |
| 2017/0276542 A1* | 9/2017 | Klawuhn | G01J 1/0242 |
| 2019/0249491 A1* | 8/2019 | Fasi | E05F 15/70 |
| 2019/0257150 A1* | 8/2019 | Fasi | E05F 15/70 |
| 2019/0257151 A1* | 8/2019 | Fasi | E05F 15/70 |

\* cited by examiner

| Construction assembly | Elements from outside to inside | Thickness (m) | Thermal conductivity (W/m·K) | Thermal resistance (m² K/W) | U-value (W/m² K) |
|---|---|---|---|---|---|
| Wall cross section | Stone cladding | 0.02 | 2.9 | 0.007 | 0.740 |
|  | Air gap | 0.025 | 0.3 | 0.083 |  |
|  | Expanded polystyrene | 0.025 | 0.04 | 0.625 |  |
|  | Lightweight concrete | 0.1 | 0.17 | 0.588 |  |
|  | Plaster board | 0.013 | 0.25 | 0.052 |  |
| Roof cross section | Built-up roofing | 0.0095 | 0.16 | 0.060 | 0.303 |
|  | fiberboard sheathing | 0.012 | 0.06 | 0.2 |  |
|  | R-15, insulation board | 0.075 | 0.035 | 1.85 |  |
|  | Lightweight concrete | 0.203 | 0.17 | 1.19 |  |
| Floor cross section | Flooring | 0.03 | 0.14 | 0.214 | 0.509 |
|  | Floor screed | 0.07 | 0.41 | 0.17 |  |
|  | Cast concrete | 0.1 | 1.13 | 0.09 |  |
|  | Foam | 0.06 | 0.04 | 1.5 |  |

Fig. 9

Comparison for energy consumption for different glazed windows with and without daylight integration.

| Type of glazed window | Lighting energy consumption (kWh) (% reduction) | | Cooling energy consumption (kWh) (% reduction) | | Total energy consumption (kWh) (% reduction) | |
|---|---|---|---|---|---|---|
| | Without daylight | With daylight | Without daylight | With daylight | Without daylight | With daylight |
| Double-pane, clear glass | 403,722 | 115,883 (71.3) | 2,018,610 | 1,857,818 (7.9) | 2,883,729 | 2,469,002 (14.4) |
| Double-pane, tinted | 403,722 | 132,613 (67.2) | 1,838,007 | 1,688,714 (8.1) | 2,684,186 | 2,288,746 (14.6) |
| Double-pane, low-E | 403,722 | 136,857 (66) | 1,740,600 | 1,587,191 (8.8) | 2,572,450 | 2,174,093 (15.5) |

*Fig. 12*

WINDOW CONTROL SYSTEM WITH REGULATION OF RADIANT HEAT

CROSS-REFERENCE TO RELATED APPLICATIONS

The present application is a Continuation of Ser. No. 16/034,174, now allowed, having a filing date of Jul. 12, 2018 which is a Continuation of Ser. No. 15/045,864, now U.S. Pat. No. 10,053,911, having a filing date of Feb. 17, 2016.

BACKGROUND

Technical Field

The present disclosure is directed to control smart windows with electrochromic (EC) coatings or automated venetian blinds.

Description of the Related Art

The demand for energy has been rising continuously and is likely to continue in the future. British Petroleum published a report on the current status of energy in the world, which shows an increase of 2.3% in the global primary energy consumption as described in *BP Statistical Review of World Energy,* 2014, the entire contents of which is incorporated herein by reference. Growth in population and the enhancement in building services and comfort levels have increased the building energy consumption as described in *International Energy Agency, Key World Energy Statistics* 2014, the entire contents of which is incorporated herein by reference. The reduction of energy consumption in buildings can make a significant contribution toward lowering the global demand for energy as described in N. B. Behmiri, J. R. Pires Manso, "How crude oil consumption impacts on economic growth of sub-Saharan Africa," Int. J. Energy 54 (2013) 74-83, the entire contents of which is incorporated herein by reference.

Office buildings usually emit a high amount of internal heat gain due to high rates of occupancy and significant usage of equipment and lighting as described in J. Choi, A. Aziz, V. Loftness, "Investigation on the impacts of different genders and ages on satisfaction with thermal environments in office buildings," Build. Environ. 45 (2010) 1529-1535. Office workers depend on the comfortable conditions provided in the building to performing their various tasks. Thus, their productivity is directly dependent on the comfort level provided inside the building as described in A. Gasparella, G. Pernigotto, F. Cappelletti, P. Romagnoni, P. Baggio, "Analysis and modelling of window and glazing systems energy performance for a well-insulated residential building," Energy Build. 43 (4) (2011) 1030-1037, the entire contents of which is incorporated herein by reference. Office buildings consume a high amount of energy in the form of space cooling/heating and lighting, equipment, water heating, ventilation and other applications as described in H. Hens, "Thermal comfort in office buildings: two case studies commented," Build. Environ. 44 (2009) 1399-1408, the entire contents of which is incorporated herein by reference. In a typical office building, artificial lighting and cooling/heating/equipment are considered to be major contributors to building energy consumption making these systems the best targets for energy savings as described in P. Ihm, L. Park, M. Krarti, D. Seo, "Impact of window selection on the energy performance of residential buildings in South Korea," Energy Policy 44 (2012)1-9, the entire contents of which is incorporated herein by reference. The International Energy Agency has indicated that in a typical office building, artificial lighting consumes the bulk of the energy followed by cooling and heating operations as described in *International Energy Agency, Key World Energy Statistics* 2014. Office buildings have a relatively high proportion of lighting energy consumption per unit area due to their functional and operational requirements as described in H. Hens, "Thermal comfort in office buildings: two case studies commented," Build. Environ. 44 (2009) 1399-1408.

In a hot climate, cooling accounts for the highest share of energy consumption in office buildings. Internal heat gain and solar gain through the exterior envelope are the major contributors to the thermal load in an office building. Heat gain through windows in particular represents a significant component of the cooling load and consequently a major contributor to energy consumption as described in T. Berger, C. Amann, H. Formayer, A. Korjenic, B. Pospichal, C. Neururer, R. Smutny, "Impacts of urban location and climate change upon energy demand of office buildings in Vienna, Austria," Build. Environ. 81 (2014)258-269, the entire contents of which is incorporated herein by reference. Window glazing plays an important role in energy performance and has a significant effect on the overall building energy consumption. Heat flow through a glazed window contributes to the heat gain due to incident solar radiation which eventually increases the cooling load as described in M. T. Ke, C.-H. Yeh, J.-T. Jian, "Analysis of building energy consumption parameter and energy savings measurement and verification by applying Quest software," Energy Build. 61 (2013) 100-107, the entire contents of which is incorporated herein by reference. In buildings, the net energy gain through windows depends on the thermal properties of the glazing material. Double-pane coated glass windows are used for reducing heat and energy losses. They are very effective in lowering the building energy consumption by reducing the cooling load when compared with traditional double-glazed clear glass windows. However, colored glazing reduces the admittance of daylight thereby hindering the chances of effective utilization of daylight integration with artificial lighting as described in H. Arsenault, M. Hebert, D. Marie-Claudie, "Effects of glazing color type on perception of daylight quality, arousal, and switch-on patterns of electric light in office rooms," Build. Environ. 56 (2012) 223-231, the entire contents of which is incorporated herein by reference.

Daylight received through windows can significantly contribute to the reduction of lighting energy consumption in office buildings as described in M. T. Ke, C.-H. Yeh, J.-T. Jian, "Analysis of building energy consumption parameter and energy savings measurement and verification by applying Quest software," Energy Build. 61 (2013) 100-107. It is considered as a potential passive strategy for reducing the building energy consumption and improving the visual comfort without any expensive operational cost and installation. Y. W. Lim, M. Z. Kandar, M. H. Ahmad, D. R. Ossen, M. A. Abdullah, "Building facade design for daylighting quality in typical government office building," Build. Environ. 57 (2012) 194-204, the entire contents of which is incorporated herein by reference, is a study with the aim of evaluating the daylighting performance in a typical government office building in Malaysia. Based on the simulation study, they found that by changing the glazing of the windows and adding interior blinds, a significant improvement in daylighting quantity and quality for visual comfort could be achieved. The amount of savings can result from changing the glazing of the window, and the study focused only on the usage of static blinds which block a considerable amount of daylight to maintain visual comfort in the office. H. Shen, A. Tzempelikos, "Sensitivity analysis on daylighting and energy performance of perimeter offices with automated shading," *Build. Environ.* 59(2013) 303-314, the entire contents of which is incorporated herein by reference, investigated the impact of different shading control strategies on the building energy performance and daylighting in an office space using year-round, transient, thermal- and lighting-integrated simulation. Interior shades were used to block solar radiation and improve the visual comfort by suppressing the glare for the occupants inside the building. Four different shading control strategies were modeled for maximizing the daylight utilization, minimizing energy consumption, and reducing the risk of visual discomfort. The role of automated roller shades was also addressed in improving the energy and visual performance in an office building without considering the impact of different glazing types.

Daylighting provides a pleasant and attractive indoor environment that can foster higher productivity and performance as described in P. Plympton, S. Conway, K. Epstein, "Daylighting in Schools: Improving Student Performance and Health at a Price Schools Can Afford," *National Renewable Energy Laboratory Report*, CP-550-28059, Golden, Colo., 2000, the entire contents of which is incorporated herein by reference. With the proper use of sensors and controllers, daylighting is capable of reducing the electrical lighting and providing sufficient illuminance levels inside an office space. Y. W. Wong, "Energy performance of office building in Singapore," *ASHRAE Trans.* 94 (Part (2)) (1988) 546-559, the entire contents of which is incorporated herein by reference, describes a numerical study for an office building located in the tropical climate of Singapore city and concluded that, with proper daylight integration, the amount of energy savings can be increased by lowering the lighting expenditure and the cooling energy consumption. D. H. W. Li, J. C. Lam, "Evaluation of lighting performance in office buildings with daylighting controls," Energy Build. 33 (2001) 793-803, the entire contents of which is incorporated herein by reference, describes a study that indicated that, due to the limited studies in the field of daylighting, many architects and building owners are reluctant to invest in daylighting control strategies.

As discussed above, the available literature shows that work has been conducted by researchers in exploring the benefits of daylighting, but in most of these studies the visual comfort component was ignored. Visual comfort is very important in an environment where the employees work continuously, as it can affect the employee's productivity level. Visual comfort is created with a predetermined amount of good quality light and a sophisticated light distribution. Assessing visual comfort in a critical indoor environment such as an office building is a challenging task. Many parameters must be considered during the calculations. inside an office building.

Different commercially available glazed windows were assessed and energy savings associated with each window design were identified with and without daylight integration. Too much daylight can provide excessive luminance and create an uncomfortable working environment causing visual discomfort as described in X. Yu, Y. h. Su, H. f. Zheng, S. Riffat, "A study on use of miniature dielectric compound parabolic concentrator (dCPC) for daylighting control application," Build. Environ. 74 (2014) 75-85, the entire contents of which is incorporated herein by reference.

Proper design considerations can be employed when selecting the glazing of the window to ensure maximum daylight with minimal glare index as described in U. Berardi, T. Wang, "Daylighting in an atrium-type high performance house," *Build. Environ.* 76 (2014) 92-104, the entire contents of which are incorporated herein by reference.

SUMMARY

In an exemplary implementation, a smart window controller includes circuitry configured to establish a representative model of one or more building zones based on occupancy, construction, lighting, or cooling properties of a building. A lighting control strategy is implemented for the one or more building zones based on the representative model or one or more user preferences input at a first user interface screen of an external device. Automatic operations of one or more smart windows, cooling systems, or artificial lighting systems are controlled based on trigger points associated with the lighting control strategy, and a performance level of the lighting control strategy for the one or more building zones is determined based on one or more predetermined financial metrics.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 9 is a table of exemplary construction properties, according to certain embodiments;

FIG. 12 is an exemplary table of energy consumption based on window type, according to certain embodiments;

DETAILED DESCRIPTION

Figure 1:
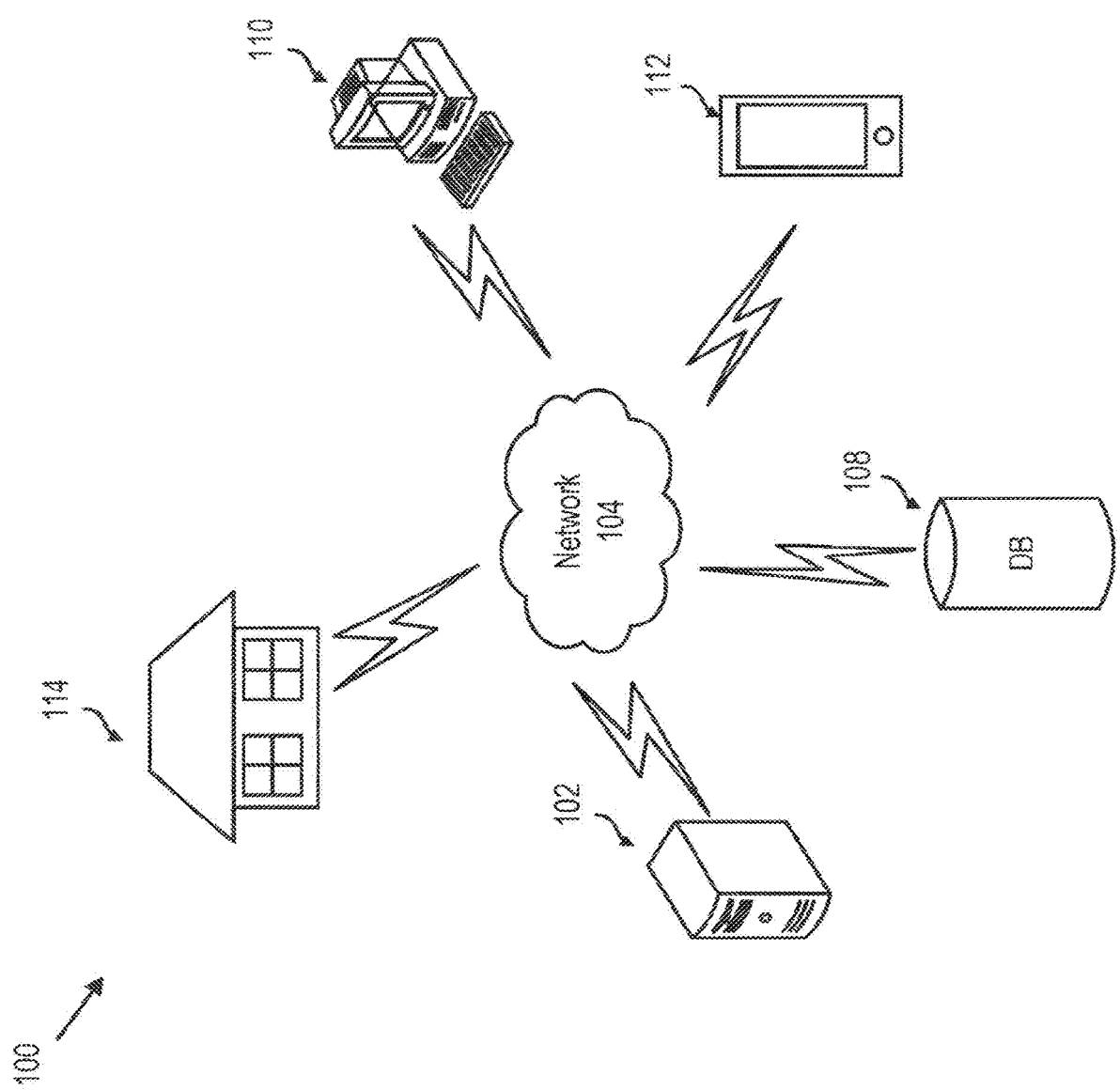
FIG. 1 is a schematic diagram of a smart window control system, according to certain embodiments.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

Aspects of this disclosure are directed to a system, device, and method for controlling smart windows of a building. Smart windows are made of materials that can be easily switched between a transparent state and a state that is opaque. The switching is done by applying an electric voltage to the material, or by performing some other simple, often mechanical, operations. They can be used to regulate the flow of light and radiant heat into or out of a building or other space. The smart windows can include windows that have a controllable electrochromic coating and/or automated venetian blinds.

FIG. 1 is a schematic diagram of a smart window control system 100, according to certain embodiments. The computer 110 represents at least one computer 110 and acts as a client device that is connected to a database 108, a mobile device 112, a server 102, and a building 114 configured with smart windows via a network 104. In some implementations, the computer 110 is used to view current operating conditions and settings of the building 114, such as an amount of shading provided by the windows having the electrochromic coating and/or automated venetian blinds, an amount of natural daylight transmitted through the windows, an amount of artificial light from interior lighting systems within the building 114, projected energy and cost savings associated with the windows, and the like. A user can also input preferences associated with the smart window control system 100 via an interface at the computer 110. For example, the user preferences can include occupancy levels of one or more zones within the building, visual comfort and energy savings priorities, and/or financial metric priorities. Details regarding the user preferences input at the computer 110 are discussed further herein.

In one embodiment the smart window control system includes an artificial lighting system having a first sensor disposed on the exterior of one or more electrochromic smart windows to measure an amount of direct solar radiation, and a second sensor disposed on the exterior of the one or more electrochromic smart windows to measure an amount of diffuse solar radiation. The artificial lighting system is connected with a smart window control device operable to control automatic operations of one or more electrochromic smart windows by varying a voltage applied to a stack of electrochromic coating layers, or artificial lighting systems by modifying a fractional input powder in discrete steps based on trigger points associated with the lighting control strategy and measures of the direct solar radiation and the diffuse solar radiation measured at the one or more electrochromic smart windows by the first and second sensors, respectively, to thereby regulate the flow of radiant heat into the building.

The server 102 represents one or more servers connected to the computer 110, the database 108, the mobile device 112, and the building 114 via the network 104. According to certain embodiments, the server 102 can operate as a controller of the smart window control system 100 and includes processing circuitry that establishes a representative model of one or more building zones, implements a lighting control strategy for the one or more building zones based on the representative model and/or the user preferences, processes received sensor data from one or more illumination sensors installed on an interior and exterior of the building 114, controls automatic operations of the smart windows, cooling systems, and/or artificial lighting systems of the building 114 based on trigger points associated with the lighting control strategy, and determines a performance level of the lighting control strategy for the building zones. By controlling the shading provided by the smart windows of the building 114 along with operations of other building systems such as the cooling and artificial lighting systems, visual comfort of the people within the building 114 can be achieved while increasing an amount energy savings. Throughout the disclosure, the server 102 can be interchangeably referred to as a controller 102. Details regarding the processes performed by the processing circuitry of the server 102 are discussed further herein.

The database 108 represents one or more databases connected to the computer 110, the server 102, the building 114, and the mobile device 112 via the network 104. In some implementations, historical data associated with the smart window control system 100, such as historical weather data associated with a location of the building 114, previously recorded sensor data from interior and exterior illumination sensors, and operation logs for the cooling and artificial lighting systems of the building, can be stored in the database 108. The database 108 can also store the user preferences that have been input at interface screens on the computer 110 and/or mobile device 112.

The building 114 represents one or more buildings configured with controllable smart windows connected to the computer 110, the server 102, the database, 108, and the mobile device 112 via the network 104. The building 114 can include any type of structure with windows that have shading properties that can be controlled by the controller 102, such as a residential building, commercial building, industrial building, or any other type of building.

The smart windows of the building 114 can be electrochromic smart windows that have a coating which preferably has a plurality of layers, such as five layers, about 1 micron thick which is deposited on the glass substrate. The electrochromic stack on the windows may include thin metallic coatings of a metal or metal oxide such as nickel or tungsten oxide sandwiched between two transparent electrical conductors. When voltage is applied between the transparent electrical conductors, a distributed electrical field is set up. This distributed electrical field moves various coloration ions reversibly between the ion storage film through the ion conductor and into the electrochromic film of the windows, which produces an effect where a glazing of the windows switches between a clear and transparent state to tinted state that can include various amounts of shading. The electrochromic windows may operate at low voltage power (0-10 volts DC, preferably 0.5-2V) and remain transparent across a switching range. The electrochromic windows are also able to change optical and thermal properties of window glass due to chemical composition of the coating on the windows. The coating preferably contains one or more thermoplastic plastic layers and/or a thermoset plastic layer. For example, the outermost layer may be a thermoset plastic layer made from a crosslinked polymer such as polycarbonate, acrylic and/or epoxy permanently bonded to the outermost layer metal or metal oxide layer. Based upon a given set of control triggers, electrochromic glass can exhibit a wide range of thermal (solar heat gain coefficient) and optical ($V_t$) properties that can produce improved operations of the glass and thus result into more overall energy savings. Table 1 shows characteristics of electrochromic smart window for both an ON and an OFF state:

TABLE 1

| State of Glass | Visible Transmission (%) | Solar Transmission (%) | SHGC | U-value ($W/m^2 \cdot K$) |
|---|---|---|---|---|
| ON State (Bleached) | 75 | 64 | 0.73 | 2.4 |
| OFF State (Colored) | 13 | 11 | 0.11 | |

In addition, the smart windows can be configured with controllable blinds, such as automated venetian blinds in order to control solar gain and glare in the building 114. The lighting control strategies adjust blinds on the basis of climatic criteria. Depending on the season, solar radiation that causes heat is either blocked or let in. Illumination and/or heat sensors may be placed near the windows to measure an amount of radiation falling on the windows. The sensors are linked to the controller 102 via the network 104, and the controller 102 can issue control signals to modify an amount of shading provided by the blinds. Table 2 shows the characteristics of automated venetian blinds for both fully closed and fully open positions.

TABLE 2

| State of blinds | Visible Transmission (%) | Solar Transmission (%) | Solar Heat gain coefficient |
|---|---|---|---|
| Closed | 8 | 9 | 0.15 |
| Open | 80 | 76 | 0.78 |

The controller 102 applies a lighting control strategy, such as a daylight control strategy, a glare control strategy, or a solar control strategy to the smart windows that address physical and visual comfort for a space as well as energy savings. For example, in an office building where occupant productivity is valued, the lighting control strategies are employed to provide a visually comfortable work space while still achieving energy savings. Details regarding the lighting control strategies are discussed further herein. In other implementations, the building 114 may not have smart windows but may have controllable systems, such as lighting and cooling systems, that can be modified based on an amount of light that is transmitted through the windows in order to maintain a comfortable environment within the building.

The mobile device 112 represents one or more mobile devices connected to the computer 110, the server 102, the building 114, and the database 108 via the network 104. The network 104 represents one or more networks, such as the Internet, connecting the computer 110, the server 102, the database 108, the building 114, and the mobile device 112. The network 104 can also communicate via wireless networks such as WI-FI, BLUETOOTH, cellular networks including EDGE, 3G and 4G wireless cellular systems, or any other wireless form of communication that is known.

As would be understood by one of ordinary skill in the art, based on the teachings herein, the mobile device 112 or any other external device could also be used in the same manner as the computer 110 to input and view the reliability level and other performance specifications for the smart window control system 100. In addition, the computer 110 and mobile device 112 can be referred to interchangeably throughout the disclosure and can also be referred to as an external device. Details regarding the processes performed by the smart window control system 100 are discussed further herein.

According to certain embodiments, building energy simulation may be important for studying the energy flow in buildings. Building simulation programs can be effective analytical tools for constructing the building models which can used for building the energy research and evaluation of architectural design. For example, DesignBuilder, DOE-2, EnergyPlus, ENER-WIN, ECOTECT, PC-Blast, Energy Quest, BSim, Energy Express, TRACE, and TRNSYS are a few of the simulation tools currently used to perform energy analysis of buildings. For example, DesignBuilder software or any other type of executable building simulation program may be used to carry out the energy and visual comfort analysis of a typical office building with features that allow complex buildings to be modeled rapidly as described in D. B. Crawley, "Contrasting the Capabilities of Building Energy Performance Simulation Programs," US Department of Energy, Washington, D.C., USA, 2005, the entire contents of which is incorporated herein by reference. The building simulation program may use a latest EnergyPlus simulation engine to calculate the energy and visual performance by assessing building designs. The EnergyPlus detailed daylighting module calculates interior daylighting illuminance and glare index and offers the freedom of using glare control and electric lighting controls to calculate the reduction in the artificial lighting consumption for the heat balance module. The building simulation program provides an interface for the calculation of parameters which are used to assess the visual comfort such as Daylight Factor (DF), glare index and modeling of automated interior shading control. Determining the glare index at a reference point may be based on equation (1), as described in http://www.designbuilder.co.uk/, $$G = \frac{L_W^{1.6} \Omega^{0.8}}{L_b + 0.7\omega^{0.5} L_W} \quad (1)$$

where G=discomfort glare index; $L_w$=average luminance of the window as seen from the reference point (cd/m$^2$); $\Omega$=angle subtended by window; $L_b$=luminance of the background area surrounding a wall (cd/m$^2$); $\omega$=angle subtended by element in the window. In addition, the daylight factor (DF) is calculated based on equation (2) as described in http://www.designbuilder.co.uk/, $$DF = \frac{E_i}{E_o} \times 100\% \quad (2)$$

where $E_i$=illuminance due to daylight at a point on an indoor working plane (lux); and $E_o$=simultaneous outdoor illuminance on a horizontal plane from an unobstructed hemisphere of overcast sky (lux).

Figure 2:
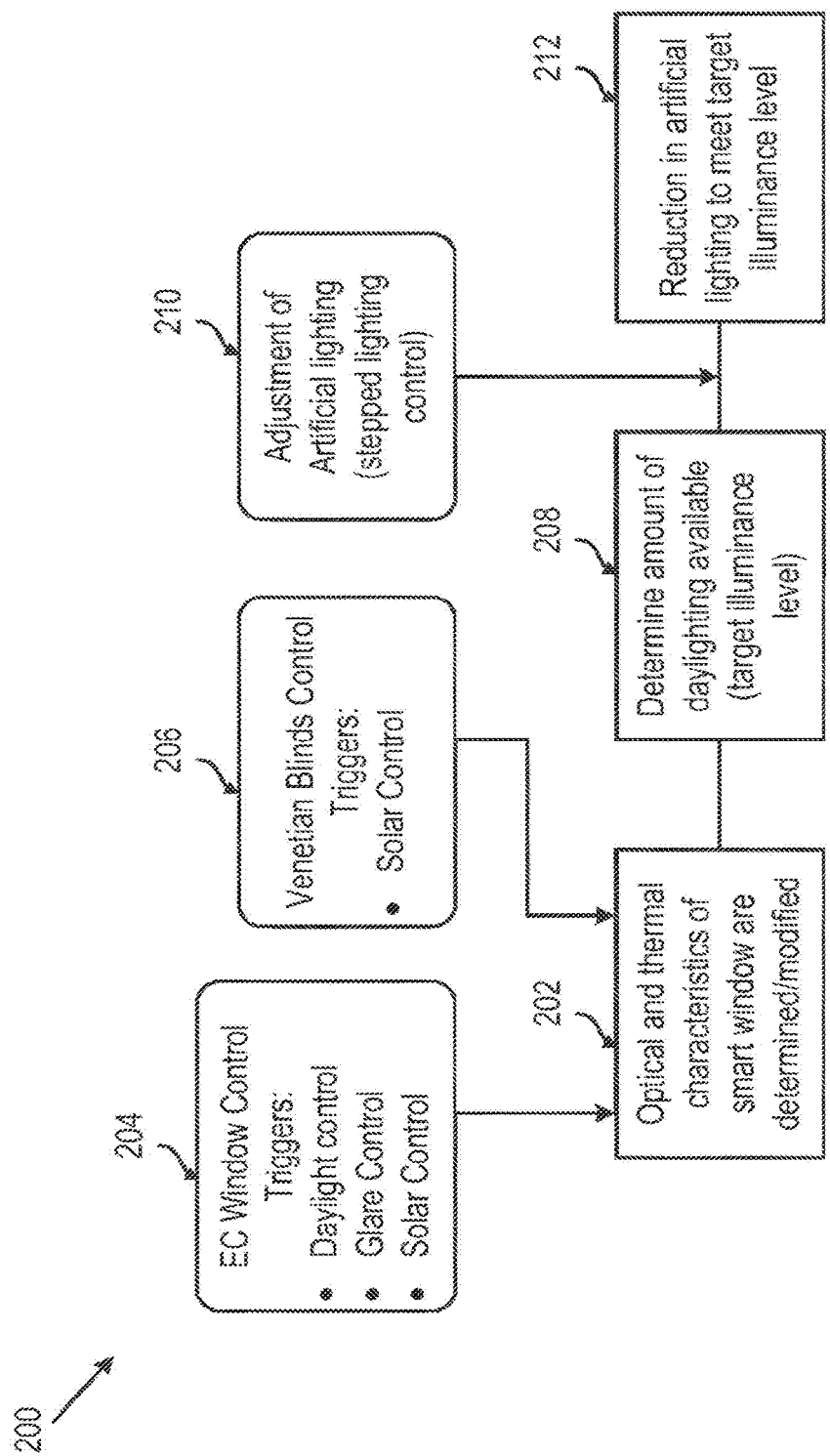
FIG. 2 is an exemplary block diagram illustrating functionality of a smart window control system, according to certain embodiments.

FIG. 2 is an exemplary block diagram 200 illustrating functionality of the smart window control system 100, according to certain embodiments. The processing circuitry of the controller 102 can execute one or more processes associated with controlling an operating voltage of electrochromic windows to modify an amount of shading provided by the windows in order to allow a predetermined amount of daylight to enter the building through the windows. The controller 102 can also control an amount of shading provided by automated blinds that are installed on an interior surface of the windows.

At block 202, optical and thermal characteristics of the smart windows are determined and/or modified. Electrochromic smart windows are made of electro-powered glass, which alters transparency as a variable voltage is applied. The application of the voltage to the electrochromic smart windows can be managed manually or automatically. The manual mode allows the electrical power to be switched on/off, corresponding to a tinted/clear state of glass. In some implementations, the manual mode can also include multiple voltages that correspond to varied amounts of tinting. To automate the operation of the electrochromic smart windows, the controller 102 monitors received sensor data from one or more exterior and/or interior sensors and modifies the tinting of the electrochromic windows based on the sensor data. Exterior triggers can be based on received sensor data from exterior illumination and/or heat sensors installed on an exterior surface of the windows and can include solar incidence on the glazing surface. Interior triggers can be based on received sensor data from interior illumination and/or heat sensors installed inside the building and include a daylighting level and glare index at daylight sensor.

Block 204 shows three lighting control strategies associated with the exterior and interior control triggers for the electrochromic windows. For example, a daylight control strategy uses daylighting illumination as a valid control trigger for the electrochromic smart windows. Illumination sensors that can include photodiode sensors can detect an amount of lighting inside the building. The transmittance of the glazing on the windows can be modified to just meet a daylight illuminance set point at one or more of the daylighting interior illumination sensors. With a solar control strategy, shading is applied to the windows when a beam plus diffuse solar radiation incident on the window exceeds a predetermined radiation set point value. With a glare control strategy, the transmittance of the glazing on the windows can be modified when a total daylight glare index for a building zone from all of the exterior windows in the zone exceeds a predetermined glare index threshold in the daylighting input for zone. As shown in block 206, in some implementations, automated venetian blinds can be controlled via the solar control strategy.

At block 208, a target illuminance for each of the building zones is determined, which corresponds to a total amount of illumination from both natural (e.g., daylight) and artificial (e.g., lighting systems) lighting sources. In one implementation, the target illuminance for the zones of the building 114 is 500 Lux. In other implementations, each zone can have an assigned target illuminance based on a functionality associated with the zone. For example, hallways and stairways of a building may have a lower target illuminance than general work spaces of the building 114.

At block 210, the controller 102 issues control signals to modify an amount of artificial lighting provided by the lighting systems of the building 114. In some implementations, interior illuminance sensors detect the daylight entering the building 114 through the windows, and the controller 102 issues a control signal to modify the fractional input power of artificial lighting in discrete steps. At block 212, the amount of lighting provided by the artificial lighting system is reduced (or increased) to meet the target illuminance level.

Figure 3:
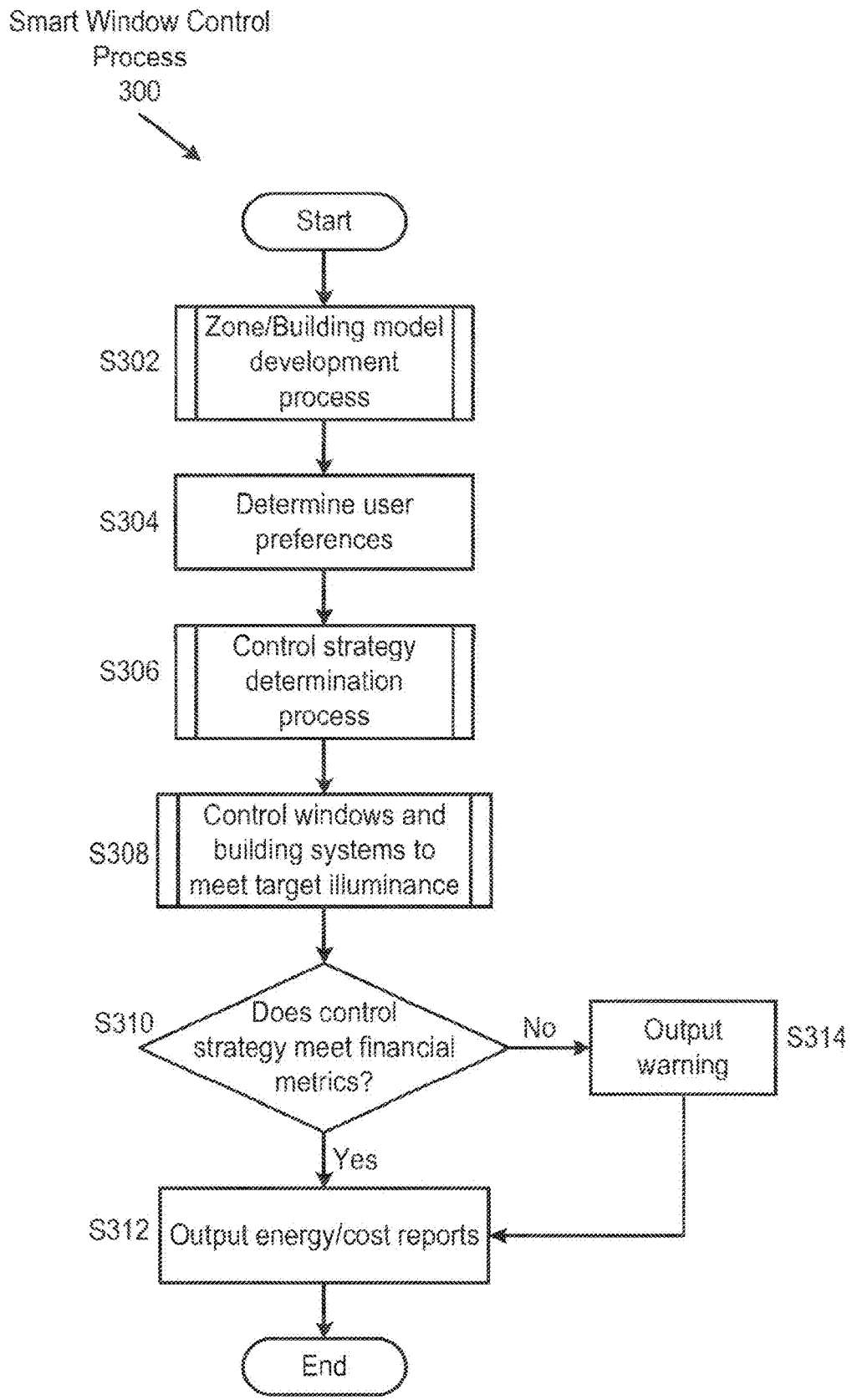
FIG. 3 is an exemplary flowchart of a smart window control process, according to certain embodiments.

FIG. 3 is an exemplary flowchart of a smart window control process 300, according to certain embodiments. The smart window control process 300 can be applied to the building 114 having electrochromic windows and/or automated venetian blinds.

At step S302, the processing circuitry of the controller 302 performs a zone/building model development process. The zone/building model development process includes dividing the building into zones, determining construction characteristics of the zones, determining properties of the windows of the building 114, and generating a profile for each of the zones of the building 114. The controller 102 can also identify exterior and interior sensors associated with each of the zones and determine an impact factor for the sensors based on one or more criteria. Details regarding the zone/building development process are discussed further herein.

At step S304, user preferences for the smart window control system 100 are determined. In some implementations, the processing circuitry of the controller 102 determines the user preferences based on inputs made by the users at one or more interface screens at the computer 110 and/or mobile device 112. For example, the interface screens allow users to input data associated with how the zones of the building are used, such as occupancy levels at different times of day, week, and year and functions of the zones. Users can also input target temperatures for the cooling systems, target illuminance levels for the artificial lighting and/or daylight entering through the windows, and other parameters associated with building systems. The user can also input data related to priorities of visual comfort and/or energy savings with respect to each of the zones of the building as well as financial goals and/or metrics associated with the building. For example, the financial metrics can include a desired payback period for one or more building components that can be achieved through operating the systems of smart windows and other systems of the building 114 in an energy-efficient manner. In some implementations, the processing circuitry of the controller 102 can automatically determine default values for the user preferences based on learned trends from historical data of operating parameters for buildings of similar size, function, and the like. In addition, the processing circuitry of the controller 102 uses the user preferences to determine which lighting control strategy to implement.

Figure 4:
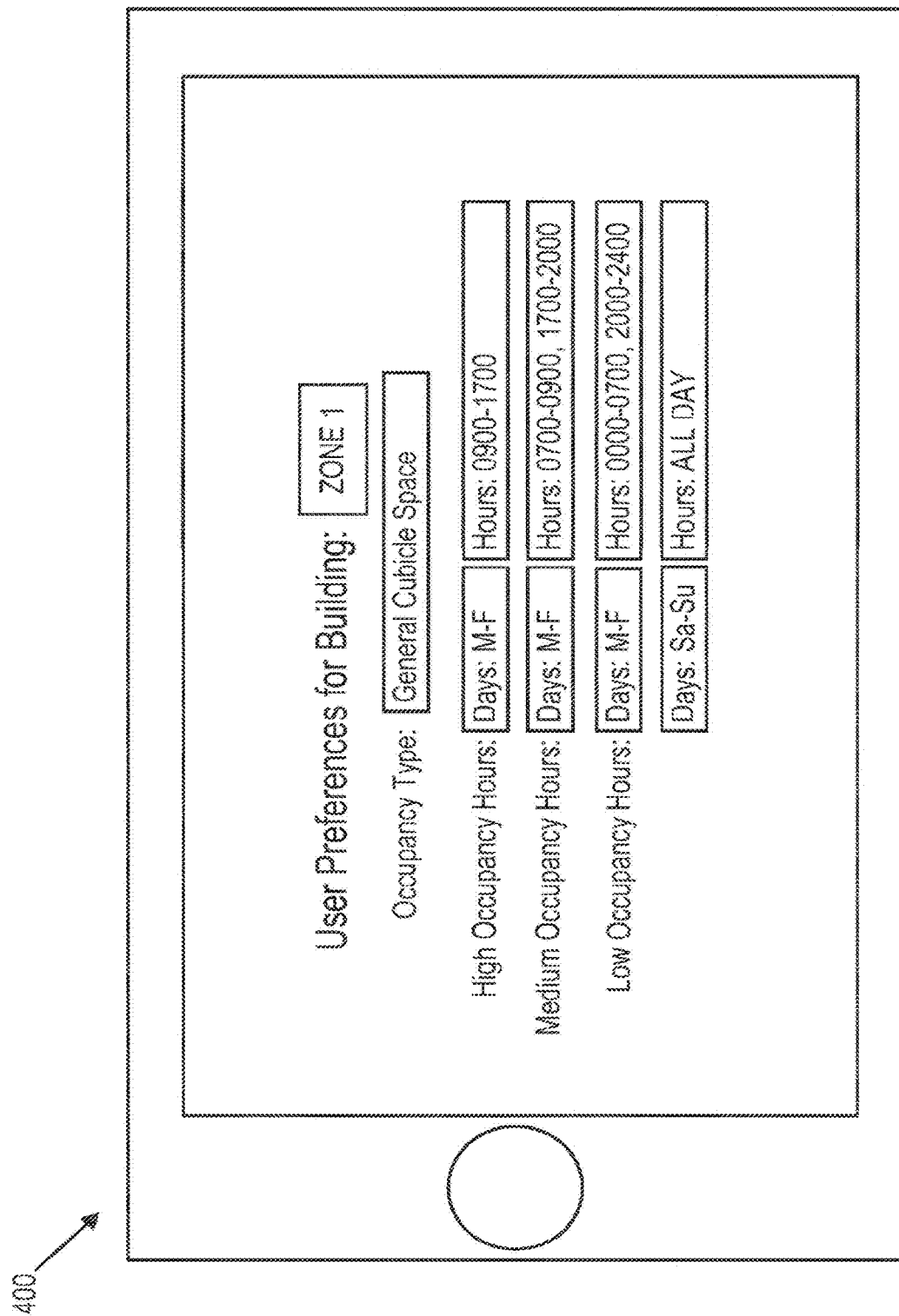
FIG. 4 is an exemplary illustration of user preference interface screen, according to certain embodiments.
Figure 5:
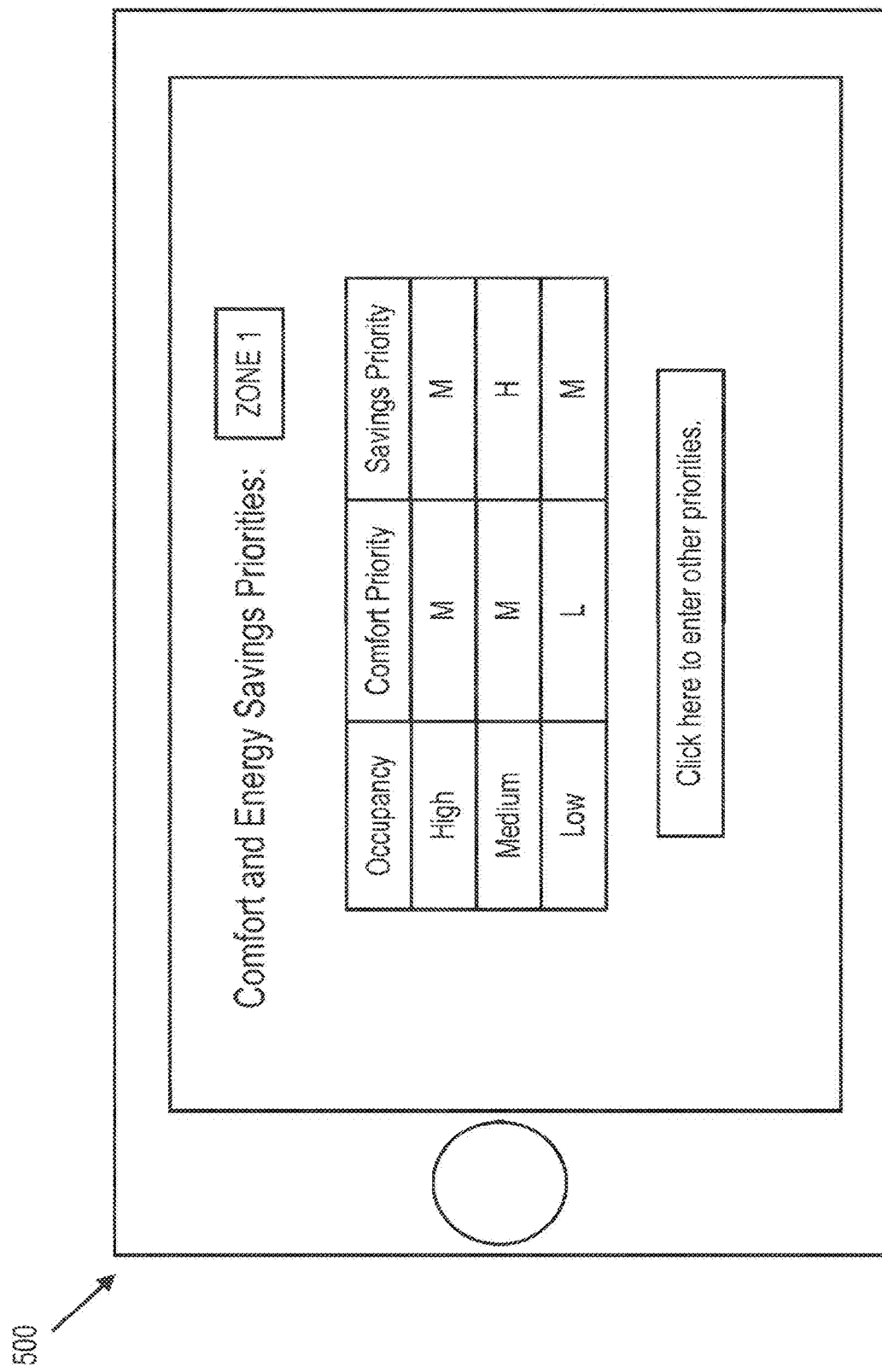
FIG. 5 is an exemplary illustration of a priorities interface screen, according to certain embodiments.

FIGS. 4 and 5 are exemplary illustrations of user preference input interface screens, according to certain embodiments. FIG. 4 is an exemplary illustration of user preference interface screen 400 that includes input fields for zone, occupancy type for the zone, and days and hours of various occupancy levels for the zone. For example, the occupancy type of Zone 1 of the building is a "general cubicle space," which can be one occupancy type from a group of possible selections. In some implementations, the occupancy type has an effect on how the smart windows are operated. For example, smart windows of zones that have an occupancy type of "executive suite" may be operated with a higher priority given to visual comfort than to energy savings, and the "general cubicle space" occupancy type may result in equal weightings of energy savings and visual comfort.

The occupancy level input for the zones can be based on an average number of people that occupy the zone for a period of time, and the controller 102 can determine a relative importance of energy savings and visual comfort based on the occupancy level of each of the zones. For example, at times where the occupancy level for the zone is high, the visual comfort may be prioritized higher than energy savings. In addition, at times when the occupancy level for the zone is low, energy savings may be given a higher priority than visual comfort.

In one implementation, the occupancy levels may be associated with three levels (low, medium, and high), but greater or fewer numbers of levels can also be used. For the user preference interface screen 400, the user has indicated that Zone 1 experiences a high occupancy level on Monday through Friday from 0900 to 1700, a medium occupancy level on Monday through Friday from 0700 to 0900 and 2000 to 2400, and a low occupancy level at all other hours of the week. In other implementations, the user preference interface screen 400 can also include input fields for occupancy level based on month, season, or any other time of year. In some implementations, the processing circuitry of the controller 102 can determine the occupancy level of the building based on sensor data received from installed video cameras and/or motion sensors within each of the zones of the building 114. For example, the processing circuitry can determine a population density in each zone based on a number of people detected in images obtained by the installed cameras.

FIG. 5 is an exemplary illustration of a priorities interface screen 500, which is another type of user interface screen where a user indicates a relative importance of energy savings, visual comfort, and/or other priorities with respect to the building zones. The priorities interface screen 500 includes input fields for zone, occupancy level, comfort priority level, and savings priority level. In one implementation, for Zone 1, the user selects priority levels for each occupancy level. For example, for a high occupancy level, the user indicates that comfort and energy savings both have a medium (M) priority. For a medium occupancy level, the user indicates that comfort has a medium priority and savings has a high (H) priority. For a low occupancy level, the user indicates that comfort has a low priority and energy savings has a medium priority.

In certain embodiments, the user can input other types of priorities at the priorities interface screen. For example, the user can input comfort and energy savings priorities associated with occupancy type as well as priorities associated with other building systems. For example, desired temperature, humidity, ventilation rate, and glare index threshold can be input at the priorities interface screen 500. In some implementations, the processing circuitry of the controller 102 can automatically determine default values for comfort and energy savings priorities based on learned trends from historical data of operating parameters for buildings of similar size, function, previously input preferences, and the like.

Referring back to FIG. 3, at step S306, the processing circuitry of the controller 102 performs a control strategy determination process. The control strategy determination process includes determining a comfort score and an energy savings score for each of the zones based on user preferences, building/zone profiles, and current environmental conditions. Based on the comfort score and energy savings score, the processing circuitry of the controller 102 determines whether to implement the daylight control strategy, the glare control strategy, or the solar control strategy. Details regarding the control strategy determination process are discussed further herein.

At step S308, the controller 102 controls the smart windows of the building as well as other building systems to meet a target illuminance value. The processing circuitry of the controller 102 determines a target illuminance value, determines a control trigger and operating points based on the light control strategy, modifies the properties of the smart windows in accordance with the lighting control strategy, and controls artificial lighting systems to compensate for an illumination deficit. Details regarding the control of the smart windows and other building systems are discussed further herein.

At step S310, the processing circuitry of the controller 102 determines whether operating the smart windows of the building 114 with a current control strategy will result in one or more financial metrics being met, which can be indicative of a performance level of the smart window control system 100. In some implementations, the financial metrics can include a predetermined amount of cost savings over predetermined period of time, or a predetermined simple payback period associated with operating one or more building components. In one example, the processing circuitry of the controller 102 can access financial records associated with the building 114 from the database 108 and can determine the financial metrics based on the records. For example, the controller 102 can use the stored financial records that indicate one or more financial health attributes associated with the building such as outstanding debts and current debt repayment rate, current energy costs, and price associated with the one or more building components to determine the payback period. In addition, the user can input a desired payback period at the user preference input screen 400.

Simple payback period may be based on the initial costs, i.e. incremental initial investment cost and incremental first year utility savings. Simple payback period (SPP) can be used to measure cost effectiveness and can be determined by dividing the cost of implementing the energy conservation opportunities and/or operating other building systems with the annual energy savings. Table 3 shows the electricity tariff in the Kingdom of Saudi Arabia issued by Saudi Electric Company to different sectors of buildings. The energy associated with cooling the building as well as providing artificial lighting is provided in the form of electricity.

TABLE 3

| Electricity in kWh | Residential and Commercial tariff in Halala/kWh | Industrial tariff in Halala/kWh |
| --- | --- | --- |
| 1-1000 | 5 | 12 |
| 1001-2000 | 5 | 12 |
| 2001-3000 | 10 | 12 |
| 3001-4000 | 10 | 12 |
| 4001-5000 | 12 | 12 |
| 5001-6000 | 12 | 12 |
| 6001-7000 | 15 | 12 |
| 7001-8000 | 20 | 12 |
| 8001-9000 | 24 | 12 |
| 9001-10000 | 28 | 12 |
| Over 10000 | 30 | 12 |

An initial glass cost can be determined per square meter of glass. For example, a cost of double Low E and electrochromic glass used in one implementation is shown in Table 4. Also, the glass cost of electrochromic glass is shown at a market value.

TABLE 4

| Specification | Double low E glass | EC glass |
| --- | --- | --- |
| Glass cost + Installation ($/m²) | 140 | 217 |
| Controls and wirings | — | 33 |
| Total cost ($/m²) | 140 | 250 |

Simple payback period is calculated for all the energy conservation opportunities and/or building system components. In one example, the cost of electrochromic smart glass and associated circuitry is approximately 900 SAR/m². In addition, the cost of electricity is based on the data received from the Saudi Arabia electricity tariff issued by Saudi Electricity Company. From the data it can be determined that 0.3 Halala/kWh tariff is being paid for office buildings. Table 5 shows the simple payback period calculations for various energy conservation implementations and also shows whether the visual comfort criteria is met for each of the implementations. From the analysis it is found that by using electrochromic smart window with the daylight control strategy, large amounts of energy can be saved but without satisfying the visual comfort criteria. When the glare control strategy is used, 17% of building energy consumption can be saved with a payback period of 6.37 years.

In certain embodiments, it is found that the service life of electrochromic smart windows is greater than 20 years. Because of the high cost of electrochromic smart windows, in some implementations, the electrochromic smart windows may be installed on just one side of the building in order to improve the payback period. For example, energy savings recorded for both lighting energy consumption and cooling energy consumption are highest when the electrochromic smart windows are installed in the south orientation as will be discussed further herein. The absolute difference between the cost of the electrochromic smart windows and double low-E glass windows can be used to determine the cost of installation of the smart windows, which is approximately 450 SAR/m² according to one implementation. In addition, an estimated market cost of automated venetian blinds may be approximately $125/m².

TABLE 5

| Energy conservation measure | Lighting energy savings (KWhr) | Cooling energy savings (KWhr) | Total energy savings (KWhr) | Visual comfort | Area (m²) | Cost of installation (SAR) | Cost of energy savings (SAR) | Simple payback period (Years) |
| --- | --- | --- | --- | --- | --- | --- | --- | --- |
| EC window with daylight control | 251,236 | 511,718 | 647,974 | Not Achieved | 2,232 | 1,004,400 | 194,392 | 5.16 |
| EC window with glare control | 199,196 | 585,397 | 524,839 | Achieved | 2,232 | 1,004,400 | 157,452 | 6.37 |

TABLE 5-continued

| Energy conservation measure | Lighting energy savings (KWhr) | Cooling energy savings (KWhr) | Total energy savings (KWhr) | Visual comfort | Area (m$^2$) | Cost of installation (SAR) | Cost of energy savings (SAR) | Simple payback period (Years) |
|---|---|---|---|---|---|---|---|---|
| EC window with solar control | 232,210 | 540,247 | 559,565 | Achieved | 2,232 | 1,004,400 | 167,870 | 5.98 |
| EC window with glare control (North) | 46,145 | 84,782 | 134,093 | Achieved | 693 | 311,850 | 40,228 | 7.75 |
| EC window with glare control (East) | 45,540 | 75,698 | 130,921 | Achieved | 423 | 190,350 | 39,277 | 4.84 |
| EC window with glare control (South) | 75,940 | 147,359 | 231,564 | Achieved | 693 | 311,850 | 69,470 | 4.48 |
| EC window with glare control (West) | 39,888 | 93,260 | 139,573 | Achieved | 423 | 190,350 | 41,872 | 4.54 |
| EC window with solar control (North) | 73,074 | 60,559 | 135,536 | Achieved | 693 | 311,850 | 40,661 | 7.66 |
| EC window with solar control in (East) | 55,109 | 80,745 | 144,187 | Achieved | 423 | 190,350 | 43,257 | 4.4 |
| EC window with solar control in (South) | 80,421 | 143,725 | 237,043 | Achieved | 693 | 311,850 | 71,113 | 4.38 |
| EC window with solar control in (West) | 53,614 | 85,185 | 143,898 | Achieved | 423 | 190,350 | 43,170 | 4.4 |
| Automated venetian blind with solar controller | 185,712 | 345,183 | 454,095 | Achieved | 2,232 | 1,046,250 | 136,229 | 7.6 |

If the processing circuitry of the controller 102 determines that the one or more financial metrics are projected to be met with the current control strategy, resulting in a "yes" at step S310, then step S312 is performed. Otherwise, if the processing circuitry of the controller 102 determines that the one or more financial metrics are not projected to be met with the current control strategy, resulting in a "no" at step S310, then step S314 is performed.

At step S312, energy and/or cost reports associated with operation of the smart windows are output to the external device. The energy and costs reports can include operation logs that indicate whether predetermined visual comfort criteria are achieved, sensor data associated with each of the building zones, energy savings data, financial metric data, and the like.

Figure 6:
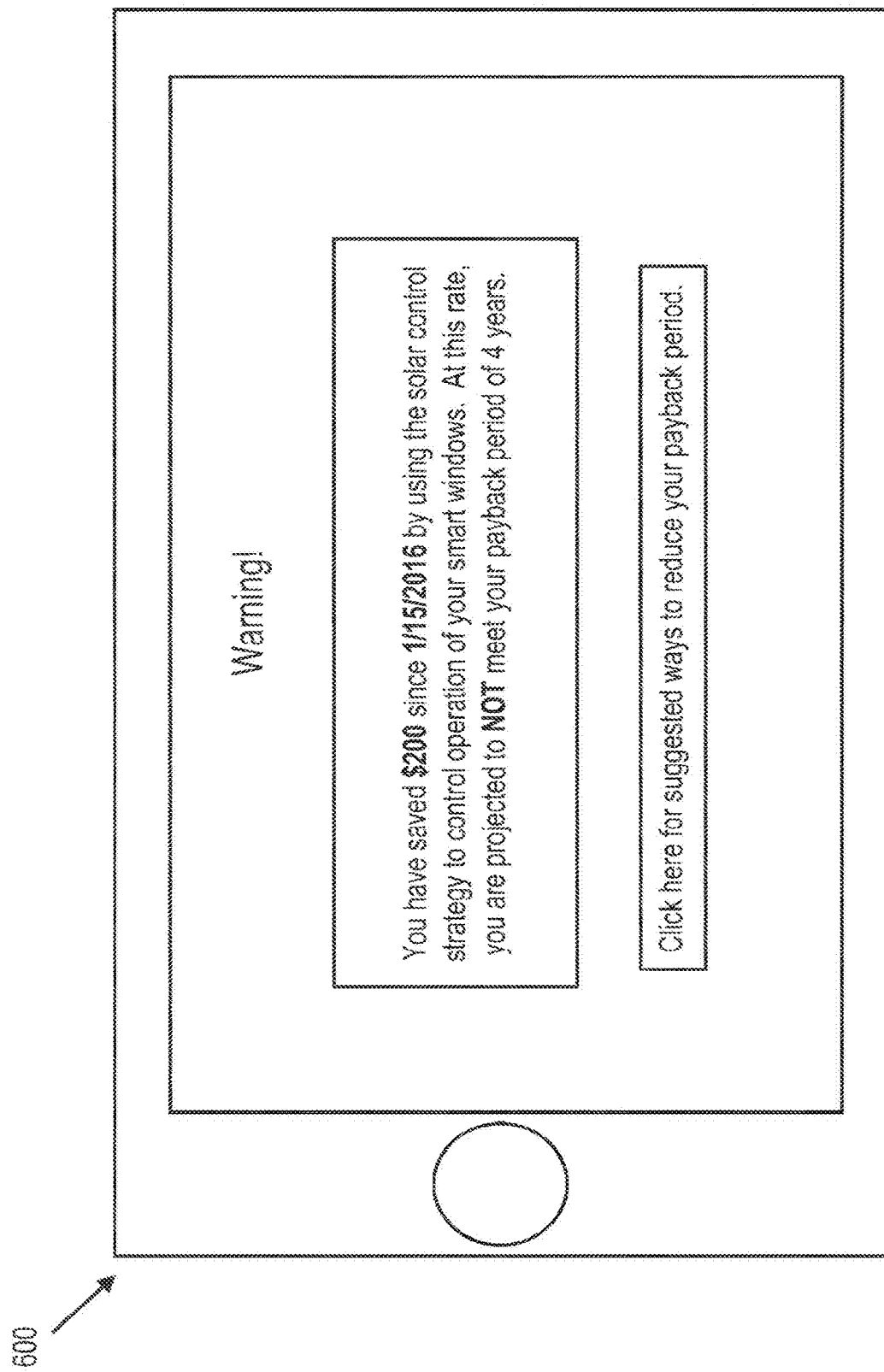
FIG. 6 is an exemplary illustration of a warning interface screen, according to certain embodiments.

At step S314, the controller 102 outputs a warning notification to an interface screen of the external device to warn the user that operating with the current control strategy and the current user preferences may result in one or more financial metrics not being met within a predetermined period of time. For example, FIG. 6 is an exemplary illustration of a warning interface screen 600, according to certain embodiments. The warning interface screen 600 is output to the computer 110 and/or mobile device 112 and indicates to the user how much money has been saved over a predetermined period of time and that a payback period of four years is not projected to be met based on current preferences and operation set points. The processing circuitry of the controller 102 can determine modified operation set points for each of the control strategies that allow the payback period or any other financial metric to be met, which can also be shown at the warning interface screen 600. In one implementation, the controller 102 may modify the lighting control strategy and/or associated operational set points to achieve the predetermined financial criteria without input from the user.

Figure 7:
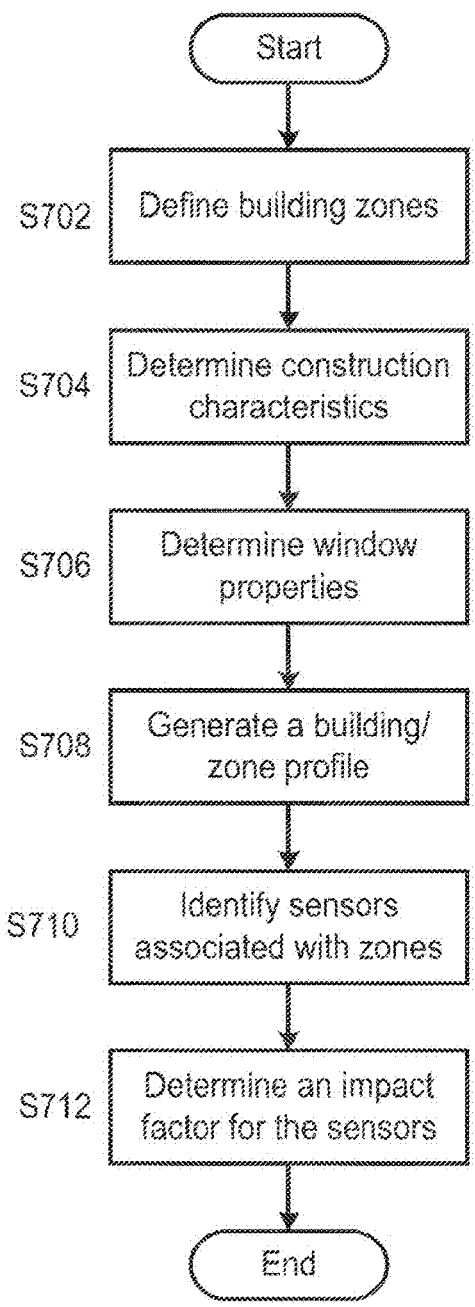
FIG. 7 is an exemplary flowchart of a zone/building model development process, according to certain embodiments.

FIG. 7 is an exemplary flowchart of a zone/building model development process 700, according to certain embodiments. The zone/building model development process is one implementation of step S302 of the smart window control process 300.

In one implementation, the building 114 can be a typical office building that can be modeled with defining characteristics that are based on previously conducted surveys and studies as described in N. T. Al-Ashwal, I. M. Ismail M. Budaiwi, "Energy savings due to daylight and artificial lighting integration in office buildings in hot climate," *Int. J. Energy Environ.* 2 (6) (2011) 999-1012, the entire contents of which is incorporated herein by reference. In one implementation described by N. T. Al-Ashwal, I. M. Ismail M. Budaiwi, "Energy savings due to daylight and artificial lighting integration in office buildings in hot climate," *Int. J. Energy Environ.* 2 (6) (2011) 999-1012, an average floor area for a typical office building is in a range of 300-800 m$^2$, with rectangular building geometry. Based on survey results, the total floor area of the building model can be assumed to be 800 m$^2$ with floor-floor height of 3.7 m. In addition, based on a golden ratio rule, the dimensions for the building are set at 36 m in length and 22 m in width. In one implementation, the office model can be assumed to be in a North/South orientation because of the flow of a high amount of daylight through the North/South orientation and keeping in mind the advantages of passive solar heating during the winter as described in A. Roetzel, A. Tsangrassoulis, U. Dietrich, "Impact of building design and occupancy on office comfort and energy performance in different climates," *Build. Environ.* 71 (2014) 165-175, the entire contents of which is incorporated herein by reference. Based on the ASHRAE 90.1-2010 standard, the window-to-wall ratio (WWR) for the office building model can be assumed to be 50%. The office building model also assumes eleven floors with the same office function throughout all zones of the building.

At step S702, the processing circuitry of the controller 102 defines one or more zones within the building 114. In some implementations, the processing circuitry of the controller 102 is configured to define the building zones based on a layout of the building systems, such as heating/cooling systems or lighting systems. For example, the zones may be defined based on areas controlled by particular thermostat units or light switch panels. The zones may also be defined so that each zone around a periphery of the building 114 includes an equal window area or window-to-wall ratio (WWR). In addition, the building 114 may be defined as a single zone.

Figure 8:
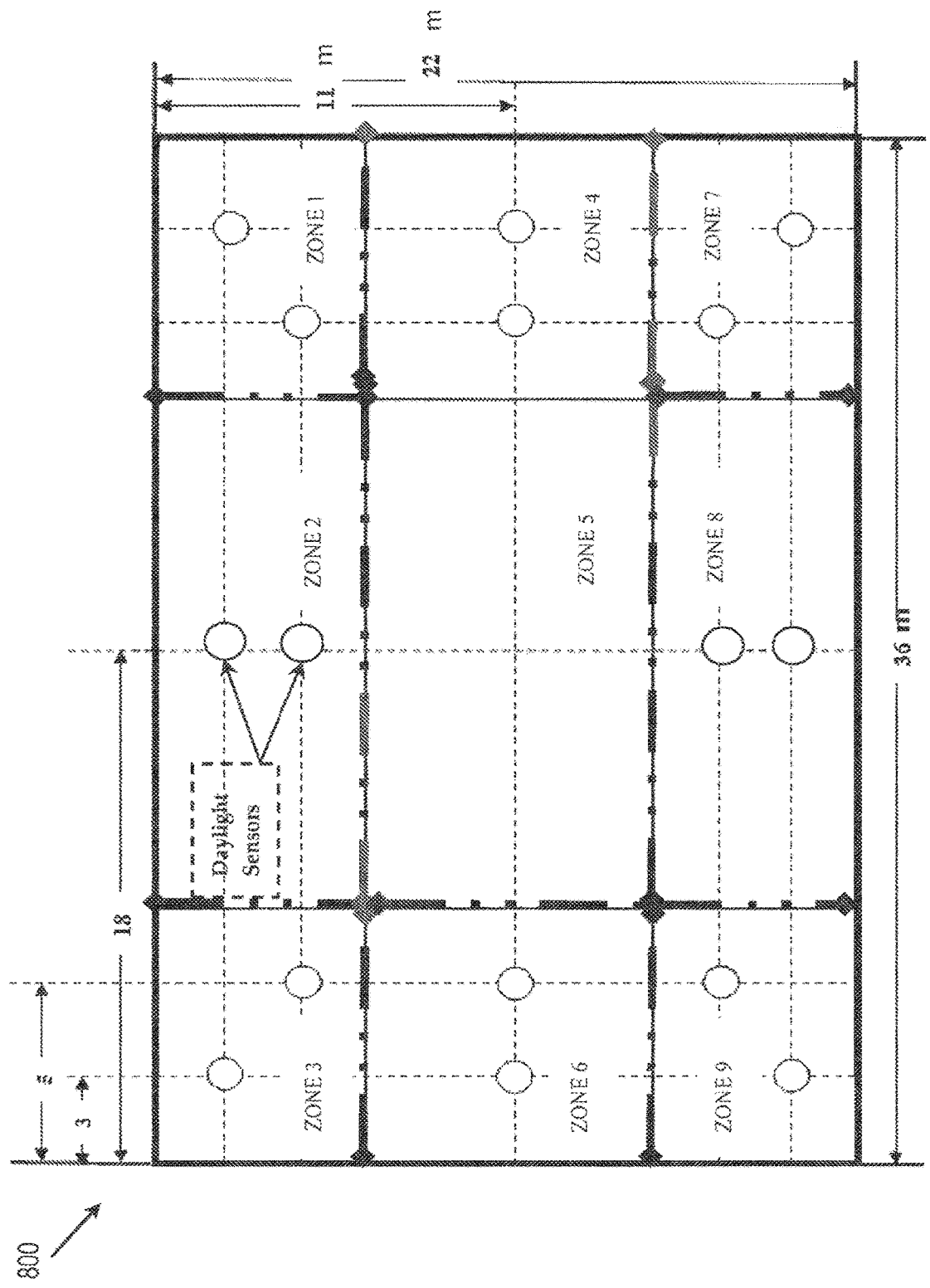
FIG. 8 is an exemplary illustration of a building model, according to certain embodiments.

FIG. 8 is an exemplary illustration of a building model 800 that includes nine building zones, according to certain embodiments. In some implementations, Zones 1-4 and 6-8 are classified as perimeter zones due to their positions around the perimeter of the building and have windows to illuminate the zones, and Zone 5 is classified as a core zone, which does not have any windows to illuminate the zone. In addition, each of the perimeter zones is configured with two sensors, which are daylight sensors according to one example. The daylight sensors may be illumination sensors such as photodiode sensors that detect an amount of light inside the building 114. In other implementations, the zones are configured with more than two daylight sensors per zone that are positioned at predetermined locations that are able to detect light entering the building 114 through the windows at various times throughout the day. Illumination sensors can also be placed on an exterior surface of the building 114 and/or windows to detect an amount of outside brightness. The zones can also be configured with exterior and interior thermo sensors (e.g., thermocouples, RTD) that are able to detect heat.

Each floor in the model 800 can be divided into nine zones with two lighting control sensors for each zone. In some implementations, each sensor has the ability to measure the daylight up to a span of 7 m in length along a perimeter wall. In one implementation, the sensors can be mounted in the ceiling with the first sensor placed 3 m away from the perimeter wall coupled to the current source and with a variable conductance corresponding to light flux. The artificial lighting units in a particular zone can be dimmed to a maximum of 70% by means of a light sensor depending on an availability of the daylight. A second sensor is mounted 5 m away from the perimeter wall, and the artificial lighting units can be dimmed by 30% for each zone. The floor plan of the model 800 with zonal distribution and the location of the light control sensors are shown in FIG. 8. In some implementations, no sensors are used to control the artificial lighting in zone 5, which can be referred to as a core zone because an availability of daylight may be insignificant for that zone. Operating characteristics of the HVAC system of the model under study can be determined based on common practices in hot regions as described in N. T. Al-Ashwal, I. M. Ismail M. Budaiwi, "Energy savings due to daylight and artificial lighting integration in office buildings in hot climate," *Int. J. Energy Environ.* 2 (6) (2011) 999-1012 and M. A. Najid, "The Impact of HVAC System Operation and Selection on Energy Efficiency in Office Buildings in Hot Climates (MS dissertation)," Building Environmental Control System Program, Department of Architectural Engineering, King Fand University of Petroleum and Minerals, Saudi Arabia, 2010, the entire contents of which is incorporated herein by reference.

Referring back to FIG. 7, at step S704, construction characteristics for the building zones are determined. The controller 102 can access the construction characteristics associated the construction characteristics of the building from the database 108 and determine the construction characteristics for each of the zones based on how the zones are divided within the building 114. For example, FIG. 9 is a table of exemplary construction properties 900, according to certain embodiments. The physical and thermal characteristics of the exterior wall, roof and ground floor, which are used in the development of the model are shown.

In addition, M. S. Al-Homoud, "Optimum thermal design of office buildings," *Int. J. Energy Res.* 21 (1997) 941-957, the entire contents of which is incorporated herein by reference, describes an HVAC system design with a highest performance for different buildings located in hot climate conditions. In certain embodiments, a variable air volume (VAV) system was more reliable and efficient for controlling the perimeter zones where there were continuous variations in solar load and outside temperature. The VAV system reduces the air flow rates in the perimeter of the building and consequently lowers the energy consumption as described in G. Shim, L. Song, G. Wang, "Comparison of different fan control strategies on variable air volume systems through simulations and experiments," *Build. Environ.* 72 (2014) 212-222, the entire contents of which is incorporated herein by reference. In one implementation, a VAV system is used to cool the zones in the perimeter area, whereas a constant air volume (CAV) system is used for the core zone (zone 5). In addition, the supply temperature at the diffuser and ventilation rate was set according to ASHRAE 90.1-2010 standards. For example, in some aspects, the supply temperature is 14° C. and the ventilation rate is 0.008 $m^3$/s/person, which is based on the number of persons and the area to be ventilated for each zone. The illumination level for the office area (perimeter zones) is set to 500 lux based on IESNA 2011 lighting standard as described in J. Sanjog, P. Patel, S. Karmakar, "Indoor physical work environment: an ergonomics perspective," *Int. J. Sci. Eng. Technol. Res.* 2 (3) (2013) 2278-7798, the entire contents of which is incorporated herein by reference. However, for the core zone, the illumination level is set at 300 lux because the core zone includes a staircase and mechanical room which may use a lower light level than the light level prescribed in the lighting standards. In some implementations, triphosphor fluorescent lamps are used to provide the predetermined illumination level in the office building model in every zone as described in B.-L. Ahn, C.-Y. Jang, S.-B. Leigh, S. Yoo, H. Jeong, "Effect of LED lighting on the cooling and heating loads in office buildings," *Appl. Energy* 113 (2014)1484-1489, the entire contents of which is incorporated herein by reference. The display lighting power density of the fluorescent lamp was set at 2.4 W/m2-100 lux based on ASHRAE90.1-2010 and the luminaries are recessed into the ceiling.

Referring back to FIG. 7, at step S706, properties of the windows in the building 114 are determined. The properties of the windows can include the type of glass that is used, a type of tinting, and whether the windows are configured with adjustable electrochromic glass and/or automated venetian blinds that have properties that allow the shading provided by the windows to be modified by the controller 102. In some embodiments, the building 114 may include both controllable and non-controllable windows.

In one implementation, the building includes double-glazed clear glass windows, double-glazed tinted, or low-E glazed windows. Visual and thermal characteristics of the different window types are shown in Table 7. An energy and visual comfort analysis can be performed for each glazed window individually, and based on the analysis, the best glazing window can be recommended to the user. In addition, daylight passing through the windows can be integrated with the artificial lighting system of the modeled building and percentage savings in the annual cooling and the total building energy consumption can be calculated. The simulated results of the modeled office building with a total gross area of 8334 m$^2$, show a total building energy consumption of 2,883,729 kWh (346 kWh/m2/year). The breakdown of annual electrical energy consumption in the modeled office building reveals that 67% (2,018,610 kWh) of the total energy is used for cooling (including fans), 14% (403,722 kWh) for lighting, and 18% for equipment.

TABLE 7

| Glazing Type | U-factor (W/m$^2$K) | SHGC | VLT |
|---|---|---|---|
| Double pane, clear (6/13/6 mm) | 2.6 | 0.5 | 47% |
| Double pane, bronze tinted (6/13/6 mm) | 2.6 | 0.5 | 47% |
| Double pane, low-E (6/13/6 mm) | 1.9 | 0.4 | 44% |

Figure 10:
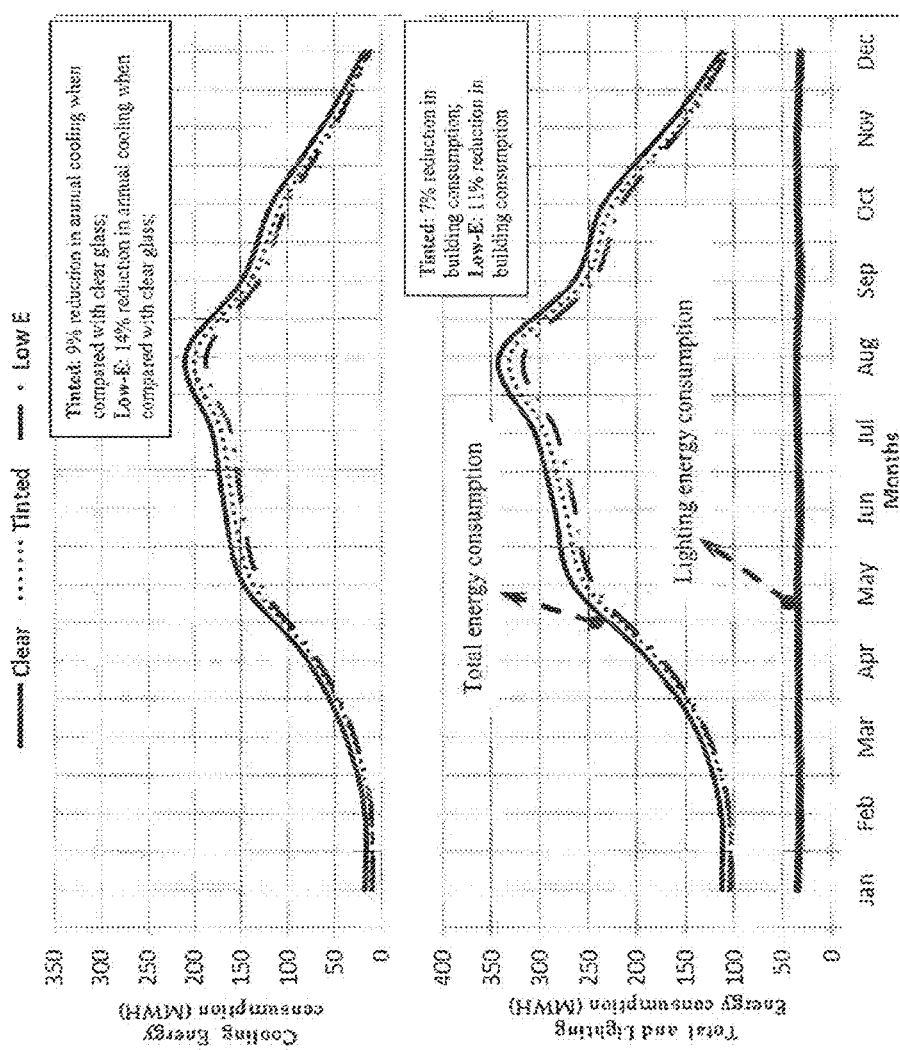
FIG. 10 is an exemplary graph of energy consumption for a building, according to certain embodiments.

In certain embodiments, the processing circuitry of the controller 102 can determine energy and visual comfort performance of the building 114 with different types of window glazing in hot climactic conditions, such as tinted and low-emissivity (low-E) glazings. Annual cooling energy and total building energy consumption can be used as indicators for evaluating and comparing the energy performance of the different types of window glazings. The variation in the monthly energy consumption of the modeled office building with different types of glazed windows (clear, tinted, and low-E) is demonstrated in FIG. 10. It can be deduced from FIG. 10 that the peak energy occurs during the summer months because of the high demand for cooling. In addition, the maximum electricity consumption occurs in the month of August as it is the hottest month in the year with temperatures ranging from 48 to 50° C. and relative humidity ranging from 50% to 60% as described in M. A. Najid, "The Impact of HVAC System Operation and Selection on Energy Efficiency in Office Buildings in Hot Climates (MS dissertation)," Building Environmental Control System Program, Department of Architectural Engineering, King Fand University of Petroleum and Minerals, Saudi Arabia, 2010. By contrast, the month of January may be the coolest month with temperatures reaching as low as 6° C., resulting in significantly less demand for cooling and resulting in the minimum monthly energy consumption. For double-pane, clear glass windows, monthly energy consumption is higher because double-pane and clear glass windows allow in more solar radiation, which affects the cooling energy component throughout the year but more significantly during the summer period. Additionally, both low-E and tinted glazed windows are very effective in reducing the annual cooling consumption when compared with clear-glass windows. The colored film on tinted and low-E windows reduces a significant amount of the sun's heat, easing the load on the air conditioner.

In addition, tinted and low-E glazed windows also reduce the annual cooling energy consumption by 9% and 14%, respectively, when compared to the cooling energy performance of double clear-glass windows. Furthermore, the annual building energy consumption saw substantial reductions of 7% and 11%, respectively, when tinted and low-E windows are used rather than clear-glass windows. Therefore, low-E glazed windows are effective in reducing energy consumption in office buildings situated in hot climates without accounting for daylight integration. The high emissivity coating on low-E glazed windows absorbs the heat from outside, thereby reducing the solar gain and cooling cost.

Figure 11:
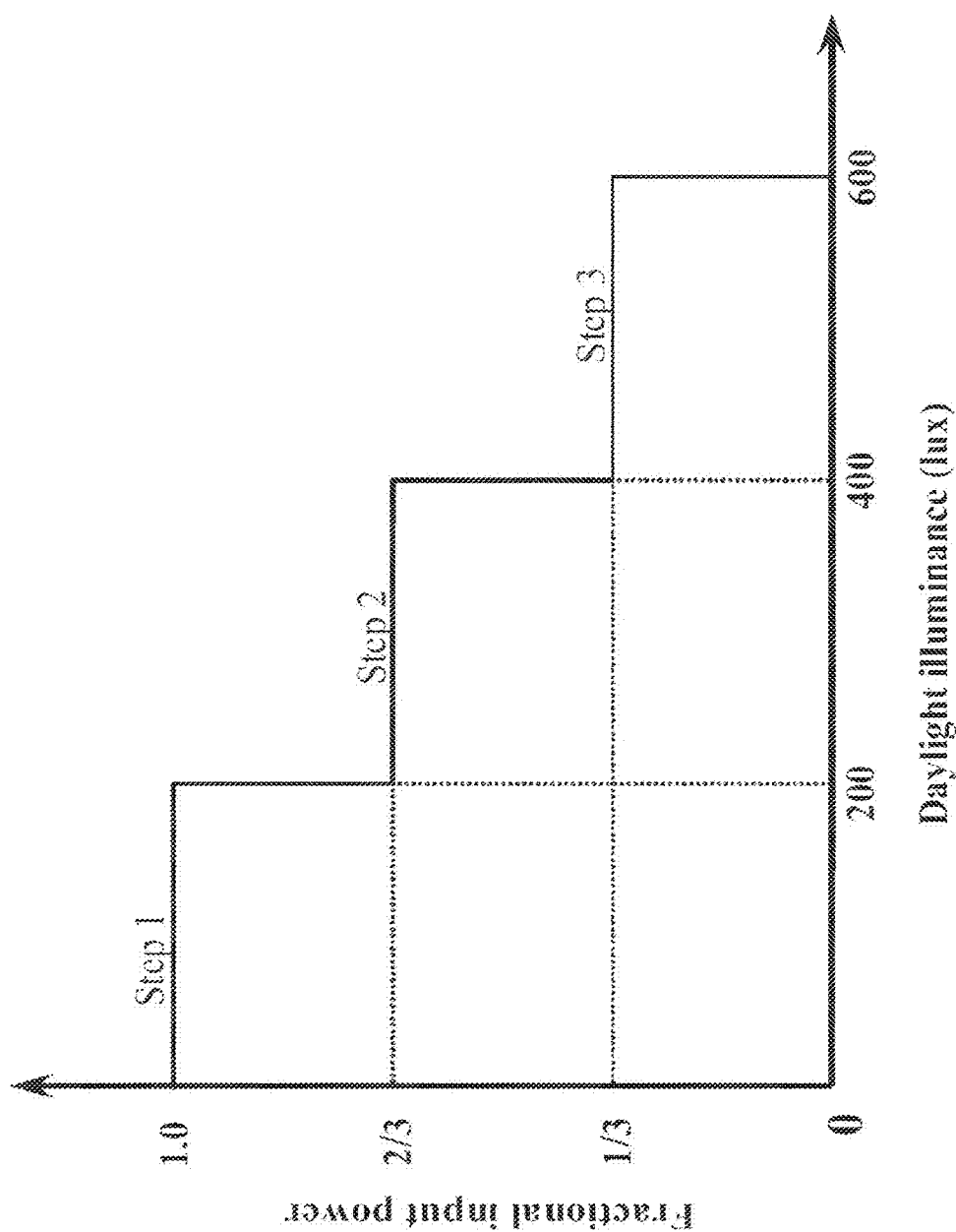
FIG. 11 is an exemplary graph of input power for a lighting control mechanism, according to certain embodiments.

In some implementations, daylight entering through the windows can be harvested to maximize energy savings while maintaining visual comfort at each orientation within the building 114. Lighting control sensors, such as exterior and interior illuminance and/or thermo sensors (e.g., thermocouple, RTD sensors) positioned in the zones of the building, can measure daylight availability of each zone, and the control 102 can send a control signal to the artificial lighting system to dim down to a point where a predetermined illumination level is attained for that zone. Lighting levels can be measured at predetermined time intervals and are can be used to determine how much the artificial lighting can be reduced. Control techniques for dimming the artificial lighting can include continuous lighting control, continuous OFF control and stepped control. For example, the stepped control allows for the ON/OFF switching of lighting in discrete steps according to an availability of natural daylight. The electric power input and light output vary separately in equally spaced steps. The stepped control minimizes the power input to the lights associated with the artificial lighting system in order to balance the illumination level inside the building zones, thereby reducing the artificial lighting energy consumption. The heat emitted by artificial lighting may be reduced due to the dimming effect provided by the lighting control, which can further reduce the internal heat gain and thereby decrease the cooling load as discussed in H. Poirazis, A. Blomsterberg, M. Wall, "Energy simulations for glazed office buildings in Sweden," *Energy Build.* 40 (2008) 1161-1170, the entire contents of which is incorporated herein by reference. The proposed fraction of lights which will remain ON for different reduced illumination levels is shown in FIG. 11. For example, the graph in FIG. 11 illustrates that the controller 102 reduces the artificial lighting in steps and to ensure an adequate lighting level is maintained throughout the day.

In one implementation, the controller 102 issues a control signal to switch ON the stepped lighting control for windows having different types of glazings. FIG. 12 is an exemplary table of energy consumption based on window type, according to certain embodiments. The table in FIG. 12 enumerates the energy savings in the annual lighting, cooling and total consumption which results from the integrating the daylight passing through the windows of the building with the artificial lighting system of the building for different types of glazed windows.

Figure 13:
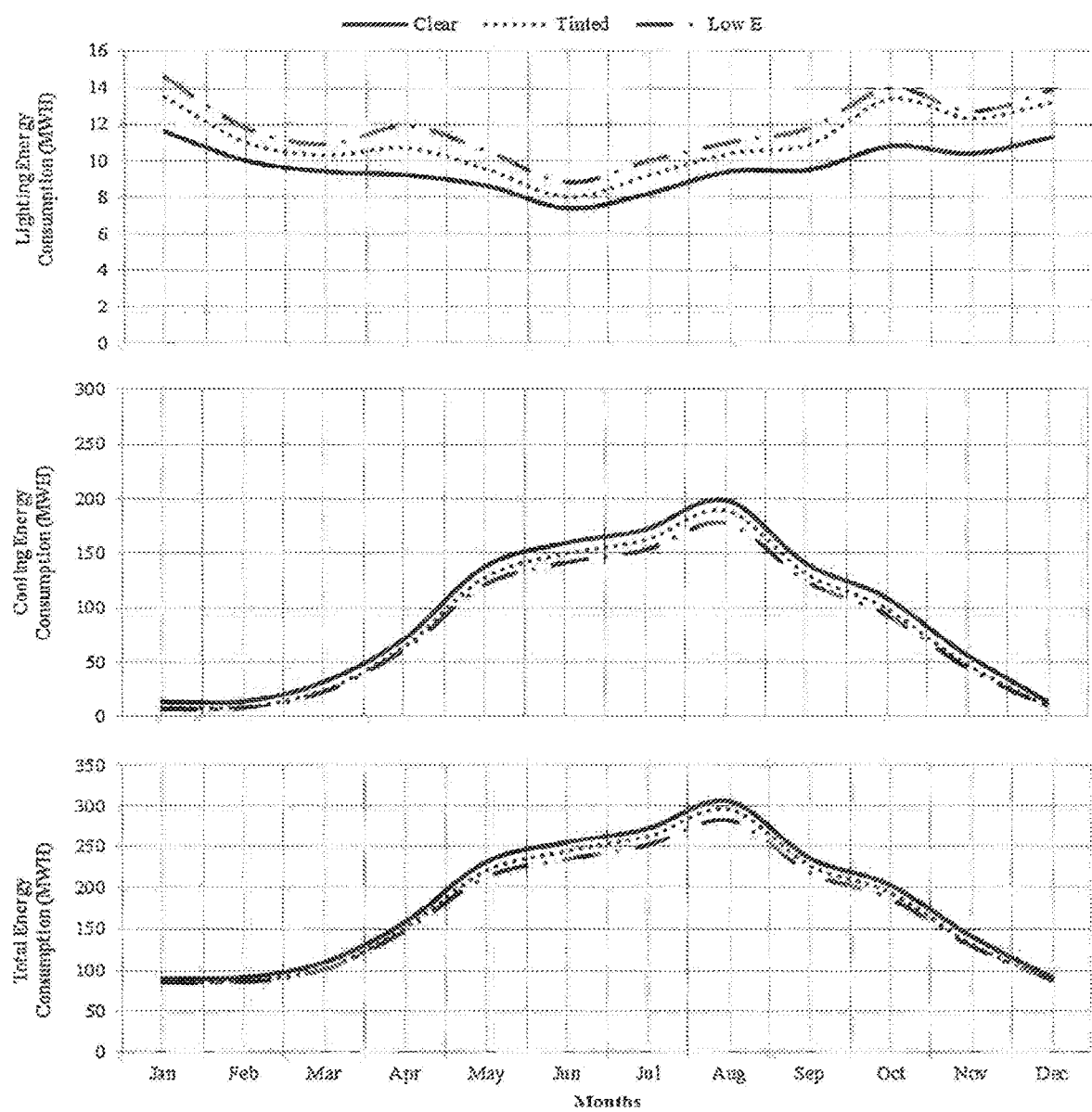
FIG. 13 is an exemplary graph of energy consumption for a building, according to certain embodiments.

FIG. 13 is an exemplary graph of energy consumption for a building, according to certain embodiments. As shown in FIG. 13, low-E glazed windows are most effective in reducing the total building consumption. For example, the low-E glazed windows managed to further reduce the total building consumption by 15.5% just by admitting daylight into the building. The variation in the lighting, cooling and total energy consumption for clear, tinted, and low-E glazed windows with the daylight integration is shown in FIG. 13.

Visual comfort of occupants of the building for different types of window glazings can be determined based on a calculated glare index and daylight factor (DF) for the zones of the building 114 as described previously with respect to equations (1) and (2). Glare refers to a condition where discomfort arises and is caused by non-uniform luminance distribution within the visual field. Prolonged exposure to such conditions can result in headaches and eye fatigue as described in S. G. Navada, Chandrashekara, S. Adiga, S. G. Kini, "A study on daylight integration with thermal comfort for energy conservation in a general office," *Int. J. Electr. Energy* 1 (1) (2013) 18-22, the entire contents of which is incorporated herein by reference. DF is used to assess the internal natural lighting level as perceived on the working plane. It can be defined as a ratio of work plane illuminance (at a given point) to the outdoor illuminance on a horizontal plane.

In one embodiment the coating includes an outermost thermoplastic or thermoset plastic layer that has a pattern of concaves and convexes, a pattern or horizontal lines and/or a pattern of concentric circles embedded thereon. The features of the pattern are preferably in the range of 0.5-10 micron and/or 0.5-10 mm.

Figure 14:
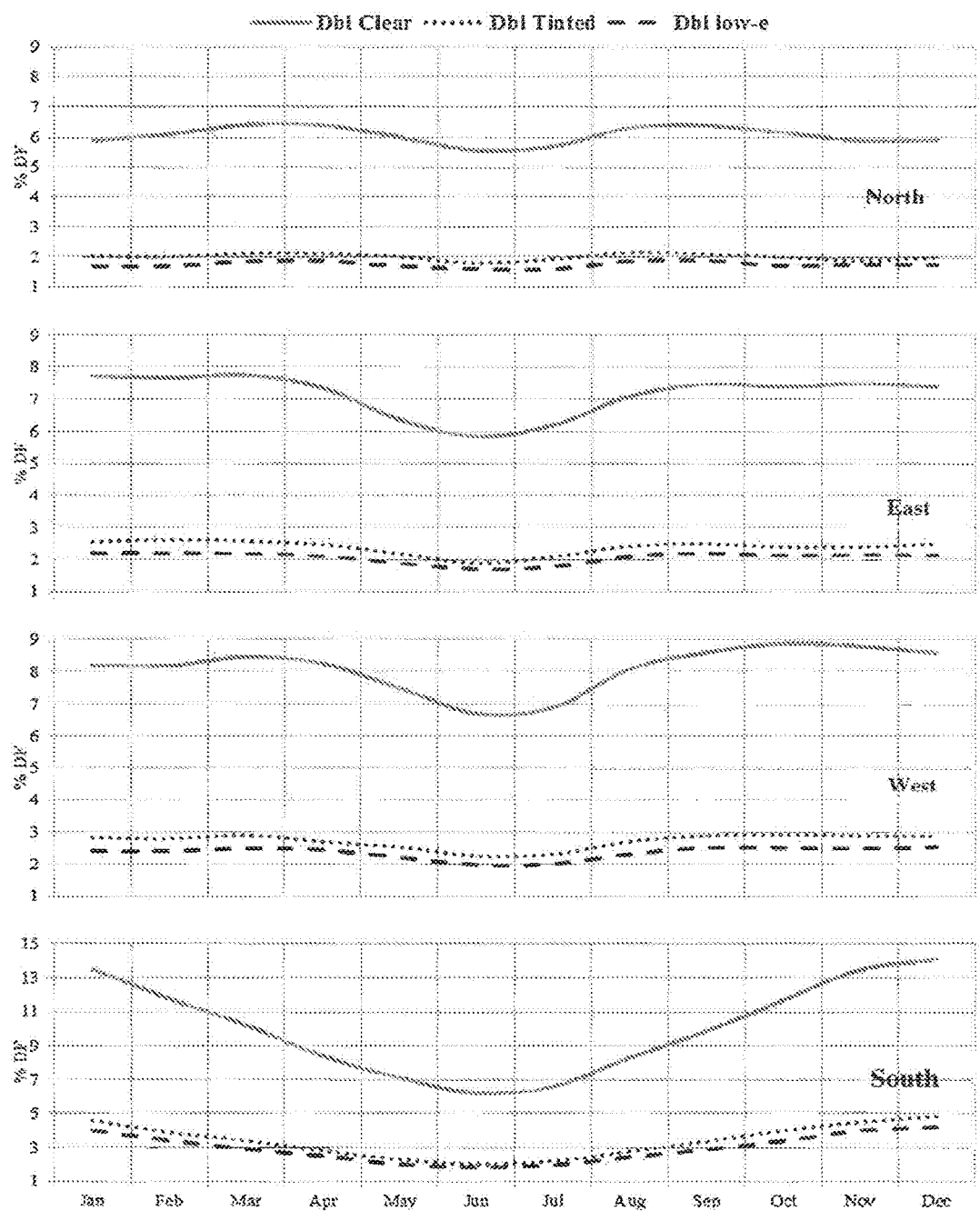
FIG. 14 is an exemplary graph of monthly variation in daylight factor for a building, according to certain embodiments.

FIG. 14 is an exemplary graph of monthly variation in daylight factor for a building for double-pane clear glass, double-pane tinted, and low-E tinted windows, according to certain embodiments. The DF is calculated by the processing circuitry of the controller 102 and is analyzed to assess the availability of daylight in the various zones. FIG. 14 shows the DF in terms of percentage calculated on the 21st day of every month at noon in different orientations of the building for the different types glazed windows. The building with clear-glass windows has a highest DF compared to the other glazed windows because of a high-visible light transmission property. For double-pane clear-glass windows in a north orientation, the average DF is at a maximum value during the month of April (DF=6.4%) because of the high amount of solar radiation received during April. The high percentage of DF in all orientations with different glazed windows illustrates how the passive daylighting can be employed to minimize the artificial lighting consumption.

For a building with tinted and low-E glazed windows, respectively, the DF is less than 2%, which suggests that the office may not be adequately lit with daylight and that artificial lighting may be switched ON for a longer duration in order to provide adequate lighting for occupants of the building. In the north orientation, the average DF for tinted glazed windows is 33% of the value which clear glazed windows possess. Similarly, low-E windows represent 29% of the value of clear glazed windows. A south orientation may provide a highest amount of daylight because of its high DF compared to other orientations. In the east orientation, for low-E glazed windows, the maximum DF was found in the month of February with an average value of 3.5%, showing the space to be well lit with daylight. For the west orientation, the maximum DF during the month of October can have an average value of 4.3%, whereas for the south orientation the maximum DF occurs during December with an average of 3%.

Figure 15:
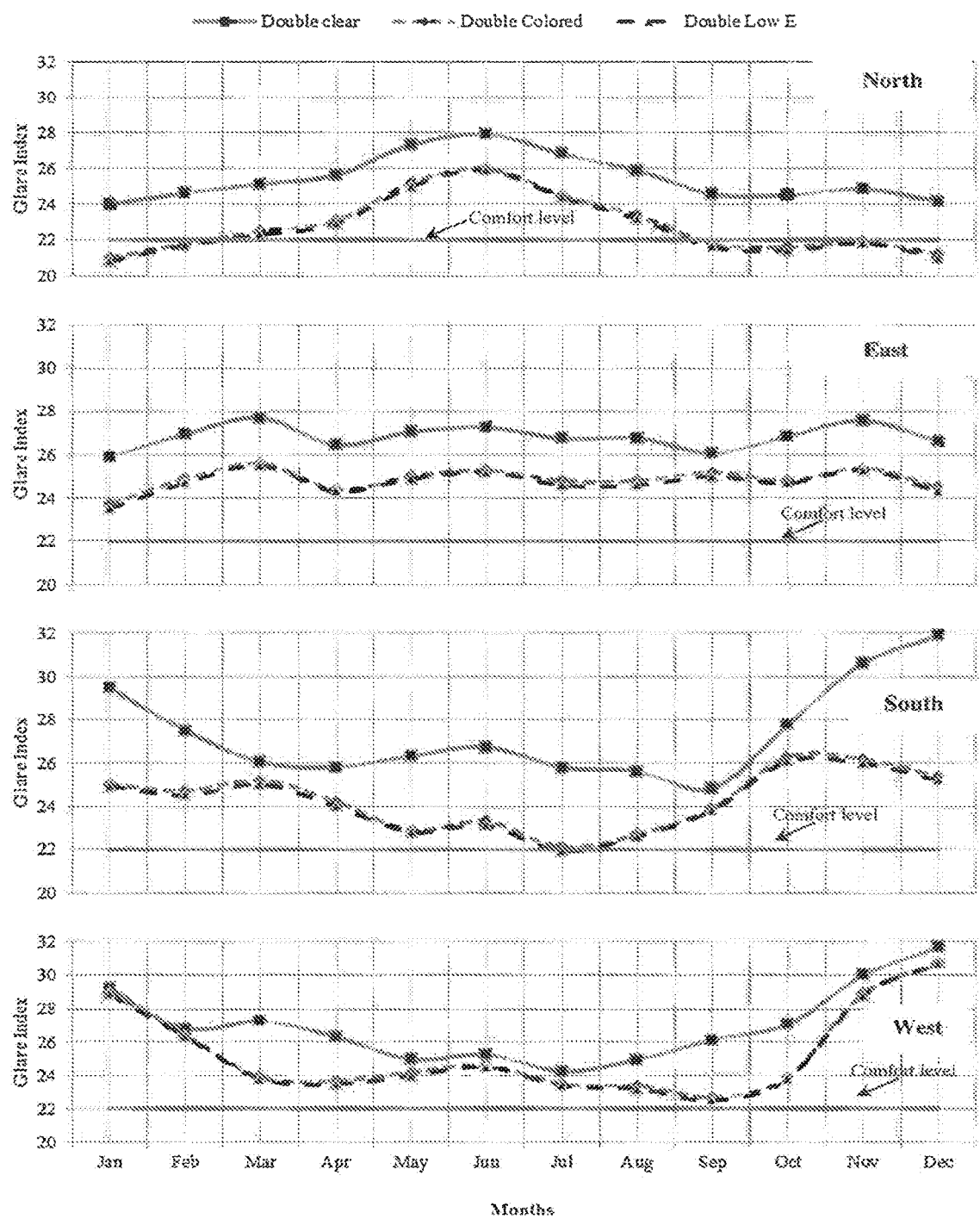
FIG. 15 is an exemplary graph of monthly variation in glare index for a building, according to certain embodiments.

In one implementation, a recommended glare index value prescribed by the lighting standards for office buildings is 22 as described in A. Piccolo, F. Simone, "Effect of switchable glazing on discomfort glare from windows," *Build. Environ.* 44 (2009) 1171-1180 and C. A. Hviid, T. R. Nielsen, S. Svendsen, "Simple tool to evaluate the impact of daylight on building energy consumption," *Solar Energy* 82 (2008) 787-798, the entire contents of which are incorporated herein by reference. The calculated maxi-mum glare index may be based on an assumption that the occupant would be positioned parallel to the perimeter wall and looking toward the window. The setting of the artificial lighting in the office building may be based on the lighting standard prescribed by IESNA, which is 500 lux as described in J. Sanjog, P. Patel, S. Karmakar, "Indoor physical work environment: an ergonomics perspective," *Int. J. Sci. Eng. Technol. Res.* 2 (3) (2013) 2278-7798. The illumination level in the office model is set at 500 lux and the comfort level is assumed to be achieved when the maximum glare index falls below 22. In certain embodiments, glare index values were calculated for different orientations, and the results are shown in the graphs of FIG. 15. The graphs of FIG. 15 show that the glare index values for all glazing were greater than the comfort level (i.e., 22). Double-glazed clear-glass windows permit a high amount of solar radiation due to the lower thermal resistance and the high visible transmittance. The bright light generates an unbalanced lighting level and glare inside, which can cause a glare index value to exceed a comfort threshold level for each month.

Similarly, for tinted and low-E glazed windows, a high admittance of radiation creates visual discomfort in the interior space of the building model. From the graphs in FIG. 15, it can be interpreted that the highly diffuse solar radiation in the north orientation creates a peak in the maximum glare index value during the summer months (April-July). The glare index for east-facing windows reaches a maximum point during the month of March whereas for west-facing windows the highest level is reached during the month of December. An average value for the glare index in east and west orientations is approximately 24.5. The south orientation receives the highest amount of daylight during the winter season because the sun is present for a longer duration and increases the radiation level, thereby increasing the glare index value.

In addition, performance of automated venetian blinds can be determined when the blinds are used as an interior shade in the office building with low-E glazed windows. A stepped lighting control mechanism can be used to regulate the admittance of daylight through the venetian blinds and to meet the inside lighting requirements. A glare control strategy can employed to automate the movement of the blinds and allow a sufficient amount of daylight without compromising the visual comfort. The controller 102 can determine the glare index based on sensor data received from the illuminance and/or thermo sensors in each of the building zones. The automated venetian blinds can be actuated when an amount of vertical solar irradiation results in a glare index above a predetermined threshold. In some implementations, the user can input a maximum glare index value for operating the movement of the blinds as at the user preference interface screen 400. For example, a maximum glare index value of 22 can be used based on prescribed standards as described in A. Piccolo, F. Simone, "Effect of switchable glazing on discomfort glare from windows," *Build. Environ.* 44 (2009) 1171-1180 and C. A. Hviid, T. R. Nielsen, S. Svendsen, "Simple tool to evaluate the impact of daylight on building energy consumption," *Solar Energy* 82 (2008) 787-798. The blinds may remain open when the glare index is less than 22. Similarly, if the glare index is greater than, the controller 102 can send a signal to close the blinds.

The transmission of daylight from automated venetian blinds can be a function of the glare index. The energy consumption for buildings with automated interior blinds in all the orientations can be calculated and compared with the consumption of a building with low-E windows and with daylight integration. The analysis shows that the energy savings are low because of a small fraction of reduction in the annual building energy consumption. The addition of blinds increases the solar heat gain coefficient by increasing the resistance toward the flow of solar radiation and decreasing the cooling energy. However, by decreasing the flow of radiation, the daylight admittance was reduced which increases a load on the artificial lighting systems.

Figure 16:
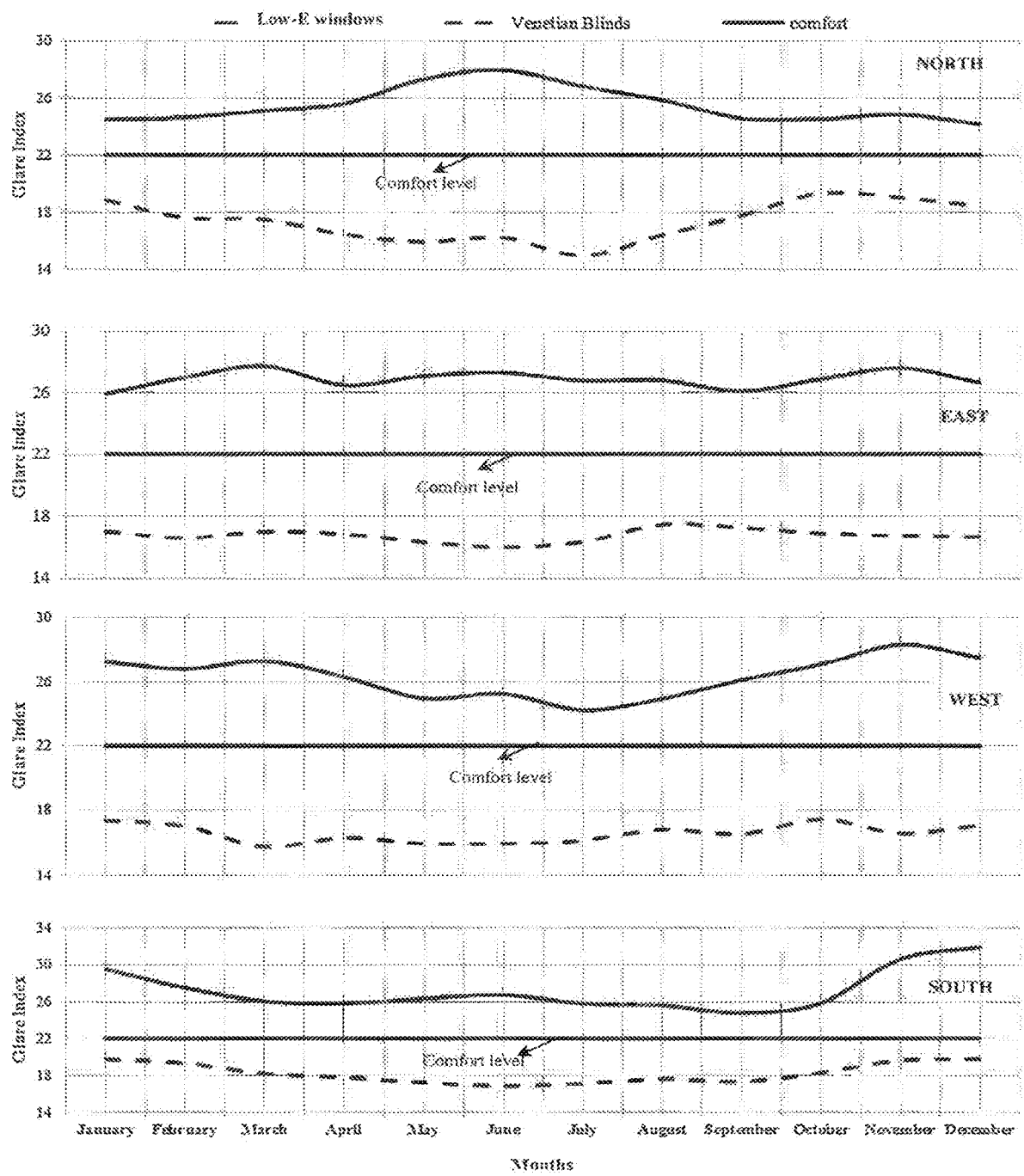
FIG. 16 is an exemplary graph of monthly variation in glare index for a building, according to certain embodiments.

The monthly variation in the maximum glare index with automated venetian blinds in all the orientations is shown in FIG. 16. It can be concluded that by using the automated venetian blinds, the glare index value can be minimized and is be pushed within the predetermined comfort threshold level.

Referring back to FIG. 7, at step S708, the processing circuitry of the controller 102 generates a building and/or zone profile for the building 114 based on the determined construction characteristics and window properties. The zone profile (also referred to as a model) is a representative model of each zone of the building that includes an occupancy profile, a lighting profile, a cooling profile, as well as any other parameters associated with the zones of the building 114.

Figure 17:
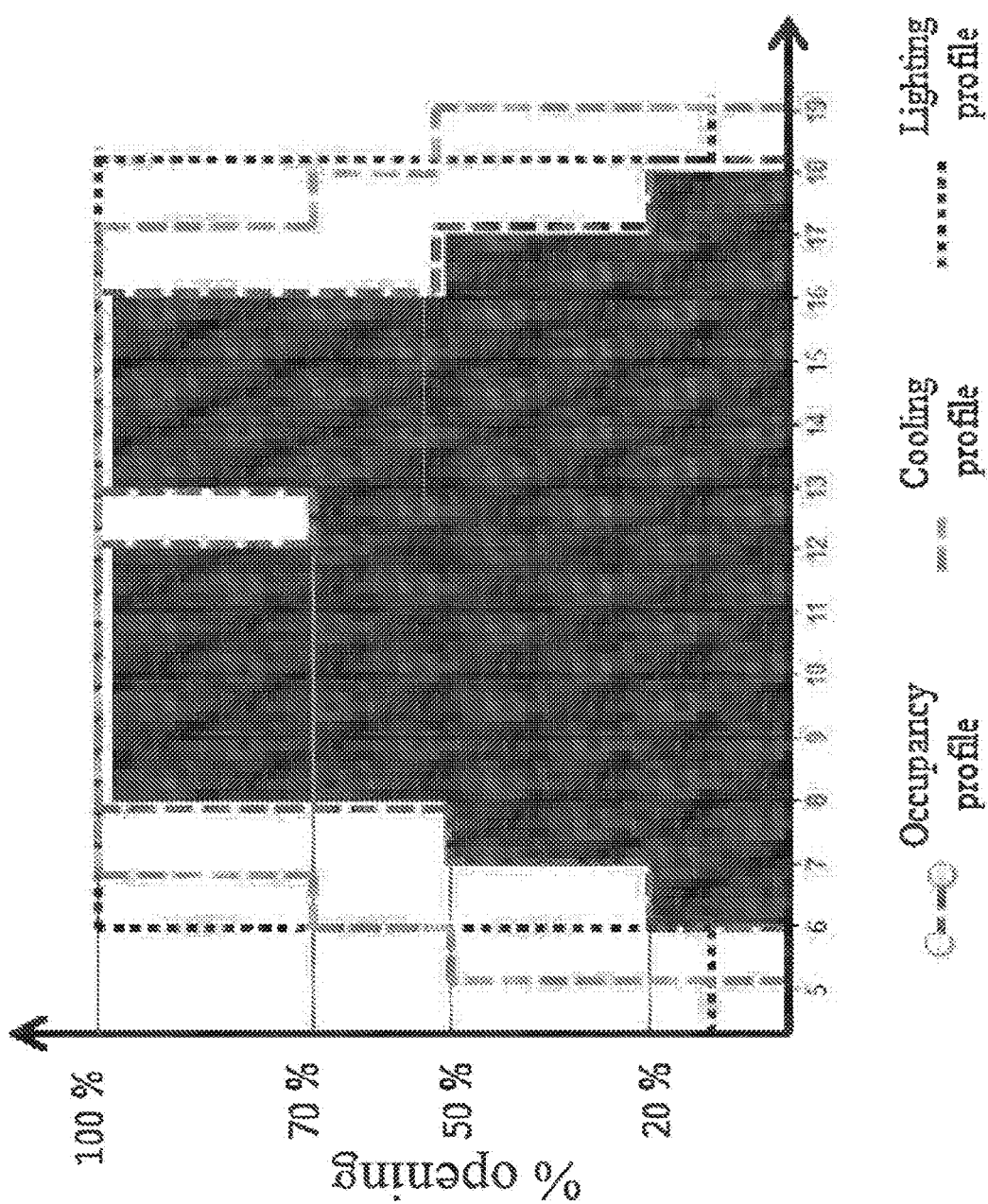
FIG. 17 is an exemplary graph of a building profile, according to certain embodiments.

In some implementations, the processing circuitry of the controller 102 determines a building occupancy schedule based on the user preferences or historical data of local practices for buildings that serve similar functions. For example, it may be determined that a highest occupancy level is from 0600 until 1800, with a one-hour lunch break from 1200 to 1300, and the occupancy schedule follows the same pattern for both summer and winter. An occupancy profile 1702 for the building users and the schedules for different building systems are shown in FIG. 17. In addition, the controller 102 can also determine a holiday schedule for the office building model based on a Gregorian calendar for the year. For example, the processing circuitry can determine that the lighting and HVAC systems in the office model are OFF on holidays, Fridays, or any other day when employees of the building do not work. Table 6 shows input data and assumed values for the formulation of the office building model. The building model can be determined based on a weather data file of the Kuwaiti coastal region, which may be representative of a hot climate. In some implementations, the weather data represents hourly solar radiation and meteorological elements for a period of one year, derived from the weather data from the 1985-2010 Climate Data Base for Saudi Arabia archives as described in "Jeddah Regional Climate Center South West Asia, 2015," Available via DIALOG.http://jrcc.sa/climate data observatory sa.php, the entire contents of which is incorporated herein by reference.

TABLE 6

| Category | Value |
| --- | --- |
| Total floor area of office building model | 800 m² |
| Number of floors | 11 |
| Floor-floor height | 3.7 m |
| Gross area (m²) | 8712 |
| Gross wall area (m²) | 4464 |
| Glazing area (m²) | 2232 |

TABLE 6-continued

| Category | Value |
| --- | --- |
| Dimensions of the model | 36 m (length), 22 m (width) |
| Window-to-wall ratio (WWR) | 50% |
| Number of sensors in each zone | 2 |
| Supply temperature in model | 14° C. |
| Ventilation rate | 0.008 m³/s/person |
| Illumination level in the perimeter zone(s) | 500 lux |
| Illumination level in the core zone(s) | 300 lux |

In addition to the occupancy profile, the graph in FIG. 17 also shows a cooling profile 1704 and a lighting profile 1706 for the building 114.

Figure 18:
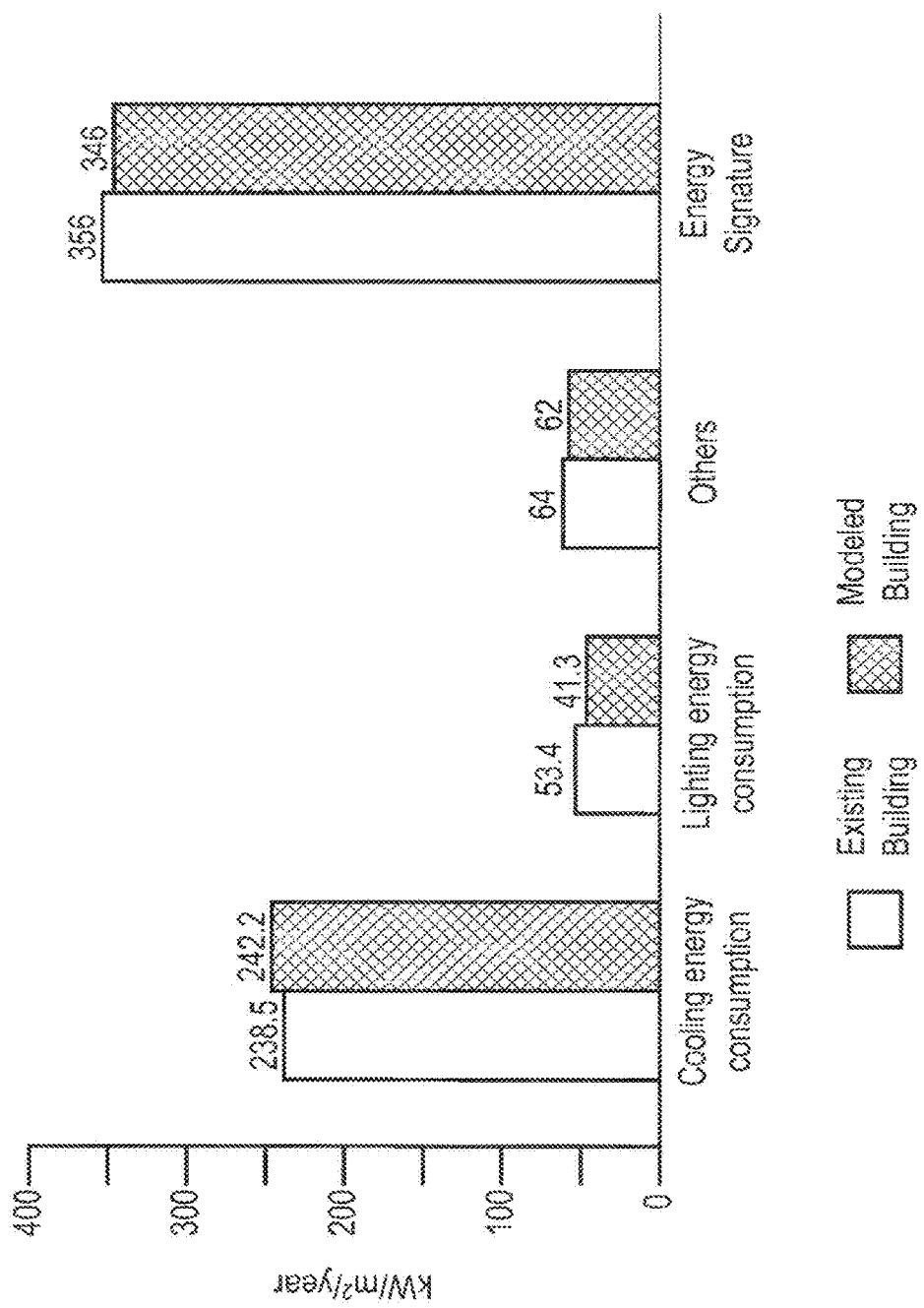
FIG. 18 is an exemplary graph of energy consumption of a building, according to certain embodiments.

In addition, the building model determined by the processing circuitry can be verified to make sure the model is stable and reliable and can be later used for further investigation into building operations as described in M. K. Urbikain, J. M. Sala, "Analysis of different models to estimate energy savings related to windows in residential buildings," *Energy Build.* 41 (2009)687-695, the entire contents of which is incorporated herein by reference. Analytical verification can be performed by comparing an end-use energy consumption of the modeled building with an actual energy consumption of a typical existing office building located in a hot region as described in M. A. Najid, "The Impact of HVAC System Operation and Selection on Energy Efficiency in Office Buildings in Hot Climates (MS dissertation)," Building Environmental Control System Program, Department of Architectural Engineering, King Fand University of Petroleum and Minerals, Saudi Arabia, 2010. The end-use energy parameters of an office building with similar thermal characteristics and climatic conditions to the building 114 can be used to examine the accuracy of the model. For example, the actual selected building used for the verification of the building model is located in the hot climate of Dhahran, Saudi Arabia as described in M. A. Najid, "The Impact of HVAC System Operation and Selection on Energy Efficiency in Office Buildings in Hot Climates (MS dissertation)," Building Environmental Control System Program, Department of Architectural Engineering, King Fand University of Petroleum and Minerals, Saudi Arabia, 2010. The physical and thermal characteristics of the actual building 114 are shown in Table 8 as described in M. A. Najid, "The Impact of HVAC System Operation and Selection on Energy Efficiency in Office Buildings in Hot Climates (MS dissertation)," Building Environmental Control System Program, Department of Architectural Engineering, King Fand University of Petroleum and Minerals, Saudi Arabia, 2010. In one implementation, the windows of the actual building are made of double-pane clear glass. In addition, based on the utility bills for the actual building, it was found that the actual building consumes 2,989,508 kWh over the gross area of 8400 m² as described in M. A. Najid, "The Impact of HVAC System Operation and Selection on Energy Efficiency in Office Buildings in Hot Climates (MS dissertation)," Building Environmental Control System Program, Department of Architectural Engineering, King Fand University of Petroleum and Minerals, Saudi Arabia, 2010. The result shows a very close similarity to the end-use energy consumption parameters for both the modeled and actual building, which is shown in FIG. 18. For example, FIG. 18 shows modeled and actual cooling energy consumption 1802, lighting energy consumption 1804, other types of energy consumption 1806 as well as a modeled and actual energy signature 1808 for the building 114. It can be inferred from FIG. 18 that the energy flow parameters are similar for both modeled and actual buildings, with a maximum deviation of below 3% in the building total energy consumption. So, it can be concluded that the building model developed by the zone/building model development process 700 may be sufficiently reliable for conducting further energy and visual comfort analysis.

TABLE 8

| Building | Description |
| --- | --- |
| Location | Al-Khobar, Saudi Arabia |
| Type of building | Office |
| Plan shape | Square |
| Total Height | 41 m |
| Gross Floor Area | 8400 m$^2$ |
| Gross wall area | 4690 m$^2$ |
| Window area | 2040 m$^2$ |
| Overall WWR | 43.5% |
| Type of Glazing | Double glazed-clear 6/6/6 |
| Building Orientation | North |
| Occupancy density | 9 m$^2$/person (ASHRAE 90.1-2001) |
| External Walls | Granite cladding cut to size 20 mm thick, concrete hollow block 150 mm thick, 12.5 mm thick gypsum board, paint on gypsum board |
| Roof | 15 mm cement plaster, 200 mm thick reinforced concrete slab, asphalt tiles |
| Floor | 100 mm heavyweight concrete, 25 mm mortar cement, 25 mm terrazzo |
| Lighting (LPD) | 16.65 W/m$^2$ |
| Equipment (EPD) | 9 W/m$^2$ |
| HVAC type | Packaged single zone |
| Supply air temperature | 13° C. |

The building profile can also include building orientation, which plays a role in determining times and quantities of light that pass through windows of the building 114. In some implementations, building orientation refers to a direction the building 114 faces and can be indicated by an azimuth angle of a surface relative to true north. The orientation can also refer to a direction that a longest side of the building 114 faces. The orientation of the building can be a factor in how much sunlight is transmitted into the interior of the building through the windows.

Figure 19:
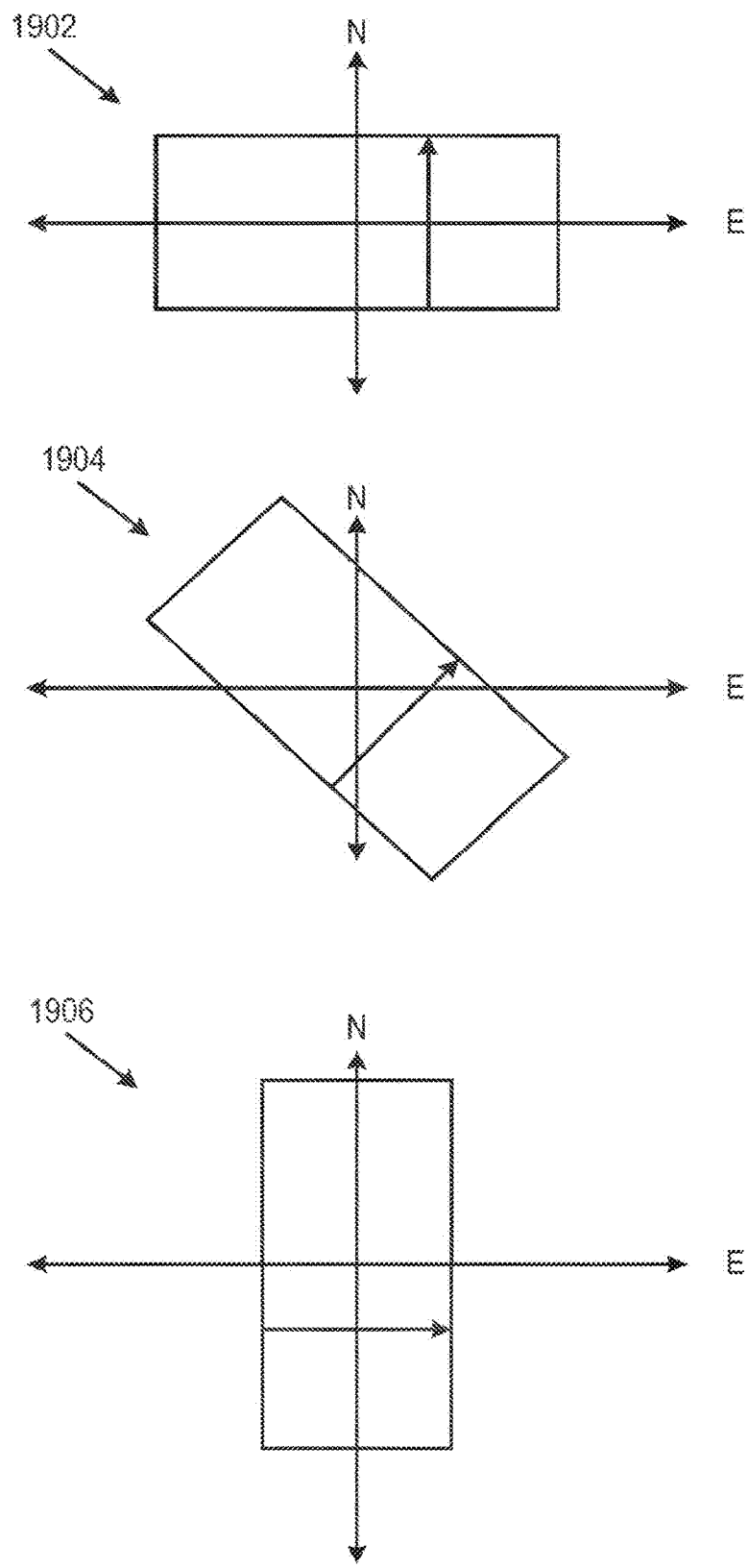
FIG. 19 is an exemplary illustration of building orientations, according to certain embodiments.

FIG. 19 is an exemplary illustration of building orientations, according to certain embodiments. For example, orientation 1902 is a top view of the building 114 with a north orientation. The lighting energy savings for building facing north that is configured with electrochromic smart windows and controlled with the solar control strategy are approximately 20%, the cooling energy consumption savings are approximately 12%, and the total building energy consumption savings are approximately 20%.

The orientation 1904 is a top view of the building 114 rotated 45° from true north. The lighting energy savings for building facing north that is configured with electrochromic smart windows and controlled with the solar control strategy are approximately 20.5%, the cooling energy consumption savings are approximately 11.5%, and the total building energy consumption savings are approximately 18.5%.

The orientation 1906 is a top view of the building 114 rotated 90° from true north, which can also be referred to as an east orientation. The lighting energy savings for building facing north that is configured with electrochromic smart windows and controlled with the solar control strategy are approximately 22%, the cooling energy consumption savings are approximately 10%, and the total building energy consumption savings are approximately 18%.

Referring back to FIG. 7, at step S710, the processing circuitry identifies sensors associated with each of the zones of the building 114. As discussed previously with respect to step S702, each of the zones of the building have daylight sensors, thermo sensors, and other types of sensors associated with measuring conditions of the building. For example, the zones may also include humidity sensors and/or ventilation rate sensors. A file that includes all of the sensors in the building 114 can be tagged with the associated zone, which is stored in the database 108.

At step S712, the processing circuitry of the controller 102 determines an impact weighting factor for each of the sensors in the zones of the building 114. In some implementations, the impact weighting factor indicates how much a given sensor may be relied based on a number of factors that can include time of day, time of year, position of the sensor, and variation in the sensor values detected at a given sensor. For example, sunlight entering through the windows may be stronger at different times of the day and year. The processing circuitry of the controller 102 may assign higher impact weighting factors to the sensors that are aligned to receive a most direct beam of light from the sun based on the positions of the sensors and the sun at a given day and time. In some implementations, the controller 102 determines the amount of light entering the window through the windows based on a weighted average of all of the sensors associated with the zone or just the sensor with the highest impact weighting factor.

Figure 20:
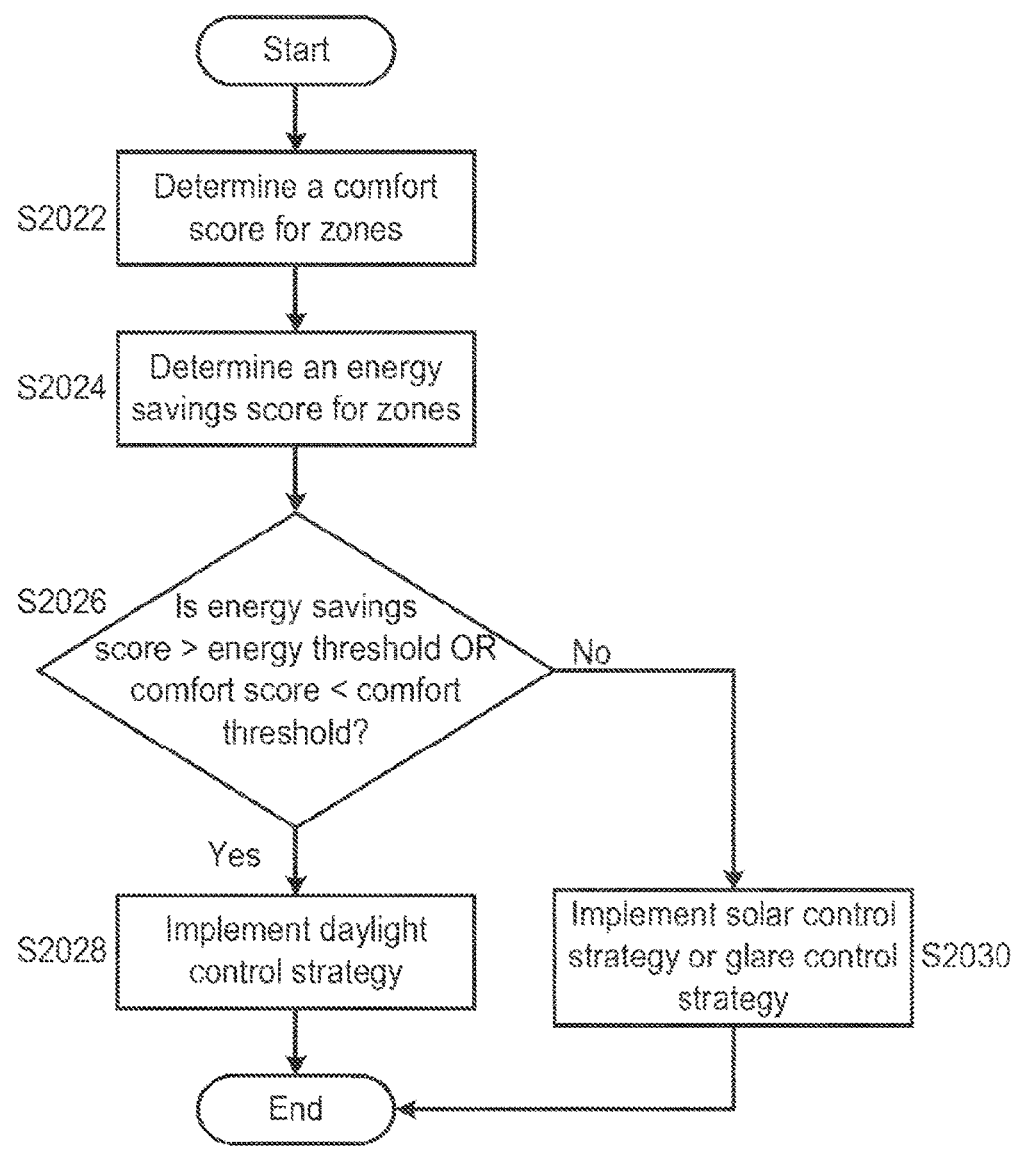
FIG. 20 is an exemplary flowchart of a control strategy determination process, according to certain embodiments.

FIG. 20 is an exemplary flowchart of a control strategy determination process 2000, according to certain embodiments. The control strategy determination process 2000 is one implementation of step S306 of the smart window control process 300.

At step S2022, the processing circuitry of the controller 102 determines a comfort score associated with each of the building zones. In some implementations, the comfort score is a score on a scale of 1 to 10, 1 to 100 or any other scale and is based on the user preferences for the building determined at step S304 of the smart window control process 300. For example, the comfort score can be determined based on the occupancy type, occupancy level, and/or comfort and savings priorities input at the user input interface screen 400 and the priorities input interface screen 500. In addition, the comfort score can also be based on the zone profile determined at the zone/building model development process 700. For example, a building zone that faces a direction that does not capture very much sunlight through the windows when compared with other directions may have an increased comfort score because of a smaller likelihood of achieving energy savings from sunlight entering the building.

At step S2024, the processing circuitry of the controller 102 determines an energy savings score associated with each of the building zones. In some implementations, the energy savings score is a score on a scale of 1 to 10, 1 to 100 or any other scale and is based on the user preferences for the building determined at step S304 of the smart window control process 300. For example, the energy savings score can be determined based on the occupancy type, occupancy level, and/or comfort and savings priorities input at the user input interface screen 400 and the priorities input interface screen 500. In addition, the energy savings score can also be based on the zone profile determined at the zone/building model development process 700. For example, a building zone that faces a direction that captures a lot of sunlight through the windows when compared with other directions may have an increased energy savings score because of a larger likelihood of achieving energy savings from sunlight entering the building.

At step S2026, it is determined whether the energy savings score is greater than an energy threshold or the comfort score is less than a comfort threshold. If the energy savings score is greater than an energy threshold or the comfort score is less than a comfort threshold, resulting in a "yes" at step S2026, then step S2028 is performed. Otherwise, if the energy savings score is less than or equal to the energy threshold and the comfort score is greater than or equal to the comfort threshold, resulting in a "no" at step S2026, then step S2030 is performed.

At step S2028, the controller 102 implements the daylight control strategy when the energy savings score is greater than the energy threshold or the comfort score is less than the comfort threshold, which indicates that saving energy through operating the smart windows has a higher priority than providing visual comfort to the occupants of the building 114.

The daylight control strategy can be employed to modify the properties of electrochromic smart windows from an opaque state to a transparent state. In some implementations, lighting energy consumption and cooling energy consumption can be reduced when employing the daylight control strategy. For example, for the building 114, the lighting energy consumption can be reduced by 25%, and the cooling energy consumption can be reduced by 14%, which results in a reduction in the building energy consumption by 23%. Table 9 shows a comparison between the energy performance of a base case without smart windows and electrochromic windows smart window controlled with the daylight control strategy.

TABLE 9

| Energy Flow | Base Case (kWh) | Daylight Control (kWh) | Energy Reduction (kWh) | % Reduction |
|---|---|---|---|---|
| Lighting Energy consumption | 136,857 | 102,372 | 34,485 | 25 |
| Cooling Energy Consumption | 1,587,191 | 1,462,242 | 124,949 | 8 |
| Total Energy consumption | 2,174,093 | 1684371 | 489,722 | 23 |

Figure 21:
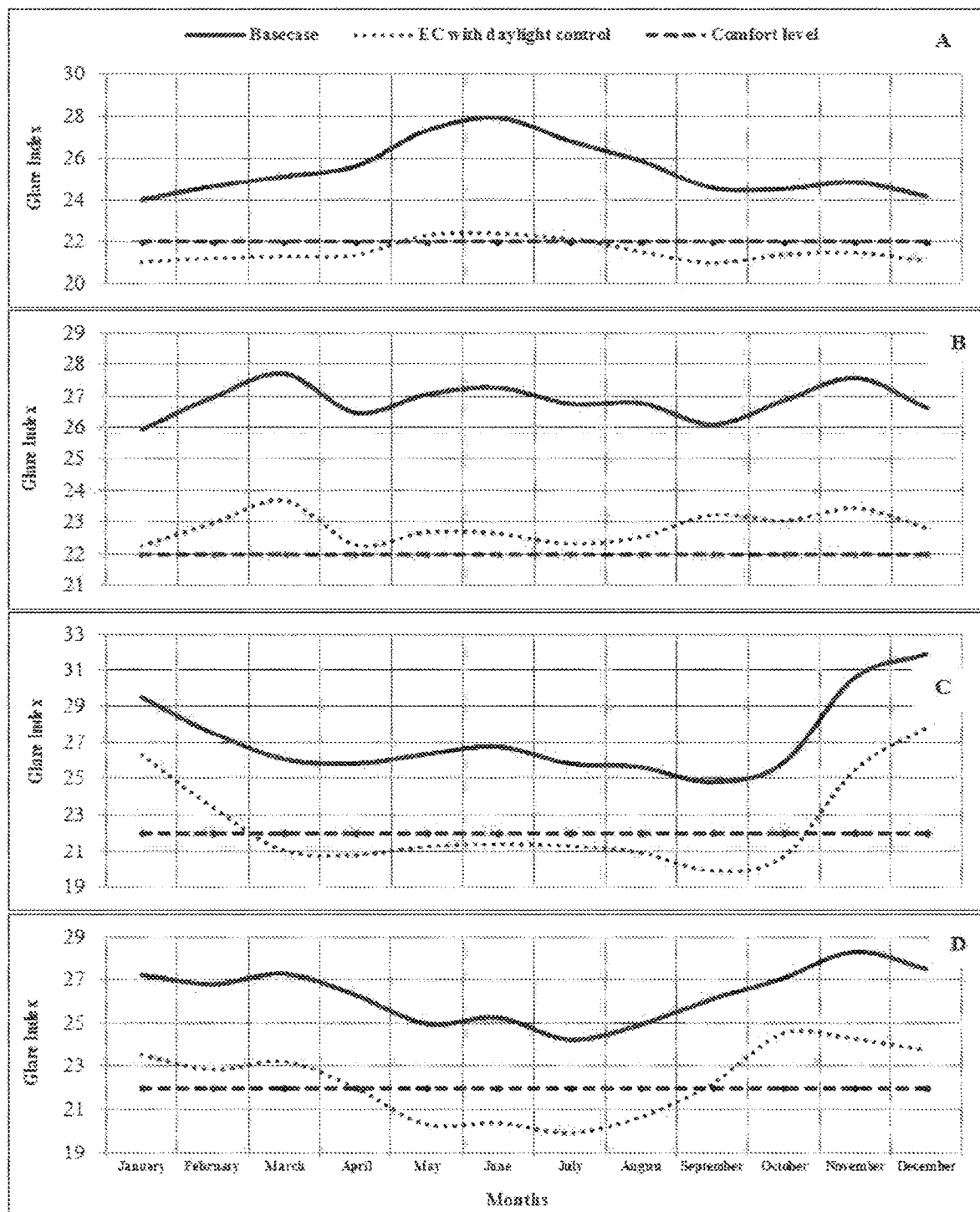
FIG. 21 is an exemplary graph of monthly variation in glare index with daylight control, according to certain embodiments.
Figure 22:
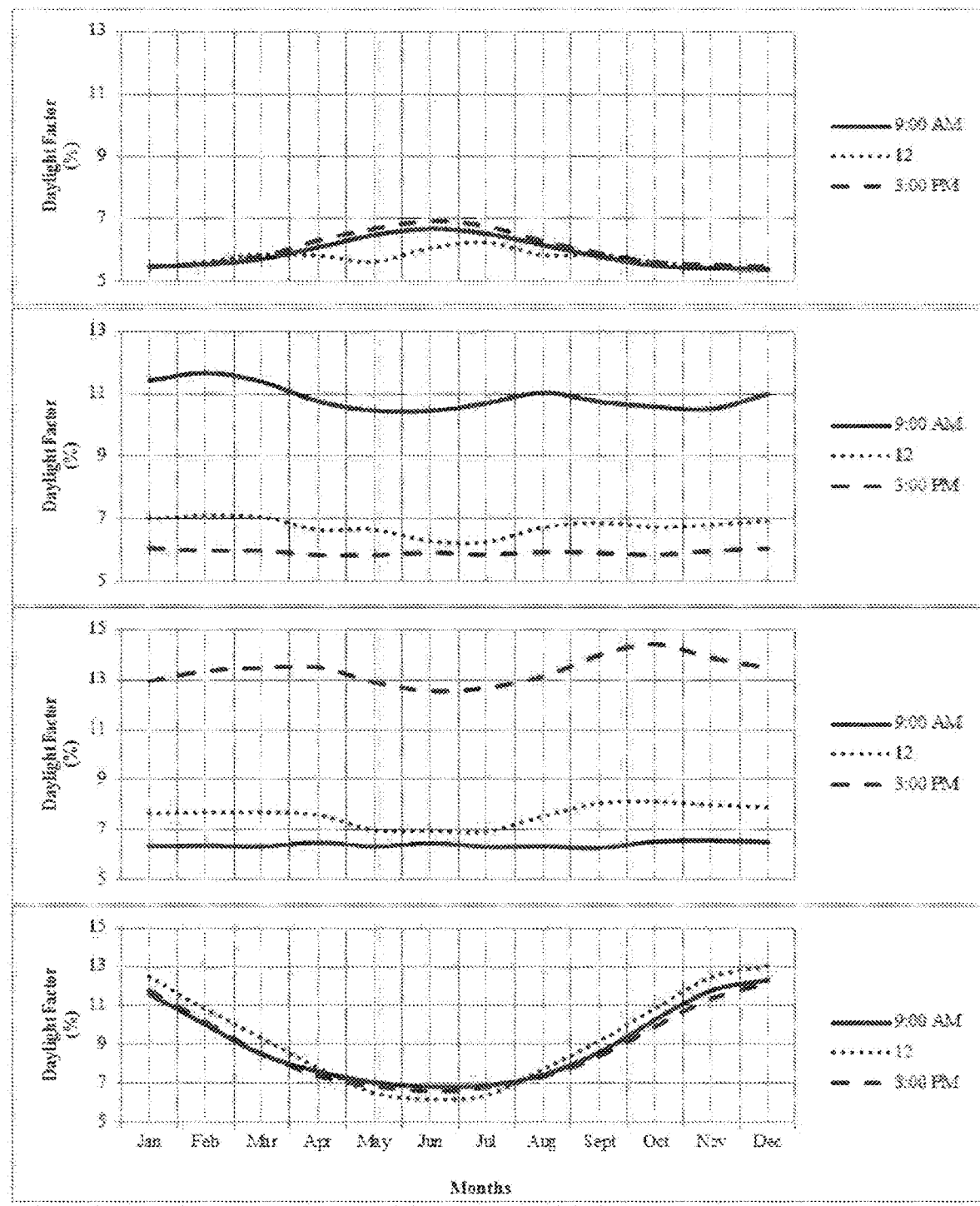
FIG. 22 is an exemplary graph of monthly variation in daylight factor with daylight control, according to certain embodiments.

Also, maximum glare index values can be determined in order to identify whether predetermined visual comfort criteria are achieved. For example, FIG. 21 shows the variation in the maximum glare index value for both the base case without smart windows and electrochromic smart window controlled with the daylight control strategy over a period of time. The graph in FIG. 21 shows that for all the orientations, the glare index value is exceeds the predetermined visual comfort threshold because the transmittance through the glazing is adjusted to meet a daylight illuminance set point at a first daylight illuminance sensor within the zone. The controller 102 reduces the artificial lighting consumption but the additional daylight entering through the windows brings in additional brightness that produces visual discomfort to the occupants in the building 114. Also, FIG. 22 shows variation in the daylight factor (%) when the electrochromic smart windows are used with the daylight control strategy. Therefore, when the daylight control strategy is used for controlling the electrochromic smart windows, total energy savings associated with both lighting energy and cooling energy are increased, but the glare index may not be maintained below a predetermined visual comfort threshold.

Referring back to FIG. 20, at step S2030, the controller 102 implements either the solar control strategy or the glare control strategy when the energy savings score is less than or equal to the energy threshold or the comfort score is greater than or equal to the comfort threshold, which indicates that saving energy through operating the smart windows has a lower priority than providing visual comfort to the occupants of the building 114. In some implementations, the controller 102 may preferentially implement the solar control strategy. However, the user may input a preference associated with using the solar control strategy or the glare control strategy at the user input interface screen 400.

The glare control strategy can be employed to modify the properties of electrochromic smart windows from an opaque state to a transparent state to modify an amount of sunlight transmitted through the smart windows based on a calculated glare index. In some implementations, lighting energy consumption is reduced by 12% and cooling energy consumption is reduced by 14% in the building 114 when the glare control strategy is employed, which results in a reduction in total building energy consumption by approximately 17%. Table 10 shows a comparison between the energy performance of a base case without smart windows and electrochromic windows smart window controlled with the glare control strategy.

TABLE 10

| Energy Flow | Base Case (kWh) | Glare Control (kWh) | Energy Reduction (kWh) | % Reduction |
|---|---|---|---|---|
| Lighting Energy consumption | 136,857 | 120,300 | 16,557 | 12 |
| Cooling Energy Consumption | 1,587,191 | 1,372,784 | 214,407 | 14 |
| Total Energy consumption | 2,174,093 | 1,808,756 | 365,337 | 17 |

Figure 23:
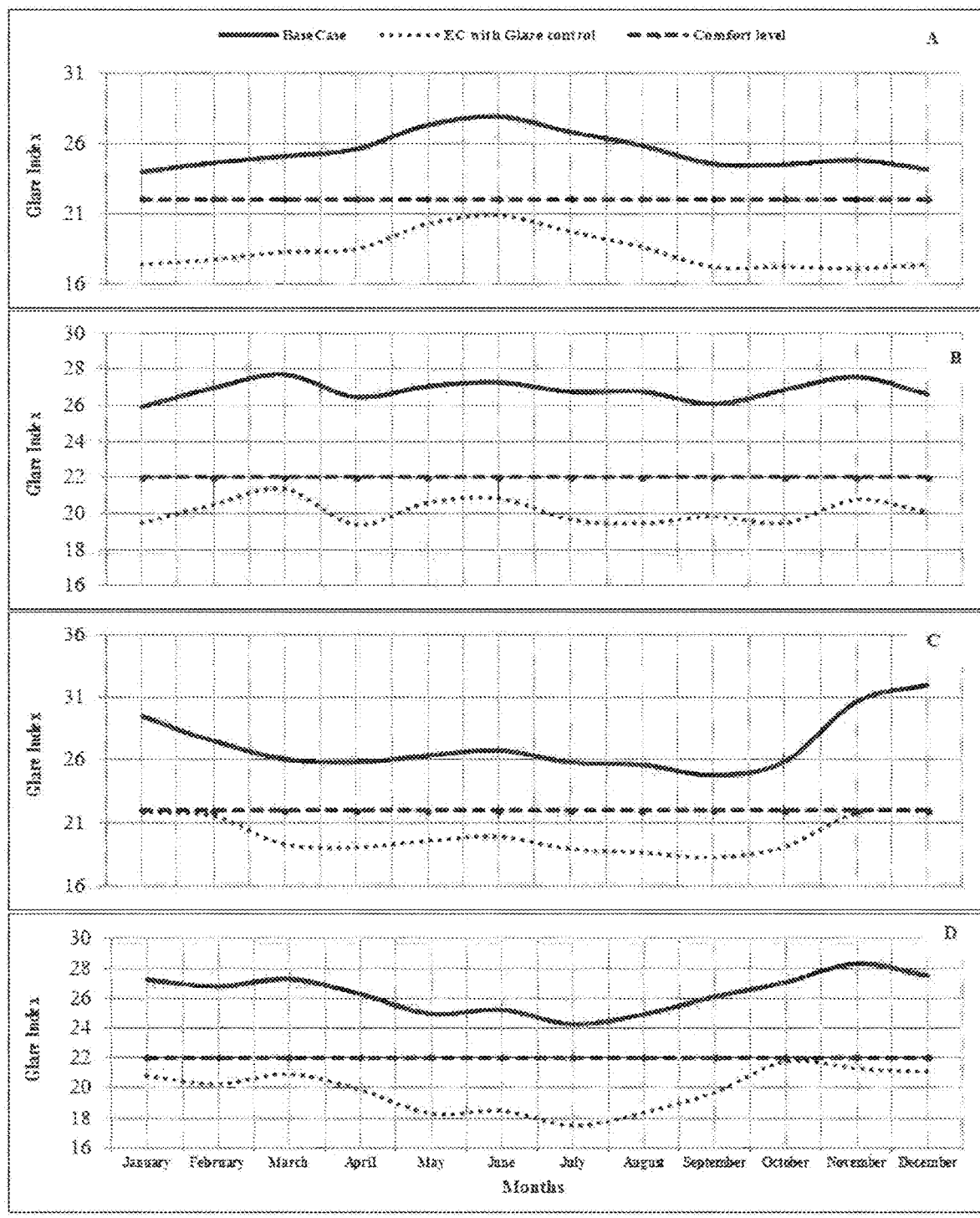
FIG. 23 is an exemplary graph of monthly variations in glare index with glare control, according to certain embodiments.

FIG. 23 shows variation in glare index values for every month in various orientations when the glare control strategy is employed by the controller 102. In some implementations, the processing circuitry of the controller 102 compares a calculated glare index based on received sensor data to one or more glare index set points to determine a voltage to apply to the electrochromic smart windows to modify the amount of shading provided by the windows.

Figure 24:
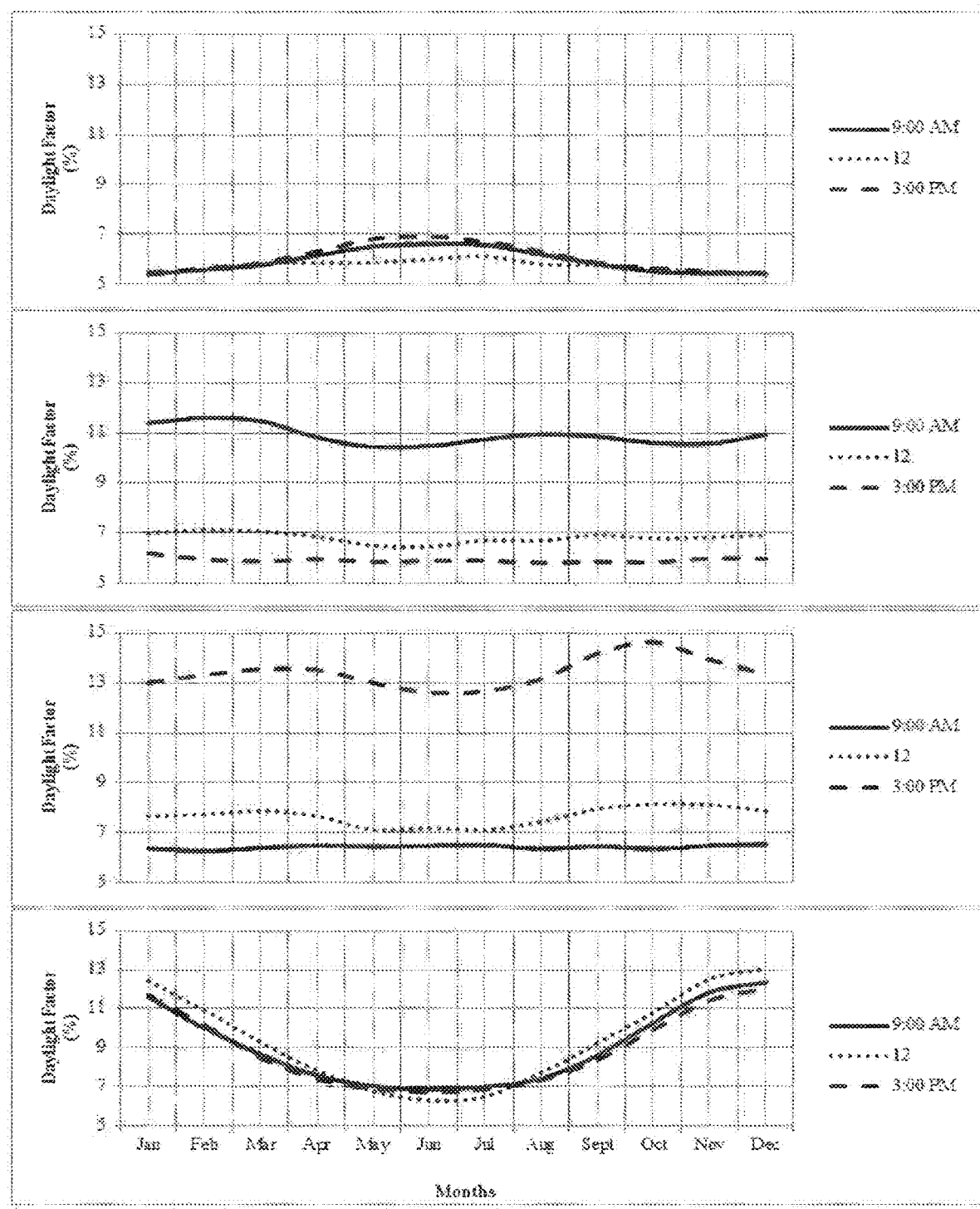
FIG. 24 is an exemplary graph of monthly variations in daylight factor with glare control, according to certain embodiments.

FIG. 24 shows the average Daylight Factor (%) for various orientations when the electrochromic smart windows are controlled with the glare control strategy. It is observed that for all orientations the glare index value is less than the visual comfort threshold (as shown in FIG. 23) because the controller 102 modifies the transmittance of the glazing to meet a predetermined glare index set point. In doing so, only a predetermined amount of daylight is transmitted through the windows, thereby reducing the lighting energy consumption and also satisfying visual comfort criteria for the occupants. Therefore, when the glare control strategy is selected for controlling the electrochromic smart windows of the building 114, the energy savings associated with both lighting energy and cooling energy are increased while maintaining visual comfort in the zones of the building 114.

The solar control strategy can be employed to modify the properties of electrochromic smart windows from an opaque state to a transparent state to modify an amount of sunlight transmitted through the smart windows based on a calculated amount of solar radiation from the transmitted sunlight. For example, the controller 102 can modify the voltage applied to the electrochromic smart windows based on a sum of beam solar energy plus diffuse solar energy incident on the windows. The voltage and solar radiation set points can vary based on orientation of the windows, time of day, time of year, and other parameters that affect the amount of radiation at the windows.

In some implementations, the processing circuitry of the controller 102 can determine the voltage and radiation set points associated with the solar control strategy based on the building and zone models developed at the zone/building model development process 700. The voltage and radiation set points are determined in order to increase energy savings for the building 114 as well as achieve predetermined visual comfort criteria that can include maintaining the glare index for the building zones less than a predetermined visual comfort threshold.

Figure 25:
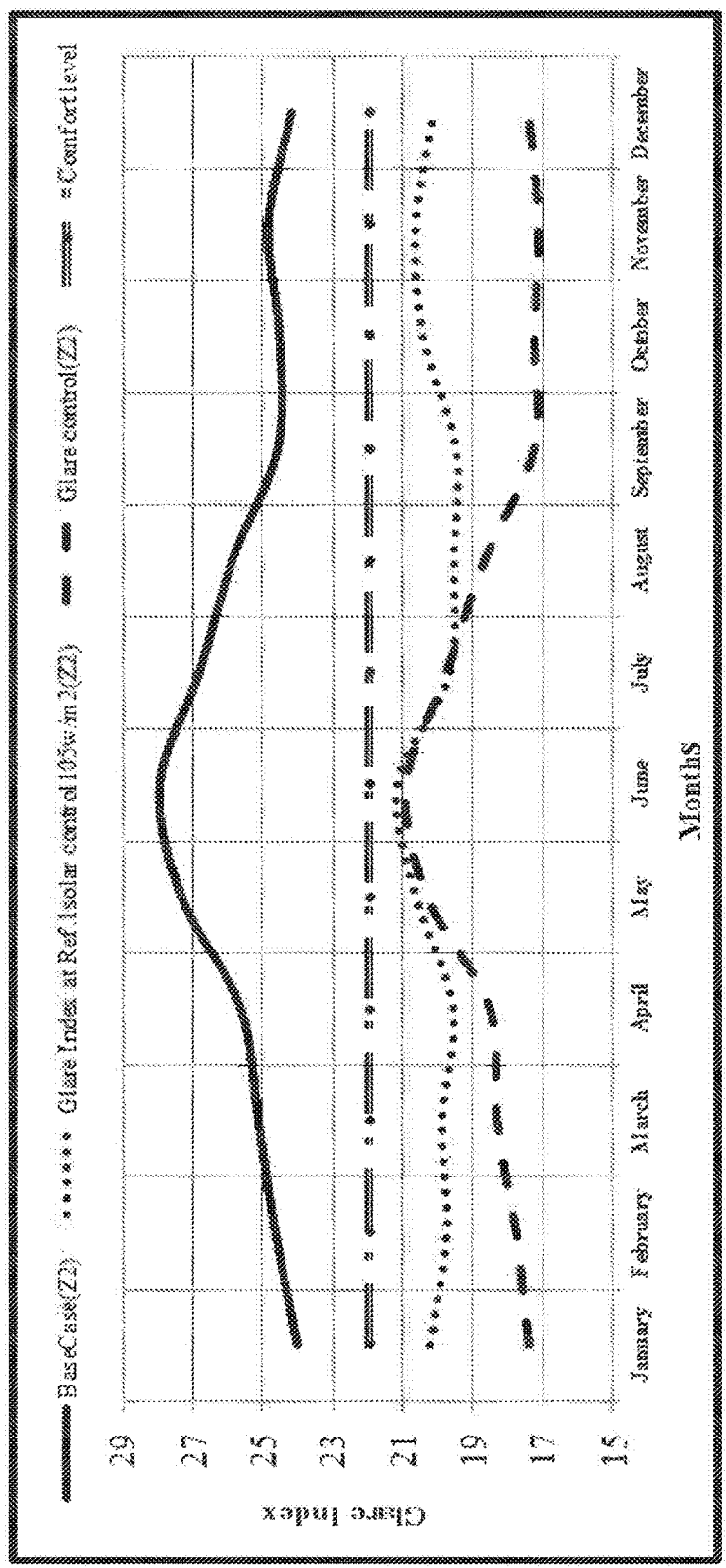
FIG. 25 is an exemplary graph of monthly variations in glare index for solar control and glare control, according to certain embodiments.

For example, for a north orientation of the building 114, the processing circuitry of the controller 102 determines projected solar radiation levels at the windows for each zone of the building 114 and also calculates an amount of energy savings as well as a glare index for the windows at each orientation of the building 114. In one implementation, at a solar radiation set point value of 105 W/m², the energy savings are increased and the calculated glare index is less than the predetermined visual comfort threshold for all zones of the building 114. FIG. 25 is an exemplary graph of monthly variations in glare index for solar control and glare control for windows having a north orientation, according to certain embodiments. Maximum glare index values are plotted at the solar set point of 105 W/m² in order to show the visual comfort criteria is being achieved when the solar control strategy is applied to the electrochromic smart windows.

Figure 26:
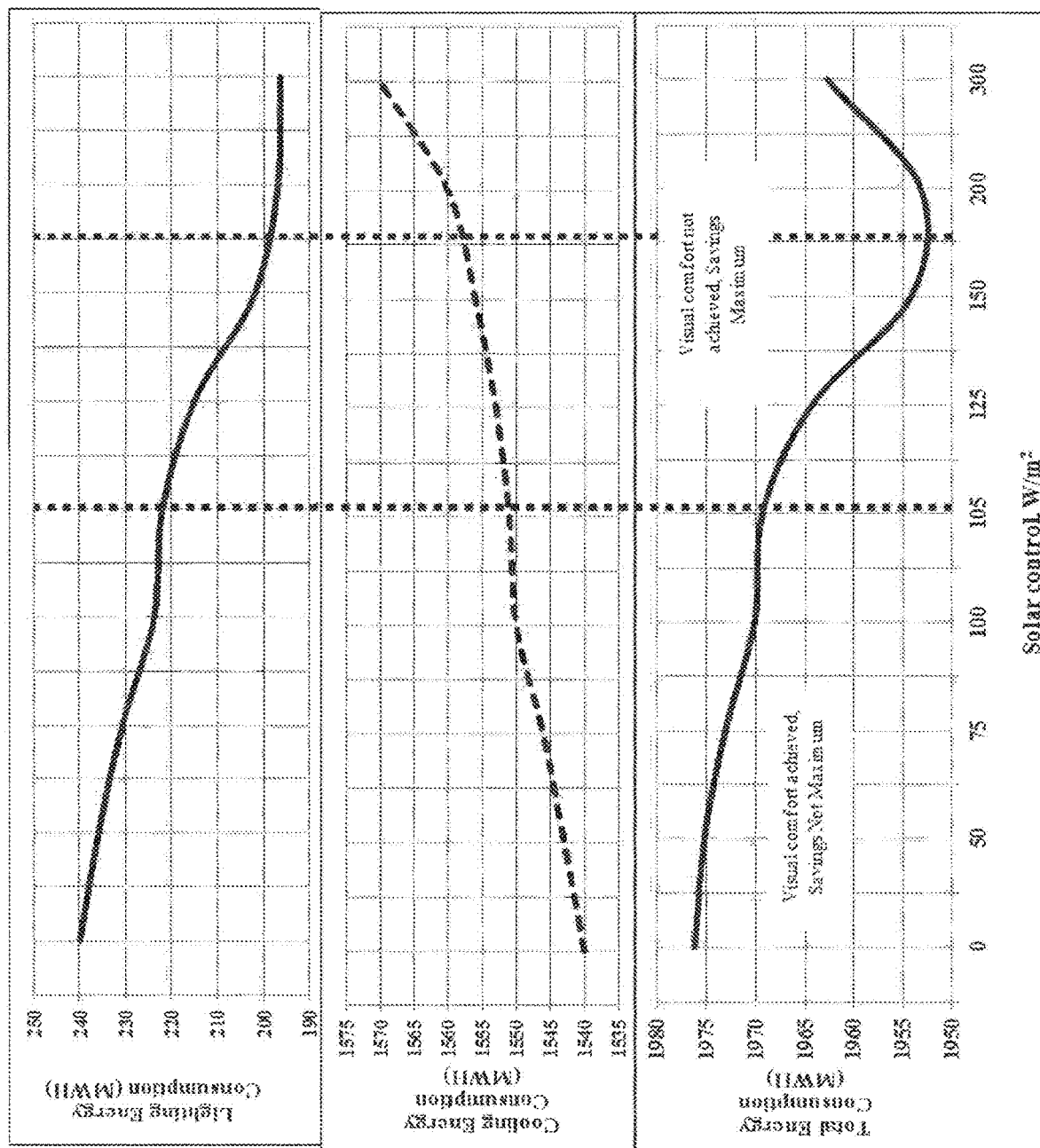
FIG. 26 is an exemplary graph of energy consumption with solar control, according to certain embodiments.

FIG. 26 is an exemplary graph of lighting, cooling, and total energy consumption for various solar radiation set points using the solar control strategy for windows having a north orientation, according to certain embodiments. By increasing the solar radiation value, the amount of daylight drawn into the interior spaces of the building 114 is increased which reduces the lighting energy consumption because the amount of artificial lighting can be reduced. On the other hand, by letting in large amounts of daylight, heat gain in the space is increased, which increases the cooling energy consumption. In some implementations, the total energy consumption curve can be divided into 3 stages associated with various set point radiation levels.

For example, a first stage can include radiation levels between 25-100 W/m². In this stage, the lighting energy consumption decreases but there is also an increase in the cooling energy consumption due extra heat gain from outside. Even though the energy consumption increases as the radiation set point increases in the first stage, the total energy consumption is reduced because of the larger energy reduction from the reduced lighting energy consumption. In one example, at a solar radiation value of 105 W/m², the glare index is at a saturation point for visual comfort level, and further increases in the radiation value result in visual discomfort in the indoor environment.

A second stage can include radiation levels between 105-175 W/m². In this stage, the savings in total energy consumption may be maximized because by a large amount of daylight drawn into the building through the windows largely decreases the artificial lighting energy consumption while the cooling energy consumption slightly increases. However, even though maximum energy savings are achieved, visual comfort may not be attained because the glare index value increases greater than the visual comfort threshold when the radiation set point value is greater than 105 W/m². A third stage can include radiation levels that are greater than 175 W/m². In this stage, an abrupt increase in the cooling energy consumption occurs with no further decrease in the lighting energy consumption, which results in the total energy consumption curve drastically increasing due to an increase in the overall consumption of the building.

In some implementations, the lighting energy consumption for the building 114 is reduced by 3% and end-use cooling energy consumption is reduced by 4% by controlling the electrochromic smart windows with a north orientation with the solar control strategy at a radiation set point of 105 W/m². Also the total energy consumption of building is reduced by 3%. Table 11 shows a comparison between the solar control strategy and the glare control strategy for the windows of the building having a north orientation. As shown in Table 11, the solar control strategy may provide greater energy savings than the glare control strategy while still maintaining the visual comfort criteria.

TABLE 11

| Energy consumption | Base case(kWh) | Solar control 105 W/m² (kWh) | Glare control (kWh) | solar control (% Reduction) | Glare control (% Reduction) |
|---|---|---|---|---|---|
| Lighting | 136,857 | 132,751 | 133,435 | 3 | 2.5 |
| Cooling | 1,587,191 | 1,523,703 | 1,515,767 | 4 | 4.5 |
| Total | 2,174,093 | 2,108,870 | 2,108,870 | 3 | 2.7 |

Figure 27:
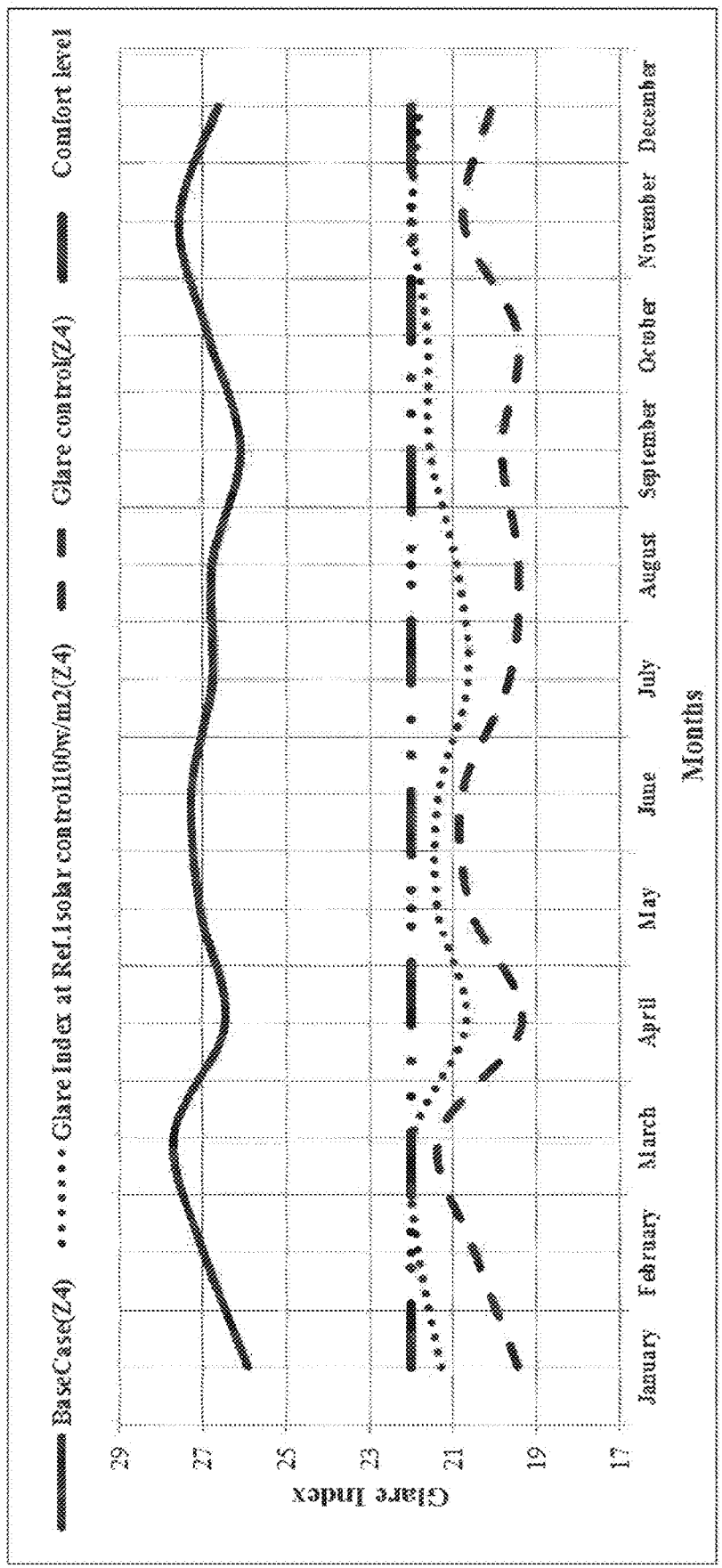
FIG. 27 is an exemplary graph of monthly variations in glare index for solar control and glare control, according to certain embodiments.

For an east orientation of the building 114, the processing circuitry of the controller 102 can determine projected solar radiation levels at the windows for each zone of the building 114 and can also calculate an amount of energy savings as well as a glare index for the windows at each orientation of the building 114. In one implementation, at a solar radiation set point value of 100 W/m², the energy savings are increased and the calculated glare index is less than the predetermined visual comfort threshold for all zones of the building 114. FIG. 27 is an exemplary graph of monthly variations in glare index for solar control and glare control for windows having an east orientation, according to certain embodiments. Maximum glare index values are plotted at the solar set point of 100 W/m² in order to show the visual comfort criteria is being achieved when the solar control strategy is applied to the electrochromic smart windows.

Figure 28:
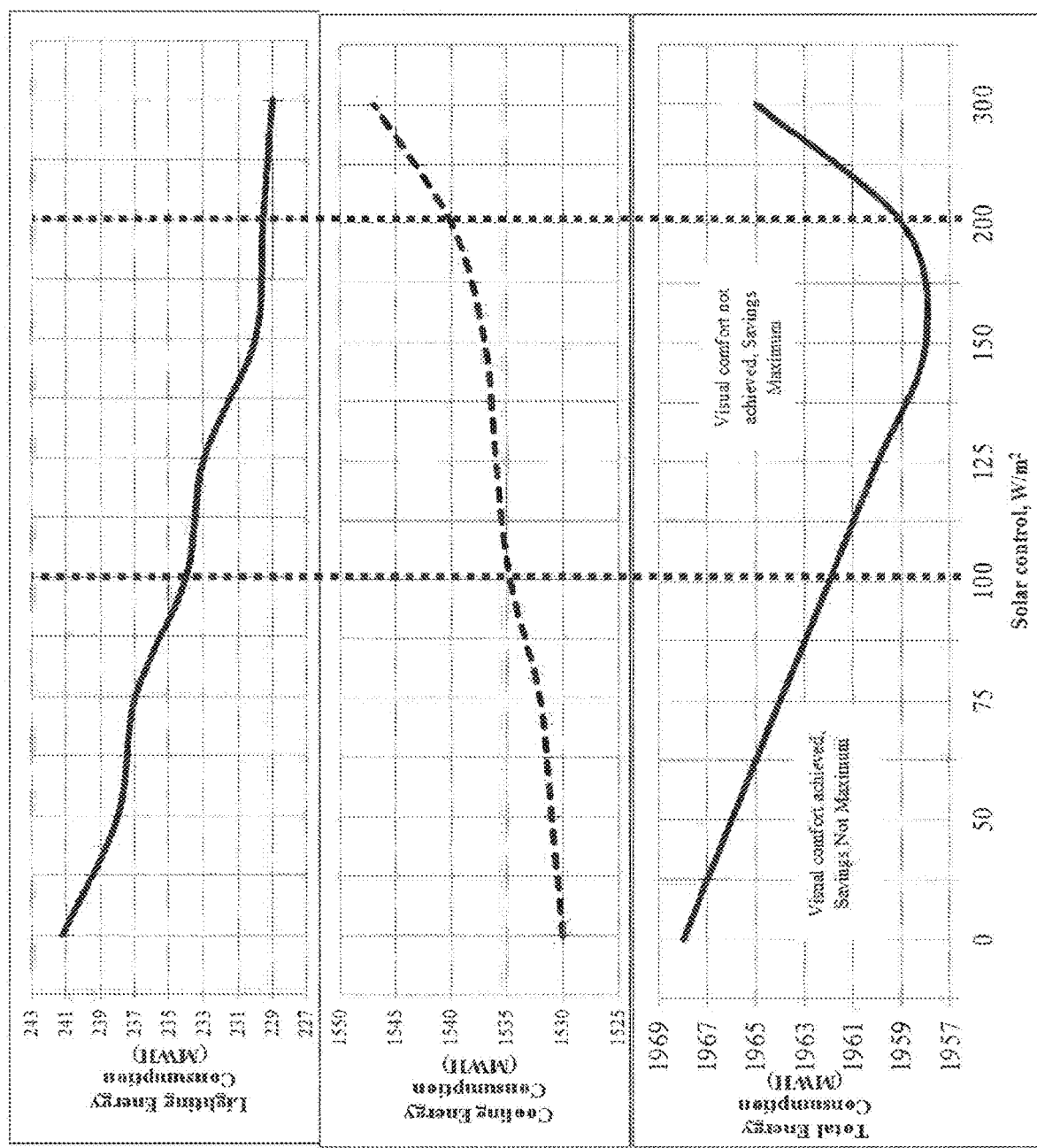
FIG. 28 is an exemplary graph of energy consumption with solar control, according to certain embodiments.

FIG. 28 is an exemplary graph of lighting, cooling, and total energy consumption for various solar radiation set points using the solar control strategy for windows having a east orientation, according to certain embodiments. As the solar radiation set point value increases, the amount of daylight entering the building 114 through the windows increases which results in a decrease in artificial lighting consumption. Increasing the solar radiation set point value also increases a cooling load. In some implementations, the lighting energy consumption is reduced by 5% and the cooling energy consumption is reduced by 3% by controlling the electrochromic smart windows with an east orientation with a solar control strategy at a radiation set point of 100 W/m². As discussed previously with respect to the north orientation windows, in some implementations, the total energy consumption curve can be divided into 3 stages associated with various set point radiation levels.

Table 12 shows a comparison between the solar control strategy and the glare control strategy for the windows of the building having an east orientation. As shown in Table 12, the solar control strategy may provide greater total energy savings than the glare control strategy while still maintaining the visual comfort criteria.

TABLE 12

| Energy consumption | Base Case (kWh) | Solar control 100 W/m² (kWh) | Glare control (kWh) | solar control (% Reduction) | Glare control (% Reduction) |
|---|---|---|---|---|---|
| Lighting | 136,857 | 130,000 | 131,376 | 5 | 4 |
| Cooling | 1,587,191 | 1,539,561 | 1,531,646 | 3 | 3.5 |
| Total | 2,174,093 | 2,065,392 | 2,076,281 | 5 | 4.5 |

Figure 29:
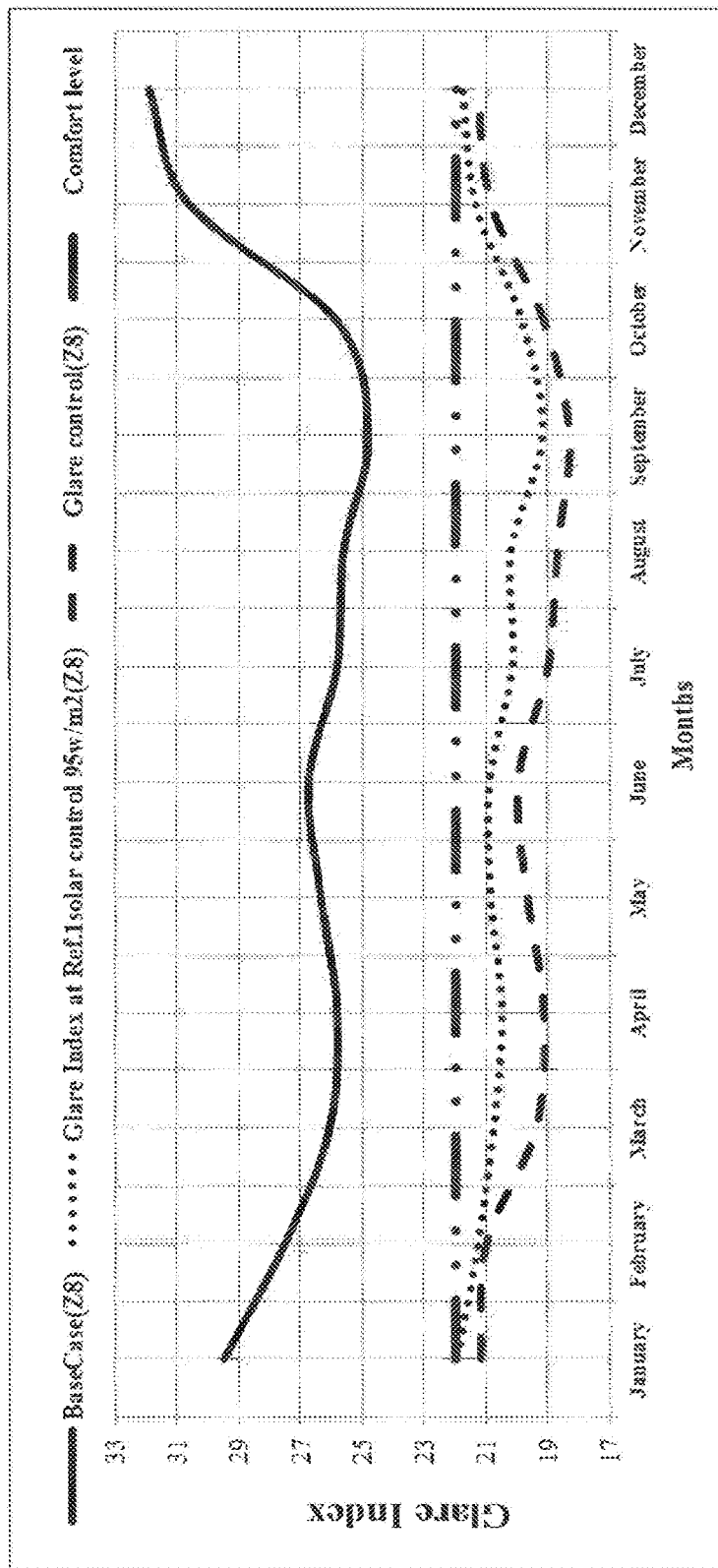
FIG. 29 is an exemplary graph of monthly variations in glare index for solar control and glare control, according to certain embodiments.

For a south orientation of the building 114, the processing circuitry of the controller 102 can determine projected solar radiation levels at the windows for each zone of the building 114 and can also calculate an amount of energy savings as well as a glare index for the windows at each orientation of the building 114. In one implementation, at a solar radiation set point value of 95 W/m², the energy savings are increased and the calculated glare index is less than the predetermined visual comfort threshold for all zones of the building 114. FIG. 29 is an exemplary graph of monthly variations in glare index for solar control and glare control for windows having a south orientation, according to certain embodiments. Maximum glare index values are plotted at the solar set point of 95 W/m² in order to show the visual comfort criteria is being achieved when the solar control strategy is applied to the electrochromic smart windows.

Figure 30:
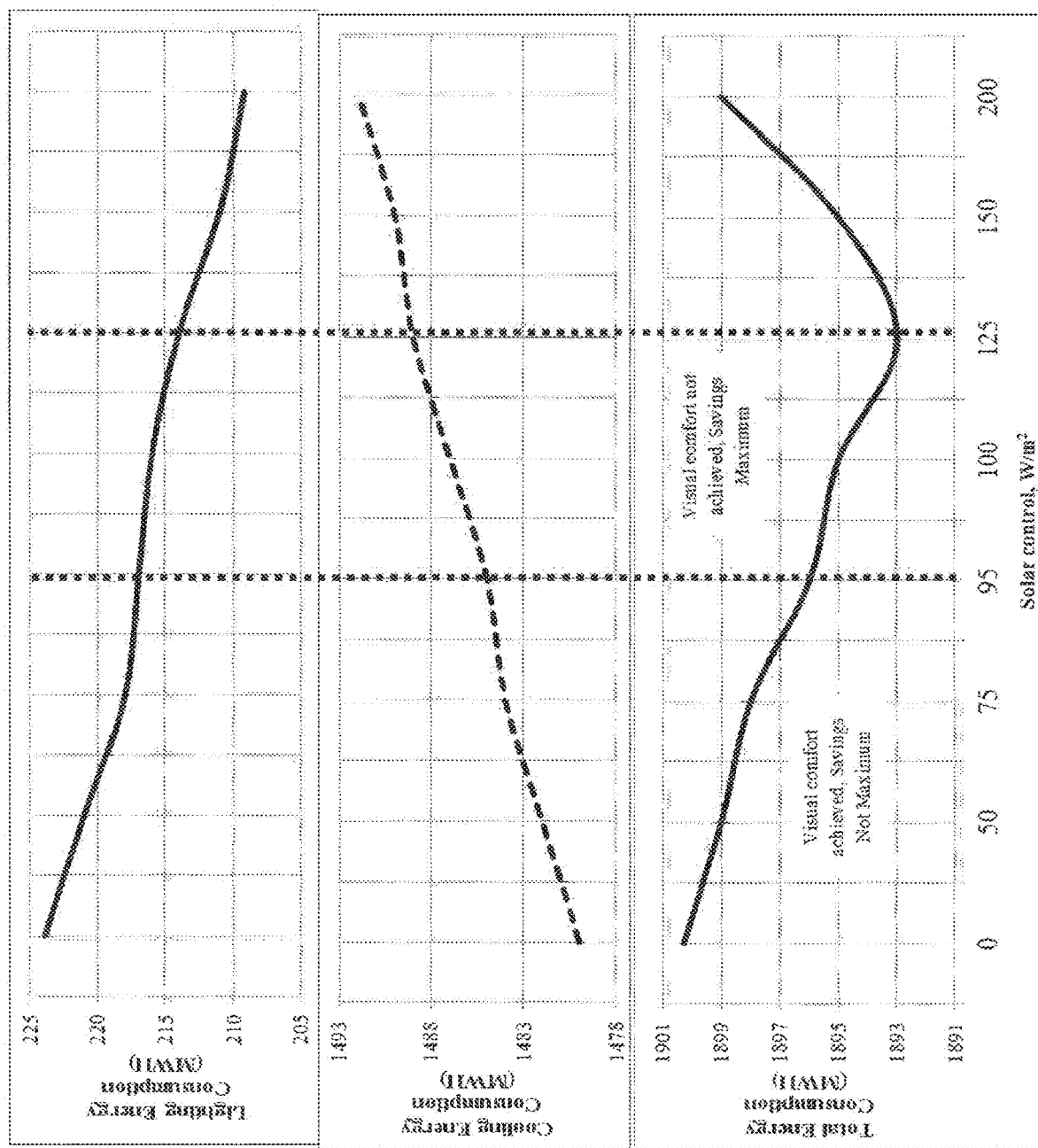
FIG. 30 is an exemplary graph of energy consumption with solar control, according to certain embodiments.

FIG. 30 is an exemplary graph of lighting, cooling, and total energy consumption for various solar radiation set points using the solar control strategy for windows having a south orientation, according to certain embodiments. As the solar radiation set point value increases, the amount of daylight entering the building 114 through the windows increases which results in a decrease in artificial lighting consumption. Increasing the solar radiation set point value also increases a cooling load. In some implementations, the lighting energy consumption is reduced by 7% and the cooling energy consumption is reduced by 2% by controlling the electrochromic smart windows with the south orientation with a solar control strategy at a radiation set point of 95 W/m². Also the total energy consumption of building is reduced by 7%. As discussed previously with respect to the north orientation windows, in some implementations, the total energy consumption curve can be divided into 3 stages associated with various set point radiation levels.

Table 13 shows a comparison between the solar control strategy and the glare control strategy for the windows of the building having a south orientation. As shown in Table 13, the solar control strategy may provide greater total energy savings than the glare control strategy while still maintaining the visual comfort criteria.

TABLE 13

| Energy consumption | Base Case (kWh) | Solar control 95 W/m² (kWh) | Glare control (kWh) | solar control (% Reduction) | Glare control (% Reduction) |
|---|---|---|---|---|---|
| Lighting Energy | 136,857 | 127,277 | 128,645 | 7 | 6 |
| Cooling | 1,587,191 | 1,555,447 | 1,547,511 | 2 | 2.5 |
| Total | 2,174,093 | 2,021,906 | 2,032,776 | 7 | 6.5 |

Figure 31:
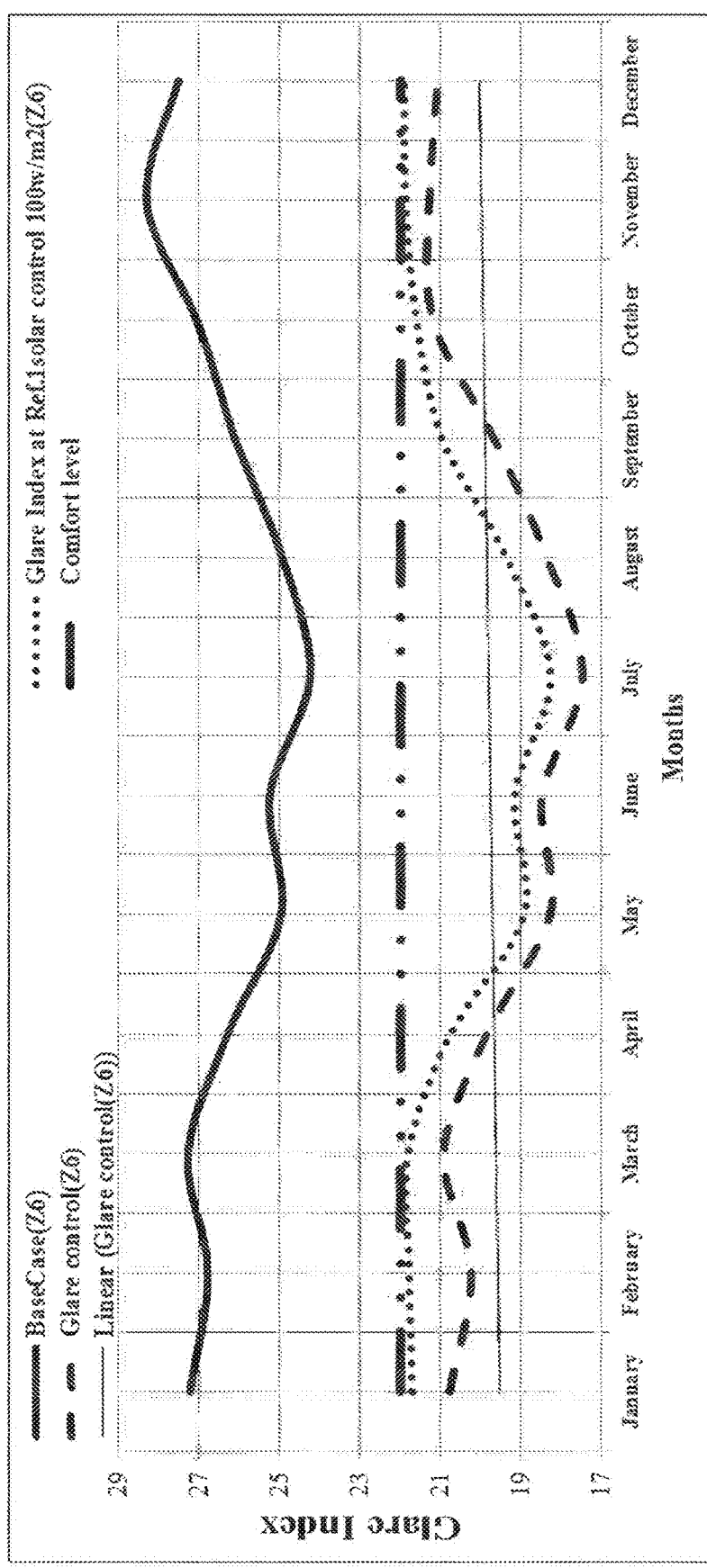
FIG. 31 is an exemplary graph of monthly variations in glare index for solar control and glare control, according to certain embodiments.

For a west orientation of the building 114, the processing circuitry of the controller 102 can determine projected solar radiation levels at the windows for each zone of the building 114 and can also calculate an amount of energy savings as well as a glare index for the windows at each orientation of the building 114. In one implementation, at a solar radiation set point value of 100 W/m², the energy savings are increased and the calculated glare index is less than the predetermined visual comfort threshold for all zones of the building 114. FIG. 31 is an exemplary graph of monthly variations in glare index for solar control and glare control for windows having the west orientation, according to certain embodiments. Maximum glare index values are plotted at the solar set point of 100 W/m² in order to show the visual comfort criteria is being achieved when the solar control strategy is applied to the electrochromic smart windows.

Figure 32:
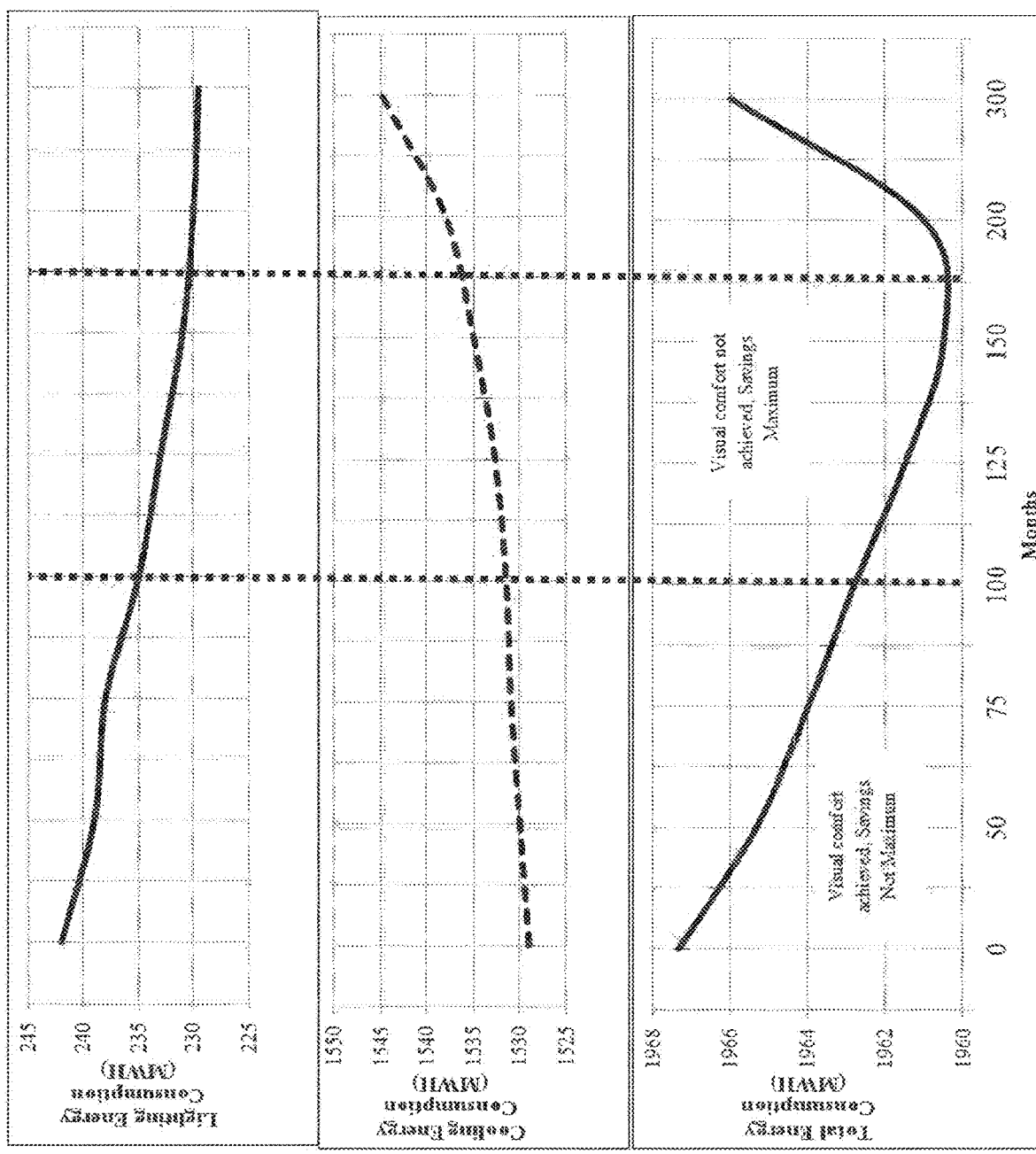
FIG. 32 is an exemplary graph of energy consumption with solar control, according to certain embodiments.

FIG. 32 is an exemplary graph of lighting, cooling, and total energy consumption for various solar radiation set points using the solar control strategy for windows having the west orientation, according to certain embodiments. As the solar radiation set point value increases, the amount of daylight entering the building 114 through the windows increases which results in a decrease in artificial lighting consumption. Increasing the solar radiation set point value also increases a cooling load. In some implementations, the lighting energy consumption is reduced by 5% and the cooling energy consumption is reduced by 3% by controlling the electrochromic smart windows with the south orientation with a solar control strategy at a radiation set point of 100 W/m². Also the total energy consumption of building is reduced by 5%. As discussed previously with respect to the north orientation windows, in some implementations, the total energy consumption curve can be divided into 3 stages associated with various set point radiation levels.

Table 14 shows a comparison between the solar control strategy and the glare control strategy for the windows of the building having the west orientation. As shown in Table 14, the solar control strategy may provide greater total energy savings than the glare control strategy while still maintaining the visual comfort criteria.

TABLE 14

| Energy Flow consumption | Base case (kWh) | Solar control 100 W/m² (kWh) | Glare control (kWh) | solar control (% Reduction) | Glare control (% Reduction) |
|---|---|---|---|---|---|
| Lighting | 136,857 | 130,014 | 131,382 | 5 | 4 |
| cooling | 1,587,191 | 1,539,575 | 1,531,639 | 3 | 3.5 |
| Total | 2,174,093 | 2,065,388 | 2,076,285 | 5 | 4.5 |

Table 15 illustrates shows energy savings for the electrochromic smart windows controlled with the solar control strategy when visual comfort is not accounted for in various orientations. By using the solar control strategy without accounting for visual comfort, the windows having a south orientation provided a higher amount of energy savings than the windows having north, east, or west orientations.

TABLE 15

| Orientation | Maximum energy savings (No visual comfort) | | | Energy savings (visual comfort) | | |
|---|---|---|---|---|---|---|
| | Lighting | Cooling | Total | Lighting | Cooling | Total |
| NORTH | 7 | 3 | 4 | 3 | 4 | 3 |
| EAST | 6.5 | 2.5 | 5.5 | 5 | 3 | 5 |
| SOUTH | 8.5 | 1.7 | 8 | 7 | 2 | 7 |
| WEST | 6.5 | 2.5 | 5.5 | 5 | 3 | 5 |

The controller 102 can also control the amount of daylight passing through the electrochromic smart windows based on a window-to-wall ratio (WWR) for the zones of the building. For small window areas, there may be a small reduction in energy consumption when daylight entering the windows is integrated with artificial lighting. When the electrochromic smart windows are controlled with the solar control strategy, the total energy consumption at first decreases and then increases for as the WWR increases for each building orientation. For example, window size can have two major impacts on the energy performance of the building. As the window size get larger, more lighting energy is saved. However cooling energy is increases.

Figure 33:
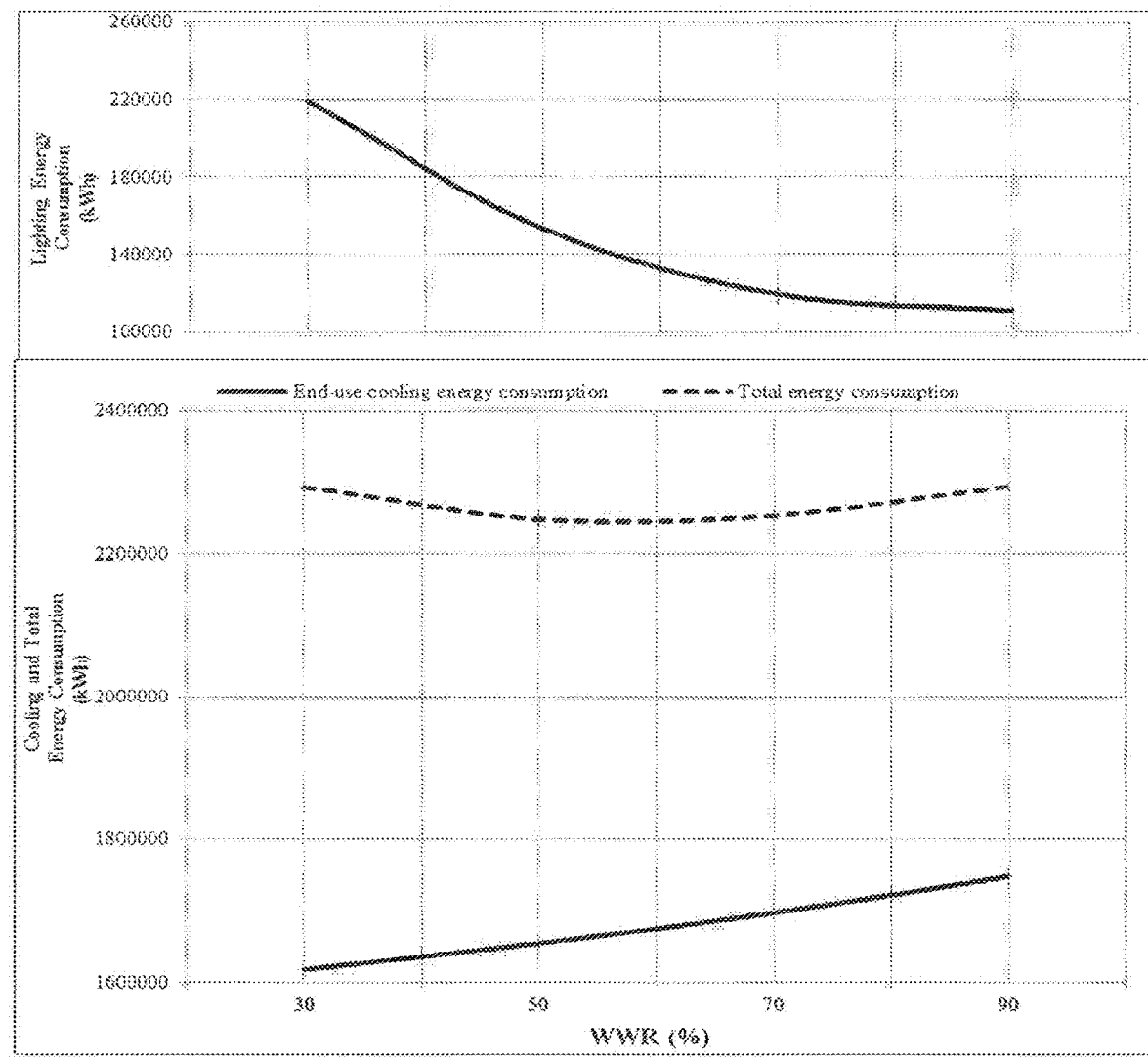
FIG. 33 is an exemplary graph of energy consumption based on window wall ratio, according to certain embodiments.

FIG. 33 is an exemplary graph of energy consumption based on window to wall ratio (WWR), according to certain embodiments. Admitting high amount of daylight may increase the heat gain in the building 114, which in turn increase the cooling energy consumption. Also, the total energy consumption of the building 114 with smaller WWR values may decrease due to the decrease in the lighting energy consumption. Between 50-70% WWR, the lighting energy savings reaches a saturation point where maximum energy savings may be achieved. WWRs greater 70% may provide an increased amount of solar radiation through the windows which also increases the cooling energy consumption, resulting in increased total energy consumption. Therefore, in some implementations, energy savings may be highest when the WWR is between 50% and 70%.

Figure 34:
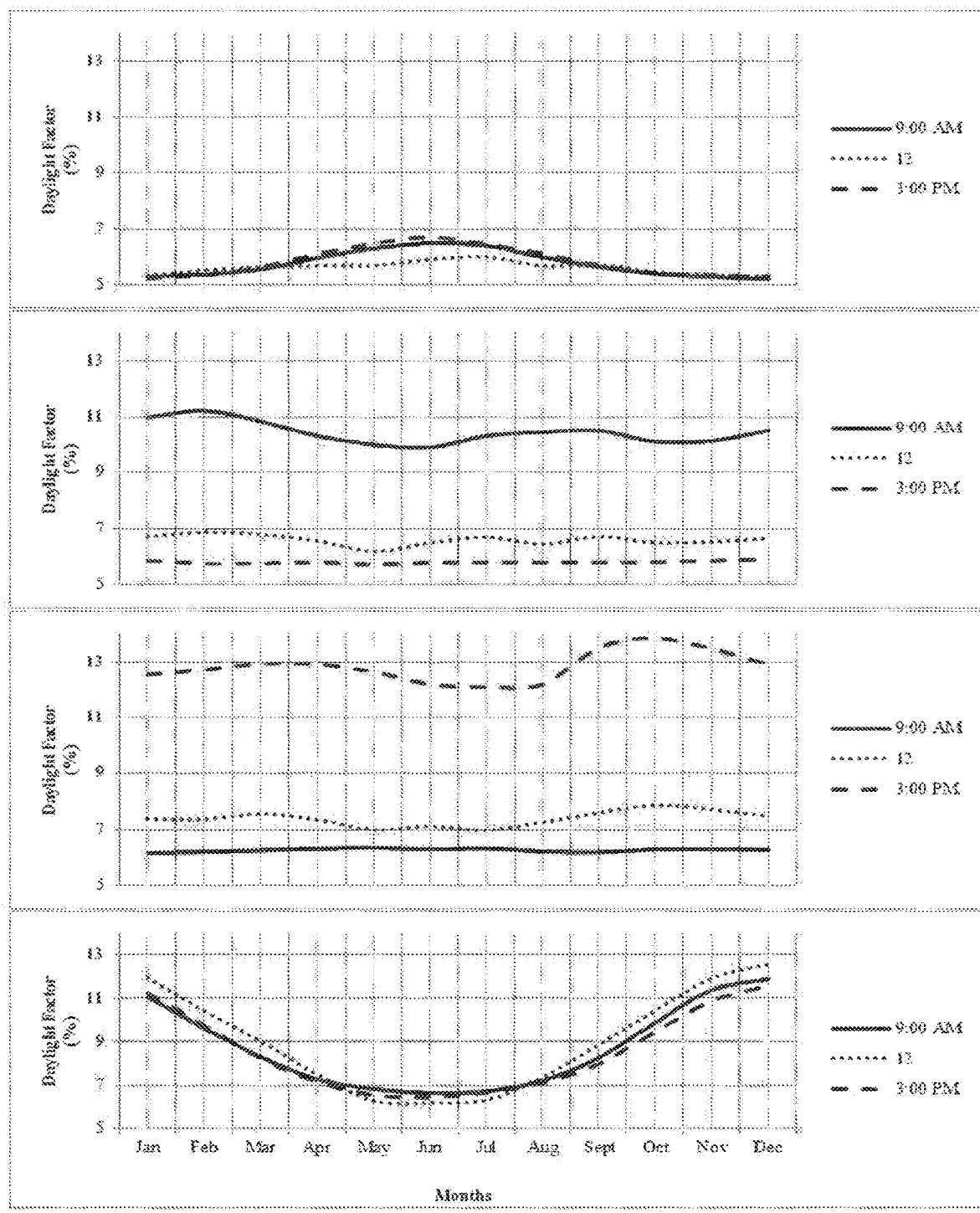
FIG. 34 is an exemplary graph of monthly variations in daylight factor with solar control, according to certain embodiments.

When taking into account the radiation set points discussed previously with respect to the north, east, south, and west orientations, the solar control strategy provides a reduction in artificial lighting energy consumption by 20%, a reduction in cooling energy consumption by 121%, and a reduction in total building energy consumption by 20%. FIG. 34 is an exemplary graph of monthly variations in daylight factor associated with the solar control strategy, according to certain embodiments. For example, the average Daylight factor (%) plotted on the graphs indicates an amount of sunlight that enters the building 114 through the windows and is used by the controller 102 to determine the amount of artificial lighting to provide to the zones of the building.

Figure 35:
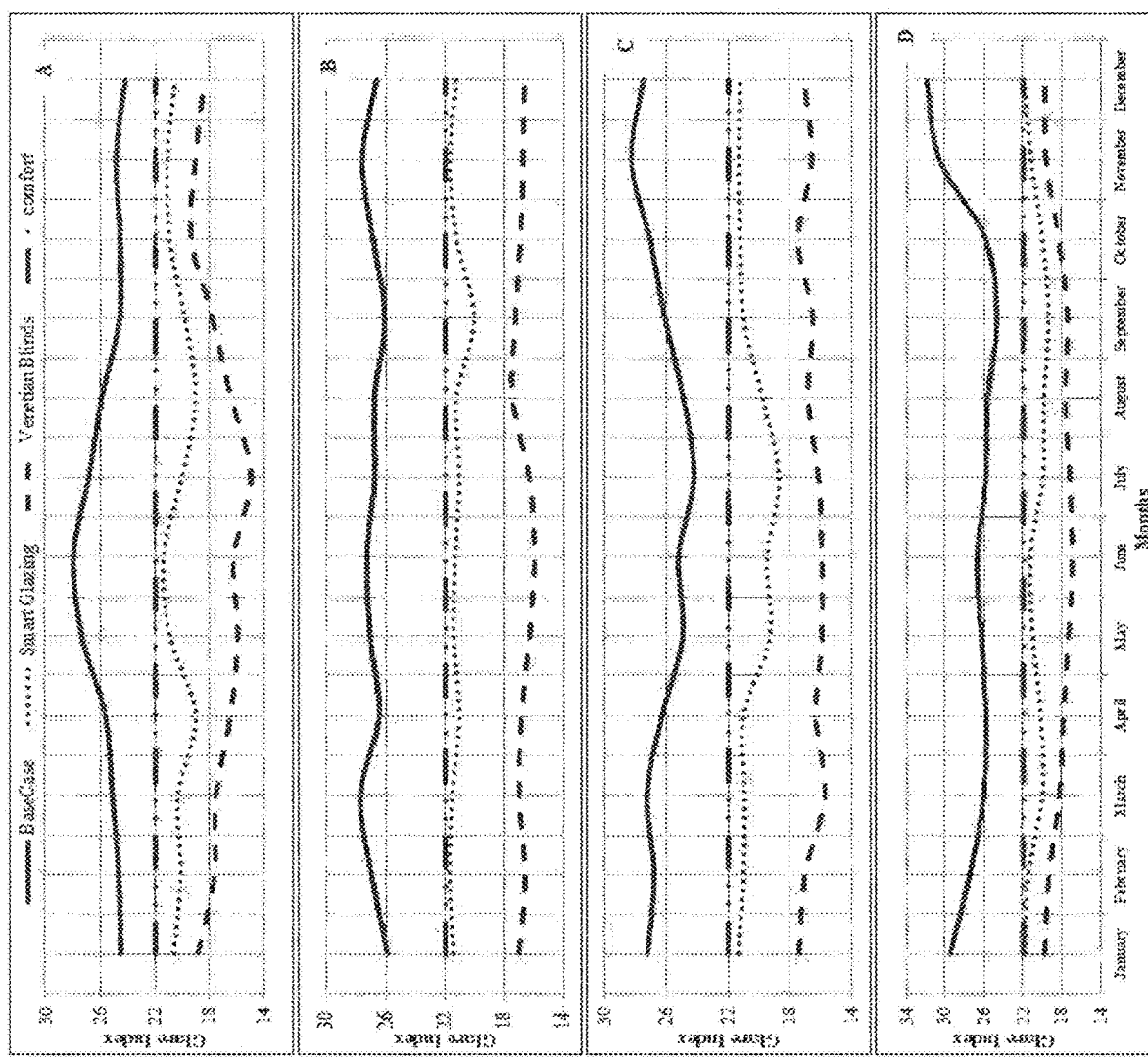
FIG. 35 is an exemplary graph of monthly variations in glare index with solar control, according to certain embodiments.

The solar control strategy can also be used by the controller 102 to control the operation of automated venetian blinds that are installed on the windows of the building 114. The amount of shading provided by the blinds is controlled by a position or angle of rotation of the blinds, which can be determined based on climactic criteria. Depending on the season, solar radiation that produces heat is either blocked or let in. Thermo sensors can installed at each of the windows to measure an amount of radiation falling on the windows, and the sensor data from the sensors can be used by the controller 102 to determine the amount of shading provided by the blinds. In some implementations, the WWR for the building 114 is 50%. In one example, the automated venetian blinds can be used as an interior shading double glazed clear glass, and the controller 102 can modify the amount of shading based on the radiation set point values discussed previously for each orientation. For example, for the automated venetian blinds in the north orientation, the solar radiation set point value is set at 105 W/m$^2$. Similarly, for the east and west orientations, the solar radiation set point value is 100 W/m$^2$. For windows with a south orientation, the solar radiation value is 95 W/m$^2$. FIG. 35 shows the monthly variation in the maximum glare index the building 114 with electrochromic smart windows and automated venetian blinds operated with the solar control strategy in all the orientations. For both electrochromic smart windows and automated venetian blinds, the visual comfort criteria are achieved.

Table 16 shows a comparison between solar control of the electrochromic smart windows and windows configured with automated venetian blind based on the energy performance. The electrochromic smart windows provide an energy savings of 20% in total building energy consumption, whereas the automated venetian blind provide an energy savings of 16% for total building energy consumption. The savings from both smart windows technologies can be used to make the design sustainable and save the money for the building owner.

TABLE 16

| Energy Consumption | solar control strategy (%) | Percentage Reduction by using Venetian Blinds (%) |
|---|---|---|
| Lighting Energy | 20 | 18 |
| cooling energy | 12 | 17 |
| Total Energy | 20 | 16 |

Figure 36:
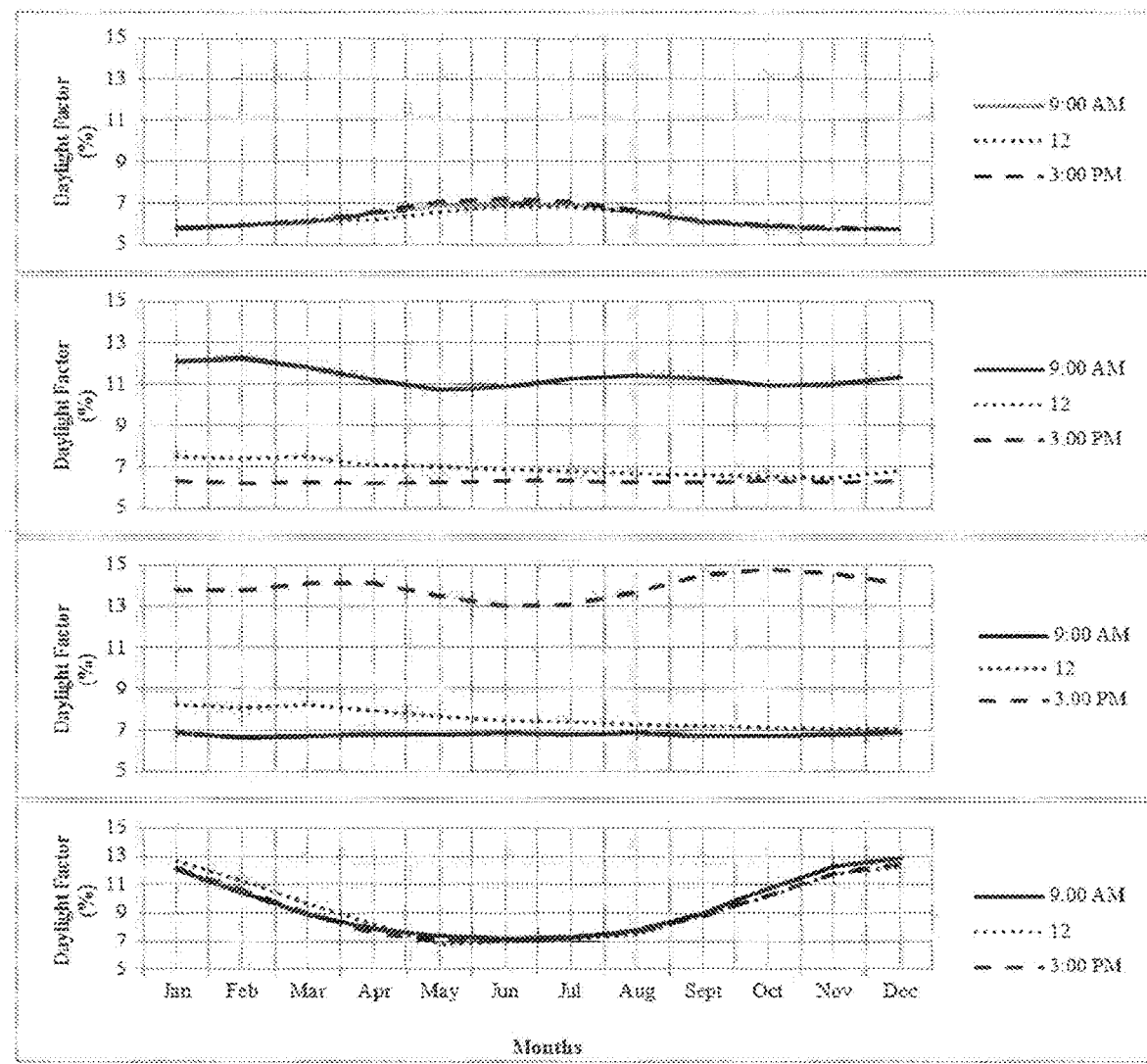
FIG. 36 is an exemplary graph of monthly variations in daylight factor with solar control, according to certain embodiments.

FIG. 36 is an exemplary graph of monthly variations in daylight factor associated with controlling the automated venetian blinds with the solar control strategy, according to certain embodiments. For example, the average Daylight factor (%) plotted on the graphs indicates an amount of sunlight that enters the building 114 through the windows and is used by the controller 102 to determine the amount of artificial lighting to provide to the zones of the building.

Figure 37:
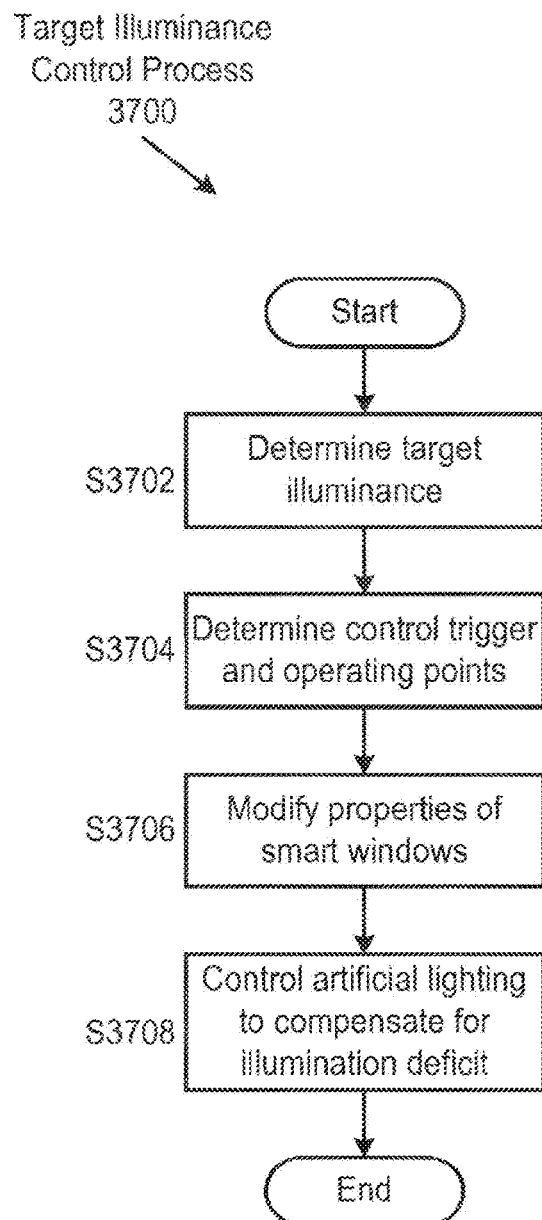
FIG. 37 is a target illuminance control process, according to certain embodiments.

FIG. 37 is a target illuminance control process 3700, according to certain embodiments. The target illuminance control process 3700 is one implementation of step S308 of the smart window control process 300.

At step S3702, the processing circuitry of the controller 102 determines a target illuminance for each zone of the building 114. The target illuminance corresponds to a total amount of illumination from both natural (e.g., daylight) and artificial (e.g., lighting systems) lighting sources. In one implementation, the target illuminance for the zones of the building 114 is 500 Lux. In other implementations, each zone can have an assigned target illuminance based on a functionality associated with the zone. For example, hallways and stairways of a building may have a lower target illuminance than general work spaces of the building 114, such as 300 Lux.

At step S3704, the processing circuitry determines control trigger and operating points based on the light control strategy being implemented. As discussed previously, each of the lighting control strategies includes various set points associated with achieving energy savings while maintaining visual comfort criteria. For example, the solar control strategy includes radiation set point values associated with each building orientation (north, east, south, and west).

In addition, the daylight control strategy uses daylighting illumination as a valid control trigger for the electrochromic smart windows. Illumination sensors that can include photodiode sensors can detect an amount of lighting inside the building. The transmittance of the glazing on the windows can be modified to just meet a daylight illuminance set point at one or more of the daylighting interior illumination sensors. With a solar control strategy, shading is applied to the windows when a beam plus diffuse solar radiation incident on the window exceeds a predetermined radiation set point value. With a glare control strategy, the transmittance of the glazing on the windows can be modified when a total daylight glare index for a building zone from all of the exterior windows in the zone exceeds a predetermined glare index threshold in the daylighting input for zone.

At step S3706, the controller 102 issues control signals to modify the parameters of the electrochromic smart windows and/or automated venetian blinds. For example, the controller 102 can control an operating voltage of electrochromic windows to modify an amount of shading provided by the windows in order to allow a predetermined amount of daylight to enter the building through the windows to meet the operational set points. The controller 102 can also control an amount of shading provided by automated blinds that are installed on an interior surface of the windows.

At step S3708, the controller 102 controls the artificial lighting systems of the building 114 to compensate for an illumination deficit between the target illuminance and the amount of light transmitted through the windows. In some implementations, the illumination deficit is equal to the target illuminance minus the amount of daylight entering the building 114 through the electrochromic windows with a predetermined amount of shading applied based on the light control strategy. The controller 102 issues control signals to modify an amount of artificial lighting provided by the lighting systems of the building 114 so that the target illuminance is met. In some implementations, interior illuminance sensors detect the daylight entering the building 114 through the windows, and the controller 102 issues a control signal to modify the fractional input power of artificial lighting in discrete steps until the target illuminance is achieved.

A hardware description of an exemplary server 102 for performing one or more of the embodiments described herein is described with reference to FIG. 38. In addition, the hardware described by FIG. 38 can also apply to the computer 110, mobile device 112, as well as circuitry associated with the smart windows of the building 114. When the server 102, computer 110, and/or mobile device 112 are programmed to perform the processes related to video editing described herein, the server 102, computer 110, and/or mobile device 112 becomes a special purpose device. Implementation of the processes of the smart window control system 100 on the hardware described herein improves the efficiency of determining an amount of sunlight that passes through windows, controlling an amount of shading provided by the windows, and controlling operation of other building systems to increase an amount of energy savings. In addition, the processes described herein can also be applied to other types of smart windows and/or lighting systems.

The server 102 includes a CPU 3800 that perform the processes described herein. The process data and instructions may be stored in memory 3802. These processes and instructions may also be stored on a storage medium disk 3804 such as a hard drive (HDD) or portable storage medium or may be stored remotely. Note that each of the functions of the described embodiments may be implemented by one or more processing circuits. A processing circuit includes a programmed processor, as a processor includes circuitry. A processing circuit/circuitry may also include devices such as an application specific integrated circuit (ASIC) and conventional circuit components arranged to perform the recited functions. The processing circuitry can be referred to interchangeably as circuitry throughout the disclosure. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the server 102 communicates, such as the mobile device 112 and/or the computer 110.

Further, the claimed advancements may be provided as a utility application, background daemon, or component of an operating system, or combination thereof, executing in conjunction with CPU 3800 and an operating system such as Microsoft Windows, UNIX, Solaris, LINUX, Apple MAC-OS and other systems known to those skilled in the art.

CPU 3800 may be a Xenon or Core processor from Intel of America or an Opteron processor from AMD of America, or may be other processor types that would be recognized by one of ordinary skill in the art. Alternatively, the CPU 3800 may be implemented on an FPGA, ASIC, PLD or using discrete logic circuits, as one of ordinary skill in the art would recognize. Further, CPU 3800 may be implemented as multiple processors cooperatively working in parallel to perform the instructions of the inventive processes described above.

Figure 38:
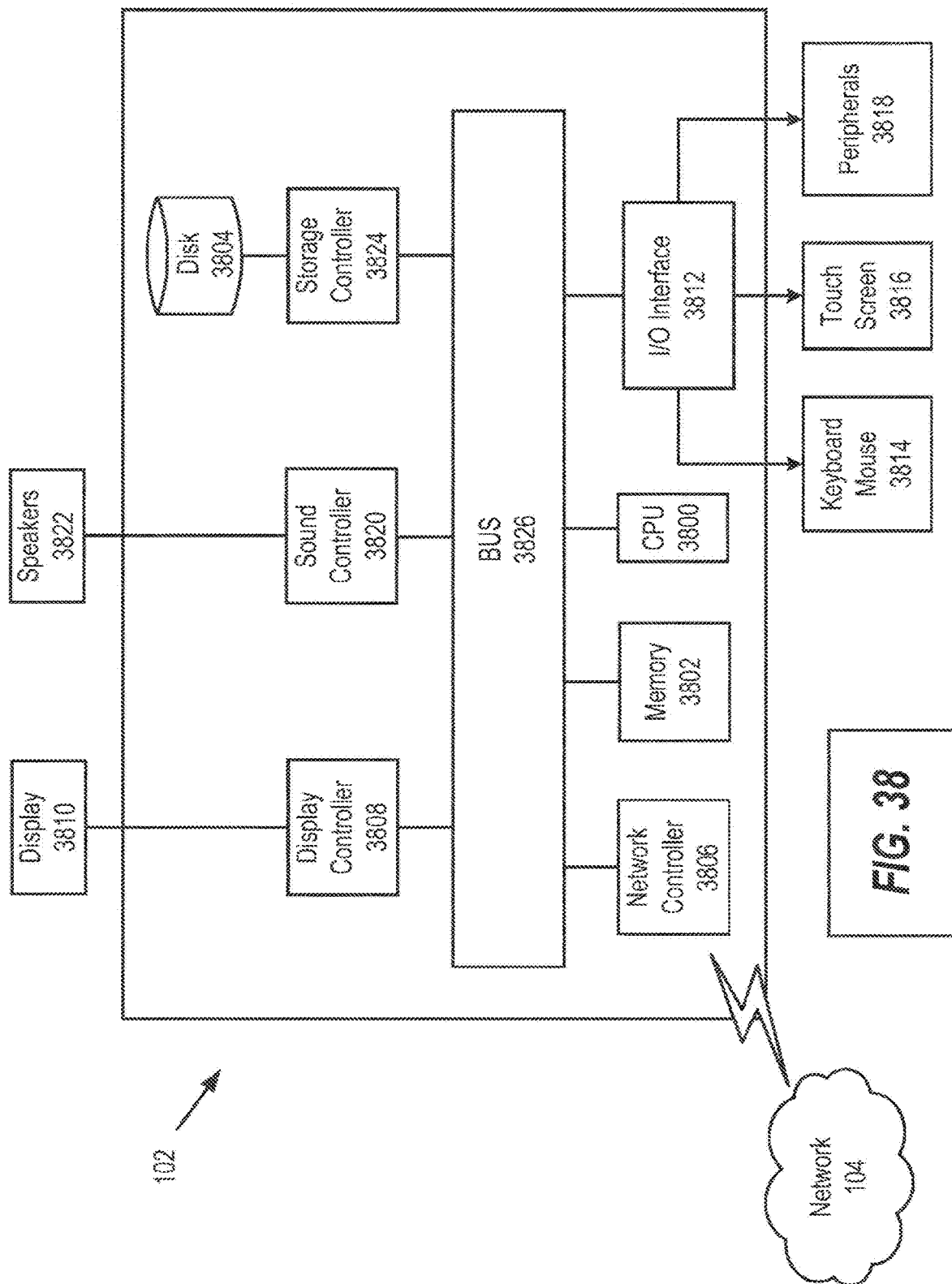
FIG. 38 is an illustration of a non-limiting example of controller circuitry, according to certain embodiments.

The server 102 in FIG. 38 also includes a network controller 3806, such as an Intel Ethernet PRO network interface card from Intel Corporation of America, for interfacing with network 104. As can be appreciated, the network 104 can be a public network, such as the Internet, or a private network such as an LAN or WAN network, or any combination thereof and can also include PSTN or ISDN subnetworks. The network 104 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

The server 102 further includes a display controller 3808, such as a NVIDIA GeForce GTX or Quadro graphics adaptor from NVIDIA Corporation of America for interfacing with display 3810 of the server 102 and the computer 110, such as an LCD monitor. A general purpose I/O interface 3812 at the server 102 interfaces with a keyboard and/or mouse 3814 as well as a touch screen panel 3816 on or separate from display 3810. General purpose I/O interface 3812 also connects to a variety of peripherals 3818 including printers and scanners.

A sound controller 3820 is also provided in the server 102, such as Sound Blaster X-Fi Titanium from Creative, to interface with speakers/microphone 3822 thereby providing sounds and/or music.

The general purpose storage controller 3824 connects the storage medium disk 3804 with communication bus 3826, which may be an ISA, EISA, VESA, PCI, or similar, for interconnecting all of the components of the server 102. A description of the general features and functionality of the display 3810, keyboard and/or mouse 3814, as well as the display controller 3808, storage controller 3824, network controller 3806, sound controller 3820, and general purpose I/O interface 3812 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 39.

Figure 39:
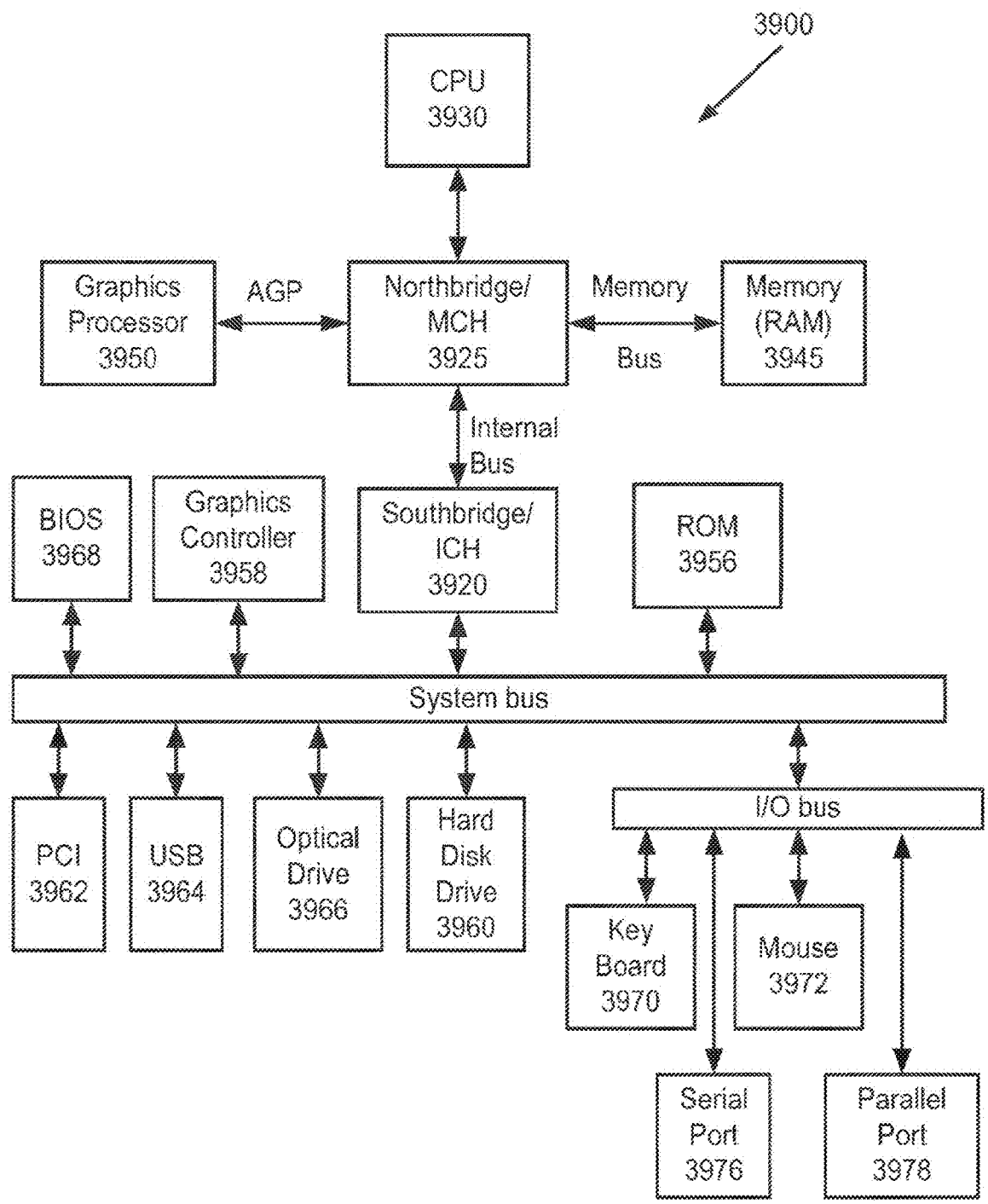
FIG. 39 is an exemplary schematic diagram of a data processing system, according to certain embodiments.

FIG. 39 shows a schematic diagram of a data processing system, according to certain embodiments, for performing the smart window control process 300, the zone/building development process 700, the control strategy determination process 2000, and/or the target illuminance control process 3700. The data processing system is an example of a computer in which code or instructions implementing the processes of the illustrative embodiments may be located.

In FIG. 39, data processing system 3900 employs a hub architecture including a north bridge and memory controller hub (NB/MCH) 3925 and a south bridge and input/output (I/O) controller hub (SB/ICH) 3920. The central processing unit (CPU) 3930 is connected to NB/MCH 3925. The NB/MCH 3925 also connects to the memory 3945 via a memory bus, and connects to the graphics processor 3950 via an accelerated graphics port (AGP). The NB/MCH 3925 also connects to the SB/ICH 3920 via an internal bus (e.g., a unified media interface or a direct media interface). The CPU Processing unit 3930 may contain one or more processors and even may be implemented using one or more heterogeneous processor systems.

Figure 40:
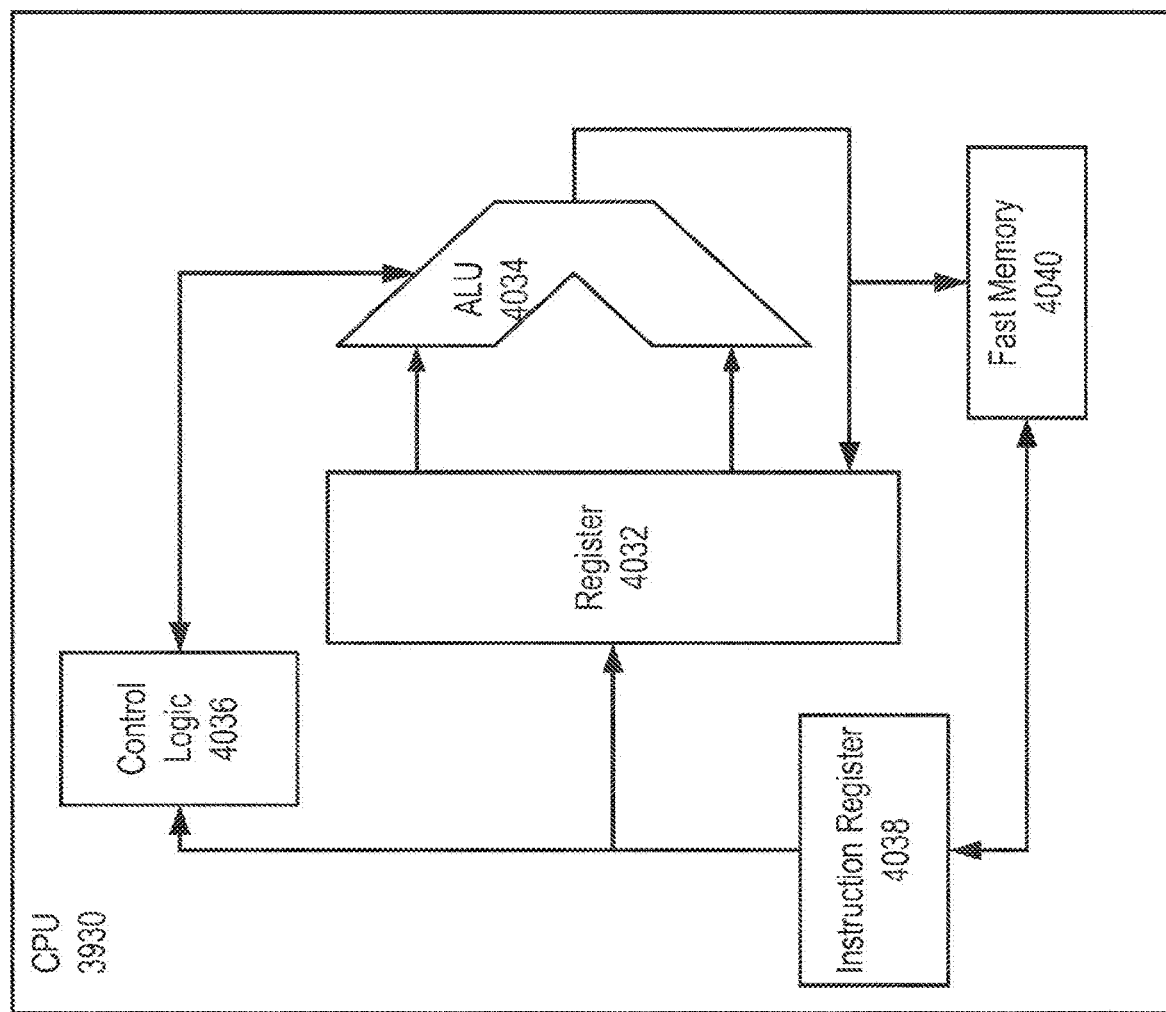
FIG. 40 is an exemplary schematic diagram of a processor, according to certain embodiments.

For example, FIG. 40 shows one implementation of CPU 3930. In one implementation, the instruction register 4038 retrieves instructions from the fast memory 4040. At least part of these instructions are fetched from the instruction register 4038 by the control logic 4036 and interpreted according to the instruction set architecture of the CPU 3930. Part of the instructions can also be directed to the register 4032. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 4034 that loads values from the register 4032 and performs logical and mathematical operations on the loaded values according to the instructions. The results from these operations can be feedback into the register and/or stored in the fast memory 4040. According to certain implementations, the instruction set architecture of the CPU 3930 can use a reduced instruction set architecture, a complex instruction set architecture, a vector processor architecture, a very large instruction word architecture. Furthermore, the CPU 3930 can be based on the Von Neuman model or the Harvard model. The CPU 3930 can be a digital signal processor, an FPGA, an ASIC, a PLA, a PLD, or a CPLD. Further, the CPU 3930 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 39, the data processing system 3900 can include that the SB/ICH 3920 is coupled through a system bus to an I/O Bus, a read only memory (ROM) 3956, universal serial bus (USB) port 3964, a flash binary input/output system (BIOS) 3968, and a graphics controller 3958. PCI/PCIe devices can also be coupled to SB/ICH YYY through a PCI bus 3968.

The PCI devices may include, for example, Ethernet adapters, add-in cards, and PC cards for notebook computers. The Hard disk drive 3960 and CD-ROM 3966 can use, for example, an integrated drive electronics (IDE) or serial advanced technology attachment (SATA) interface. In one implementation the I/O bus can include a super I/O (SIO) device.

Further, the hard disk drive (HDD) 3960 and optical drive 3966 can also be coupled to the SB/ICH 3920 through a system bus. In one implementation, a keyboard 3970, a mouse 3972, a parallel port 3978, and a serial port 3976 can be connected to the system bust through the I/O bus. Other peripherals and devices that can be connected to the SB/ICH 3920 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The functions and features described herein may also be executed by various distributed components of a system. For example, one or more processors may execute these system functions, wherein the processors are distributed across multiple components communicating in a network. The distributed components may include one or more client and server machines, which may share processing in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein. In other alternate embodiments, processing features according to the present disclosure may be implemented and commercialized as hardware, a software solution, or a combination thereof. Moreover, instructions corresponding to the smart window control process 300, the zone/building development process 700, the control strategy determination process 2000, and/or the target illuminance control process 3700 in accordance with the present disclosure could be stored in a thumb drive that hosts a secure process.

According to certain embodiments, the smart window control system 100 provides the processing power to adaptively modify the amount of shading provided by electrochromic smart windows and/or automated venetian blinds based on an amount of sunlight entering the building 114 through the windows as well as based on energy savings and visual comfort criteria. The processes described herein can also be applied to other technical fields that involve adapting operations of building systems based on external environmental factors.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, an implementation may be performed on modules or hardware not identical to those described. Accordingly, other implementations are within the scope that may be claimed.

The invention claimed is:

1. A smart window control system, comprising:
one or more artificial lighting systems disposed inside a building,
a first sensor disposed on the exterior of one or more electrochromic smart windows to measure an amount of direct solar radiation,
a second sensor disposed on the exterior of the one or more electrochromic smart windows to measure an amount of diffuse solar radiation, and
a smart window control device comprising:
a controller having a processor with circuitry configured to:
establish a representative model of a plurality of building periphery zones and a single building core zone based on occupancy, construction, lighting, or cooling properties of the building, wherein all of the building periphery zones have an equal window-to-wall ratio,
implement a lighting control strategy for the building periphery zones and the building core zone based on the representative model or one or more user preferences input at a first user interface screen of an external device,
control automatic operations of one or more electrochromic smart windows by varying a voltage applied to a stack of electrochromic coating layers, or artificial lighting systems by modifying a fractional input power in discrete steps based on trigger points associated with the lighting control strategy and measures of the direct solar radiation and the diffuse solar radiation measured at the one or more electrochromic smart windows by the first and second sensors, respectively, to thereby regulate the flow of radiant heat into the building,
control automatic operations of the one or more artificial lighting systems by modifying a fractional input power in discrete steps based on trigger points associated with the lighting control strategy, and
determine with the circuitry a performance level of the lighting control strategy for the building periphery zones and the building core zone based on one or more predetermined financial metrics that include a comparison of total building energy consumption to a threshold, wherein
the circuitry is further configured to determine a comfort score and an energy savings score indicating a relative importance of visual comfort and energy savings for the building periphery zones and the building core zone based on the representative model of the building periphery zones and the building core zone or the one or more user preferences,
the circuitry is further configured to implement a daylight control strategy as the lighting control strategy when the energy savings score is greater than an energy savings threshold or the comfort score is lower than a visual comfort threshold, and
the circuitry is further configured to implement a solar control strategy or a glare control strategy as the lighting control strategy when the energy savings score is less than or equal to an energy savings threshold and the comfort score is greater than or equal to a visual comfort threshold,
wherein the predetermined financial metrics include a predetermined payback period associated one or more building components based on a current energy costs, price of the one or more building components, and one or more financial health attributes of a building, and
wherein the circuitry is further configured to output a warning to the external device when an amount of energy savings associated with the one or more smart windows over a predetermined period of time does not meet the predetermined payback period associated with the one or more building components.

2. The system of claim 1, wherein the circuitry is further configured to implement the daylight control strategy, the glare control strategy, or the solar control strategy based on the representative model of the building periphery zones and the building core zone or the one or more user preferences.

3. The system of claim 2, wherein the circuitry is further configured to control the automatic operations of the one or more smart windows to achieve a predetermined daylight illuminance sensor set point when the daylight control strategy is implemented.

4. The system of claim 2, wherein the circuitry is further configured to control the automatic operations of the one or more electrochromic smart windows to achieve a predetermined glare index set point when the glare control strategy is implemented.

5. The system of claim 2, wherein the circuitry is further configured to control the automatic operations of the one or more electrochromic smart windows to achieve a predetermined solar radiation set point when the solar control strategy is implemented.

6. The system of claim 1, wherein the circuitry is further configured to determine an impact weighting factor associated with the first and second sensors based on at least one of sensor value, time of day, or time of year.

7. The system of claim 1, wherein the circuitry is further configured to determine an illumination deficit for the building periphery zones and the building core zone corresponding to a difference between a target illuminance and an amount of daylight illuminance from the one or more electrochromic smart windows.

* * * * *